United States Patent

Yanai et al.

[11] Patent Number: 6,011,532
[45] Date of Patent: Jan. 4, 2000

[54] HIGH QUALITY ACTIVE MATRIX-TYPE DISPLAY DEVICE

[75] Inventors: Kenichi Yanai, Atsugi; Kenichi Oki, Machida; Tetsuya Hamada, Isehara; Kazuhiro Takahara, Atsugi; Yasuyoshi Mishima, Zama, all of Japan

[73] Assignee: Fujitsu Limited, Kawasaki, Japan

[21] Appl. No.: 08/789,688

[22] Filed: Jan. 27, 1997

Related U.S. Application Data

[60] Continuation of application No. 08/443,006, May 17, 1995, abandoned, which is a division of application No. 08/203,293, Mar. 1, 1994, Pat. No. 5,432,527, and application No. 07/695,029, May 6, 1991, abandoned.

[30] Foreign Application Priority Data

| May 7, 1990 | [JP] | Japan | 2-118346 |
| May 7, 1990 | [JP] | Japan | 2-118347 |
| Aug. 22, 1990 | [JP] | Japan | 2-218966 |

[51] Int. Cl.[7] .................................................. G09G 3/36
[52] U.S. Cl. .............................. 345/92; 345/93; 345/206
[58] Field of Search .............................. 345/92, 87, 84, 345/90, 93, 206; 359/58, 55, 59, 54, 60; 348/790, 792; 349/33, 41, 42, 45, 46, 47, 48, 49, 54

[56] References Cited

U.S. PATENT DOCUMENTS

| 4,678,282 | 7/1987 | Yaniv et al. ........................... 350/334 |
| 4,694,287 | 9/1987 | Chenevas-Paule et al. ............ 340/719 |
| 4,717,244 | 1/1988 | Hilsum et al. .......................... 350/333 |
| 4,781,438 | 11/1988 | Noguchi ................................. 359/59 |
| 4,818,981 | 4/1989 | Oki et al. ................................ 359/59 |
| 4,822,142 | 4/1989 | Yasui ...................................... 359/59 |
| 4,842,371 | 6/1989 | Yasuda et al. .......................... 340/784 |
| 4,930,874 | 6/1990 | Mitsumune et al. .................... 345/95 |
| 4,973,135 | 11/1990 | Okada et al. ........................... 359/59 |
| 5,049,865 | 9/1991 | Nakamura et al. ..................... 359/55 |

FOREIGN PATENT DOCUMENTS

| 0 259 875 | 3/1988 | European Pat. Off. . |
| 0 336 570 | 10/1989 | European Pat. Off. . |
| 0 362 948 | 4/1990 | European Pat. Off. . |
| 53-144297 | 12/1978 | Japan . |
| 62-108227 | 5/1987 | Japan . |
| 63-096636 | 4/1988 | Japan . |
| 2-214819 | 8/1990 | Japan . |

OTHER PUBLICATIONS

*Patent Abstracts of Japan*, vol. 12, No. 318 (E–650), Aug. 29, 1988 & JP–A–63 082177 (Sony Co.), Apr. 12, 1988.
*Patent Abstracts of Japan*, vol. 12, No. 334 (P–756), Sep. 8, 1988 & JP–A–63 096636 (Seiko Epson Co.), Apr. 27, 1988.
*Patent Abstracts of Japan*, vol. 13, No. 406 (P–930), Sep. 8, 1989 & JP–A–1 147434 (Fujitsu Ltd.), Jun. 9, 1989.
*Patent Abstracts of Japan*, vol. 14, No. 219 (P–1045), May 9, 1990 & J–A–2 050132 (Hitachi Ltd.), Feb. 20, 1989.
J.F. Clerc et al., "New Electrodes Architectures for Liquid Crystal Displays Based on Thin Film Transistors," *Japan Display* 1986, pp. 84–87.
C. Hilsum et al., "Simplified Electrode Arrangement for TFT–Matrix Liquid Crystal Displays," *Displays*, Jan. 1986, pp. 37–39.

Primary Examiner—Dennis-Doon Chow
Attorney, Agent, or Firm—Staas & Halsey LLP

[57] ABSTRACT

In an active matrix-type display device where scan bus lines ($S_i$) and data bus lines ($D_j$) are formed on different substrates, two kinds of scan bus lines ($SP_i$, $SN_i$) are provided. A first switching element ($TFTN_{ij}$) is connected between a reference voltage supply line ($V_R$) and a display electrode ($E_{ij}$), and is controlled by a first scan bus line ($SN_i$), and a second switching element ($TFTP_{ij}$) is connected between the reference voltage supply bus line ($V_R$) and the display electrode, and is controlled by a second scan bus line ($SP_i$). The first switching element ($TFTN_{ij}$) is turned ON by a positive or negative potential at the first scan bus line.

18 Claims, 50 Drawing Sheets

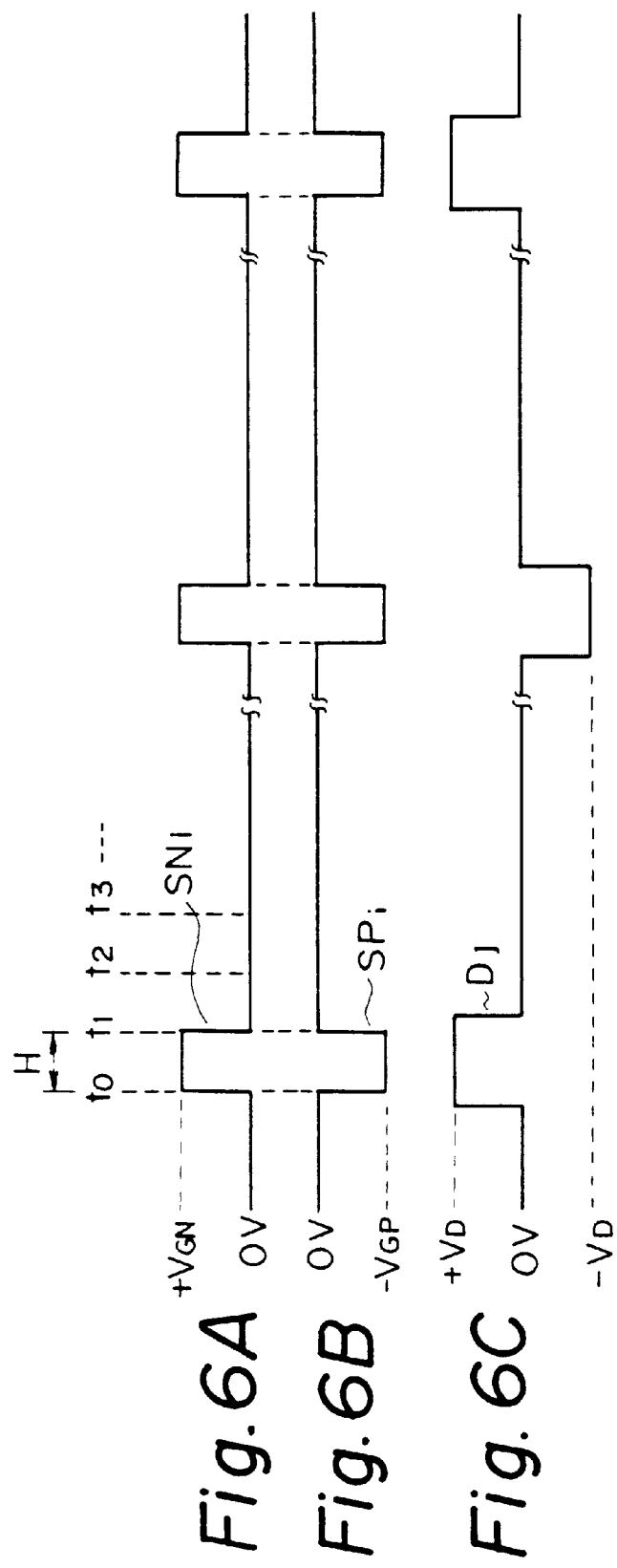

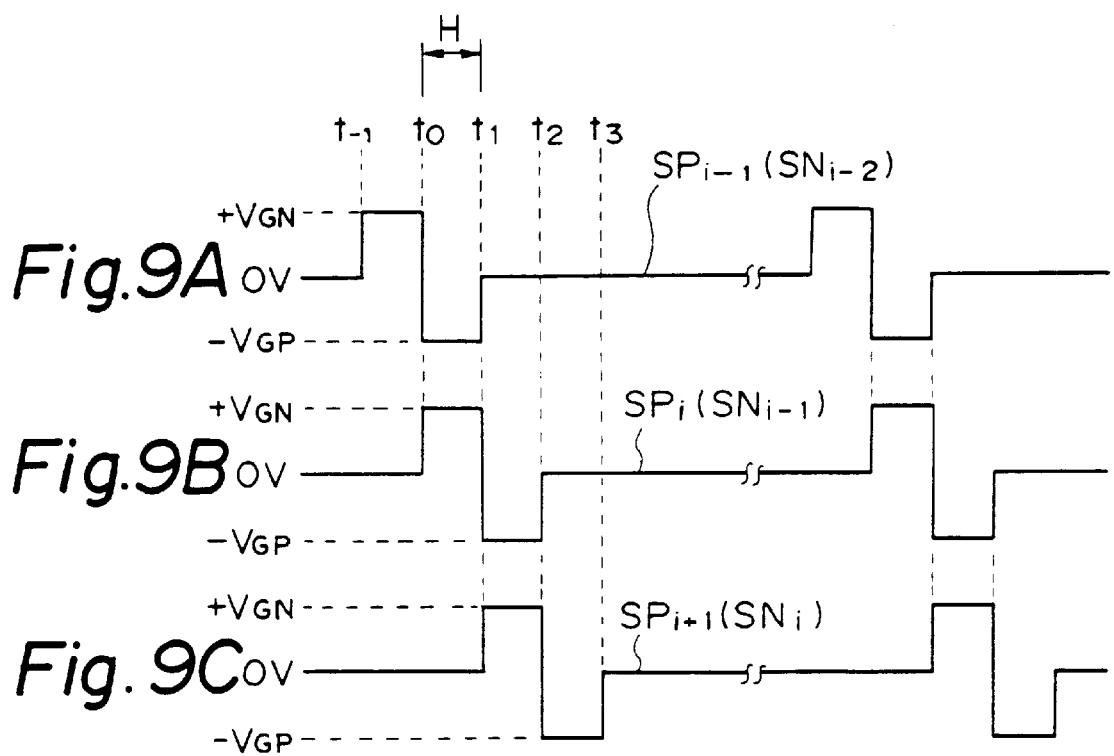

Fig. 10C

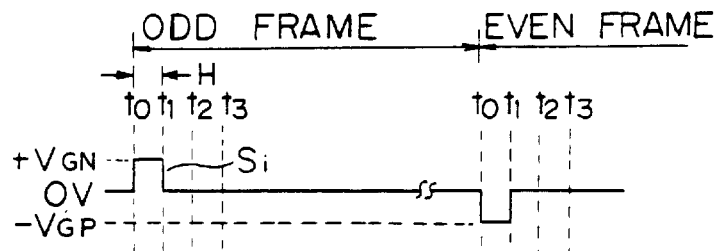
Fig. 15A
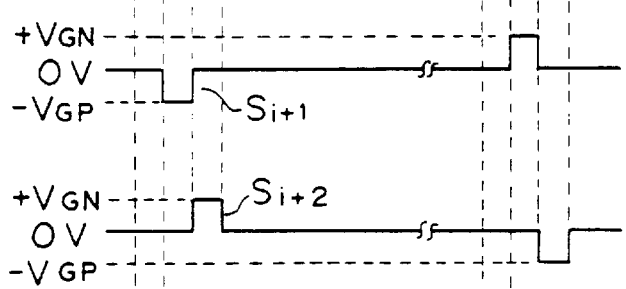
Fig. 15B
Fig. 15C
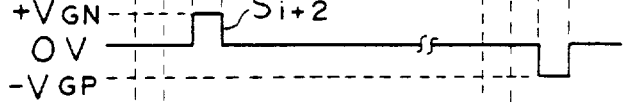
Fig. 15D
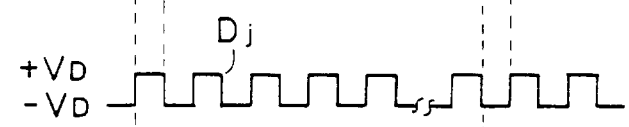
Fig. 15E
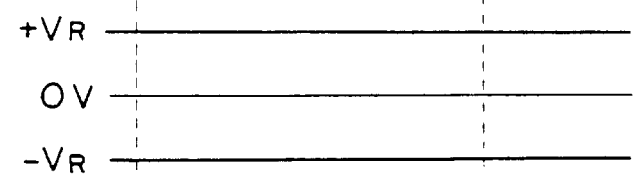
Fig. 15F
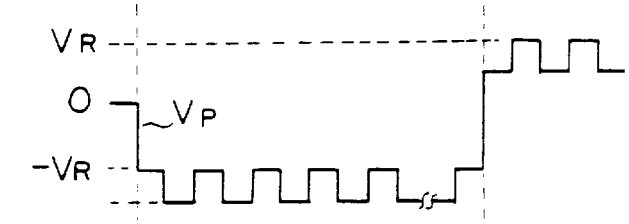
Fig. 15G
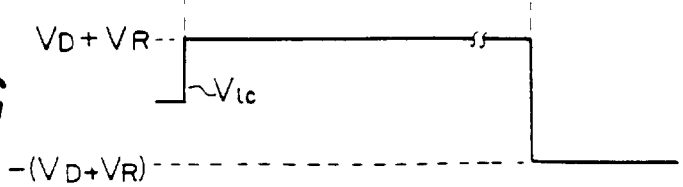

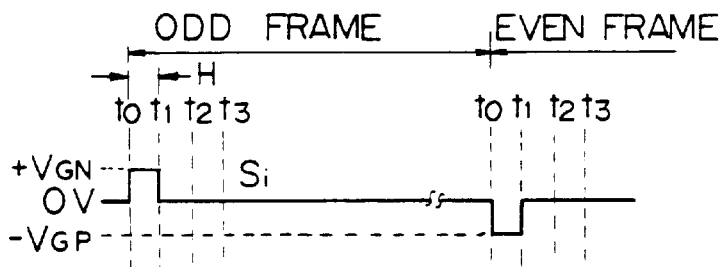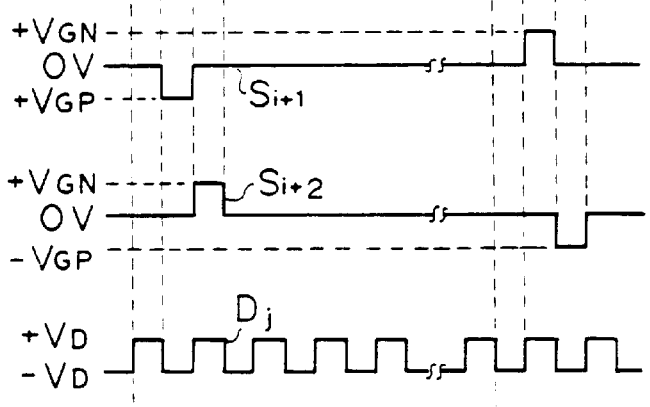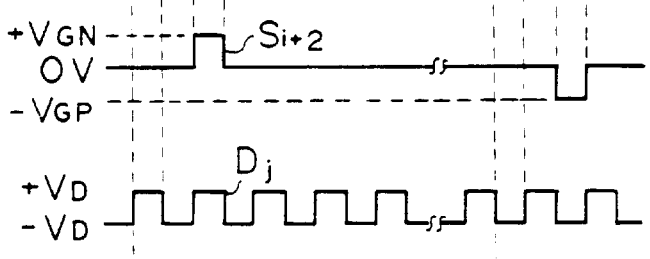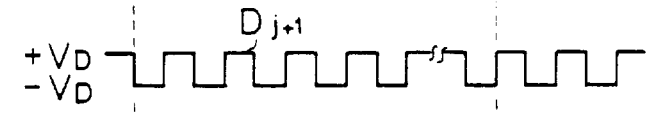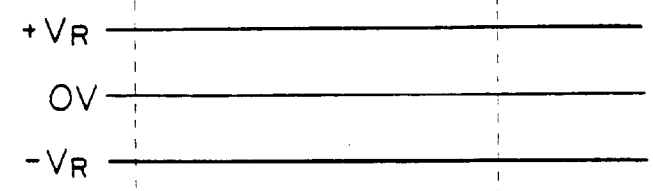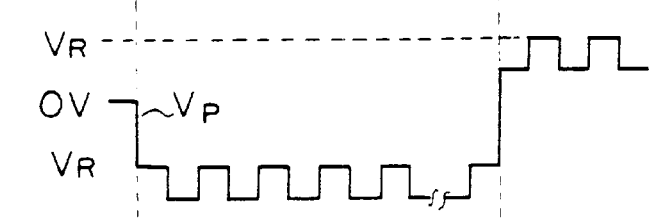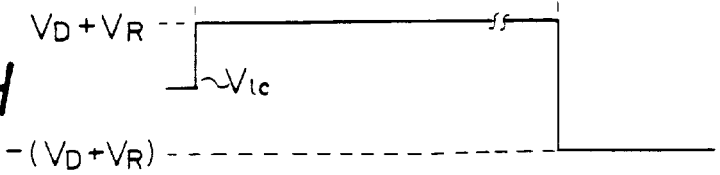

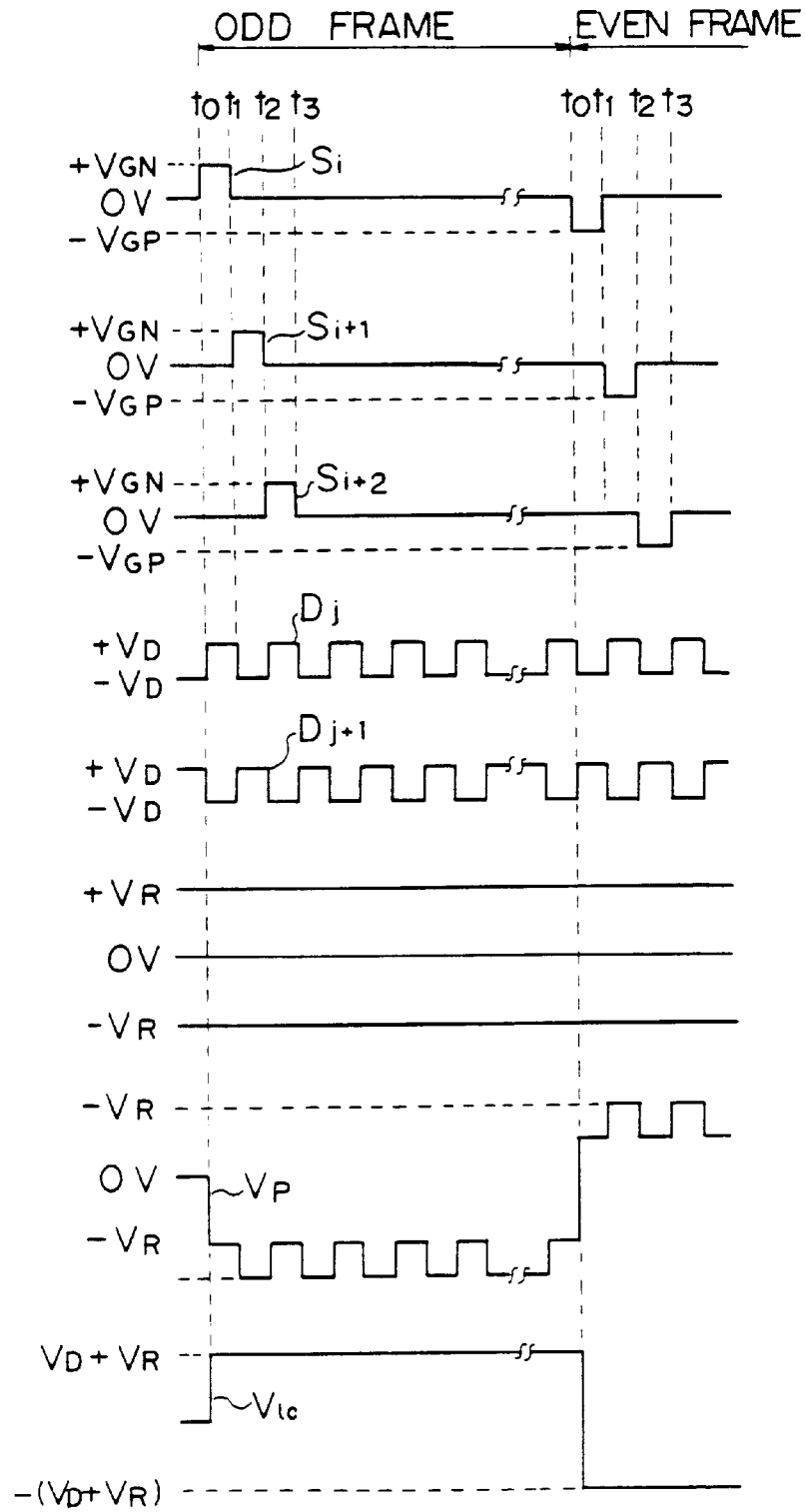

Fig. 22B

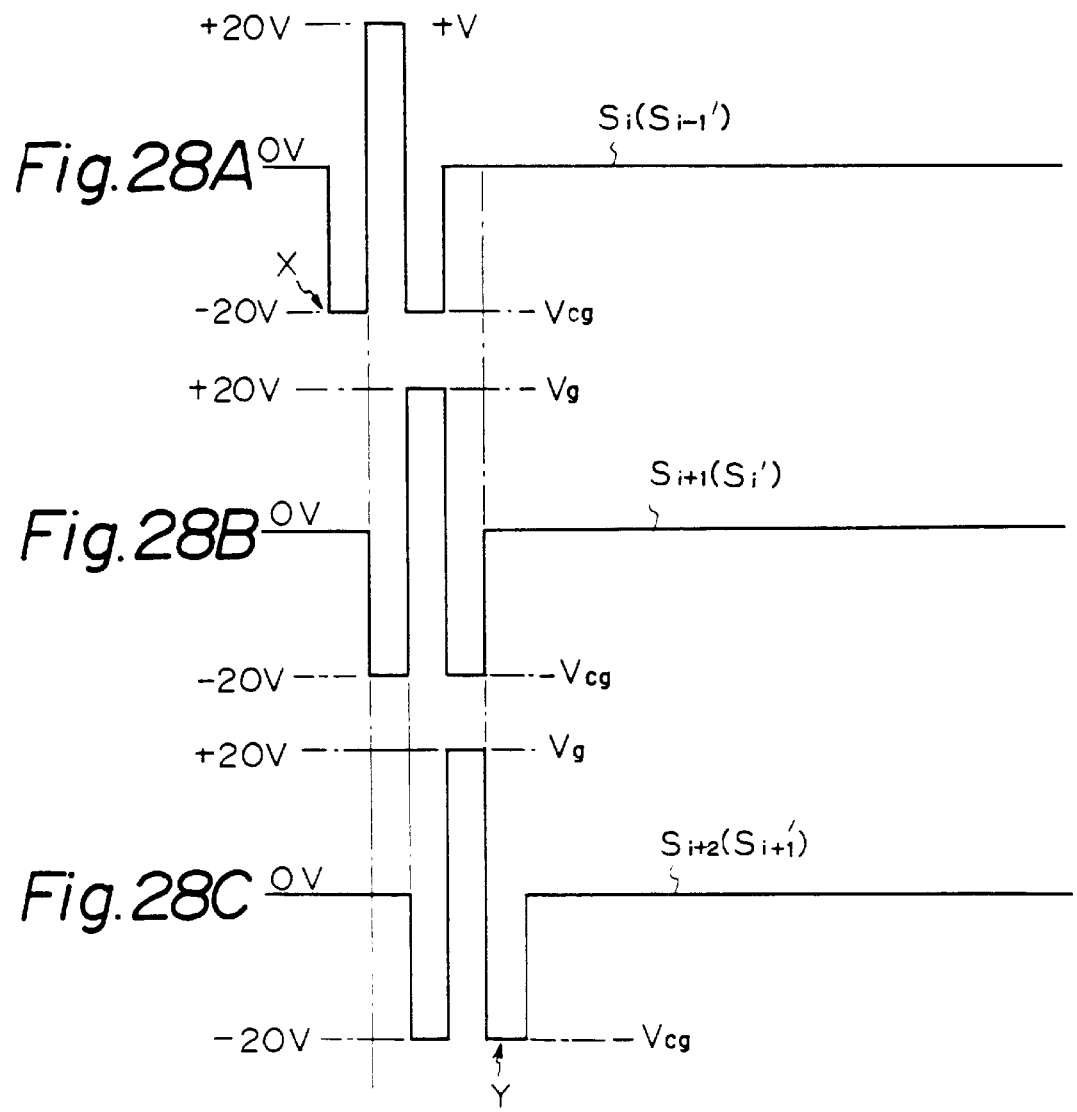

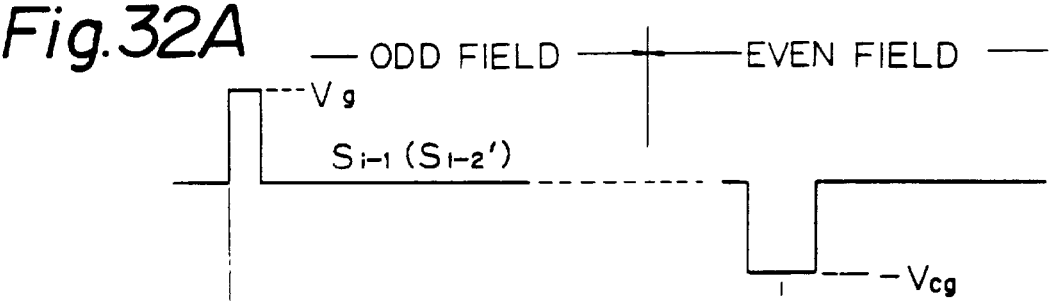
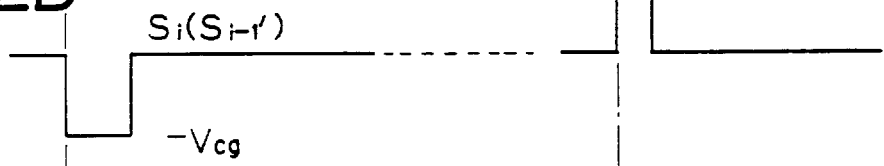
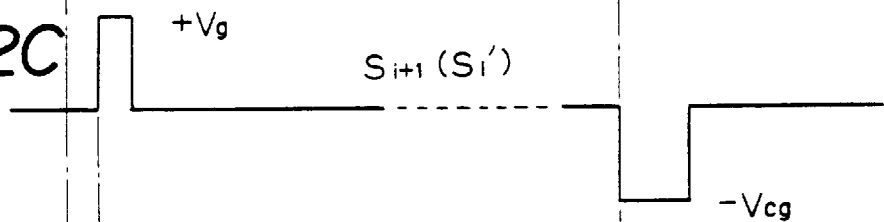
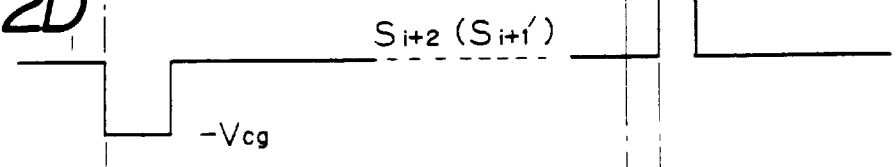
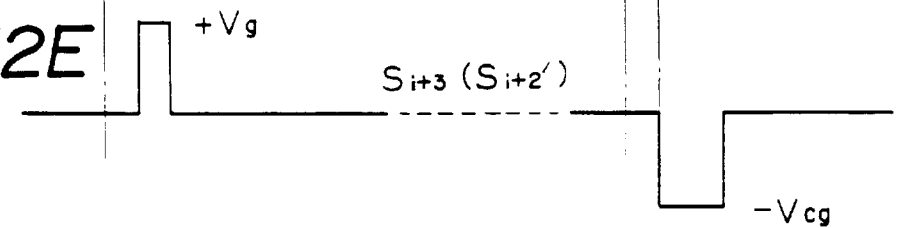

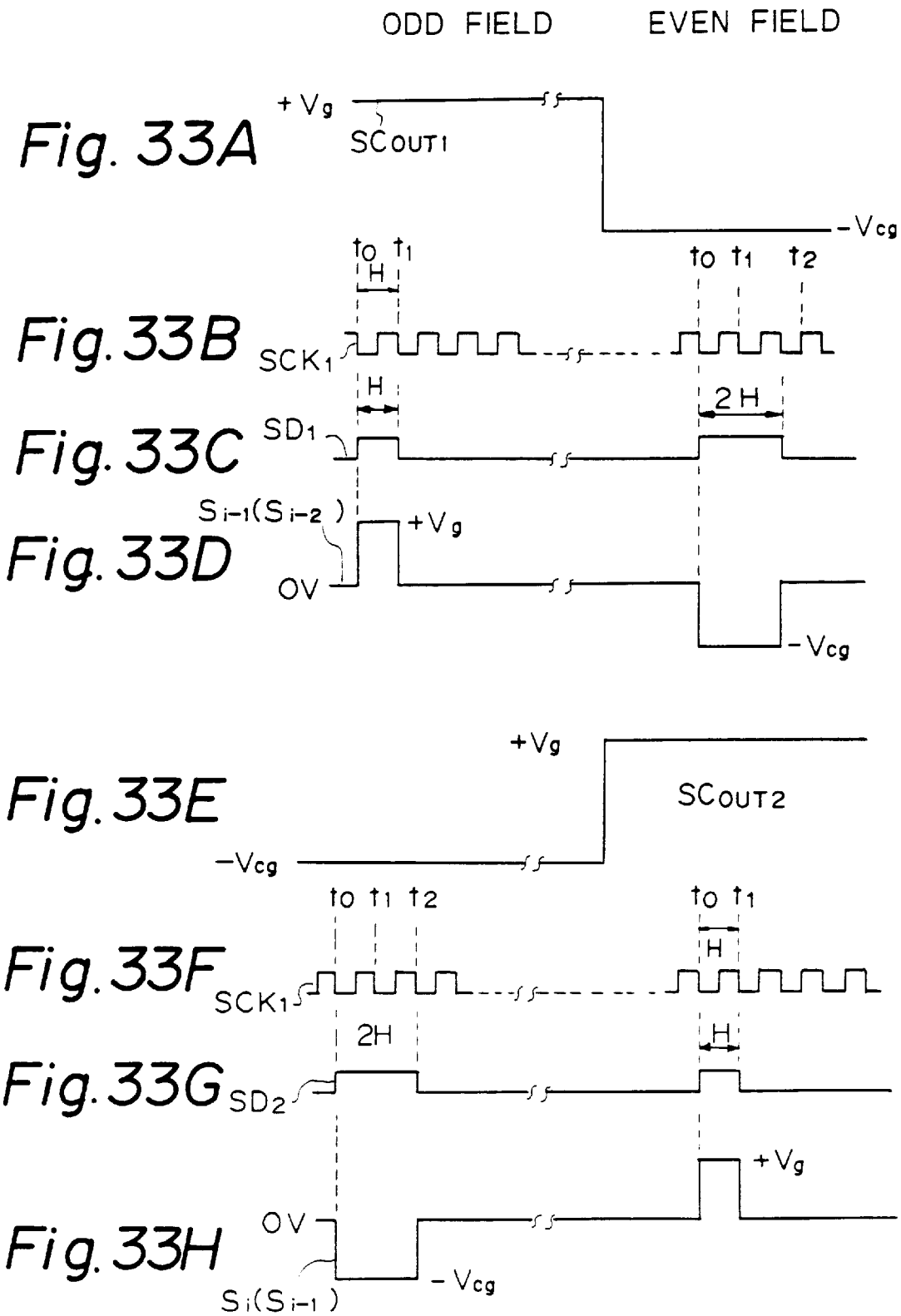

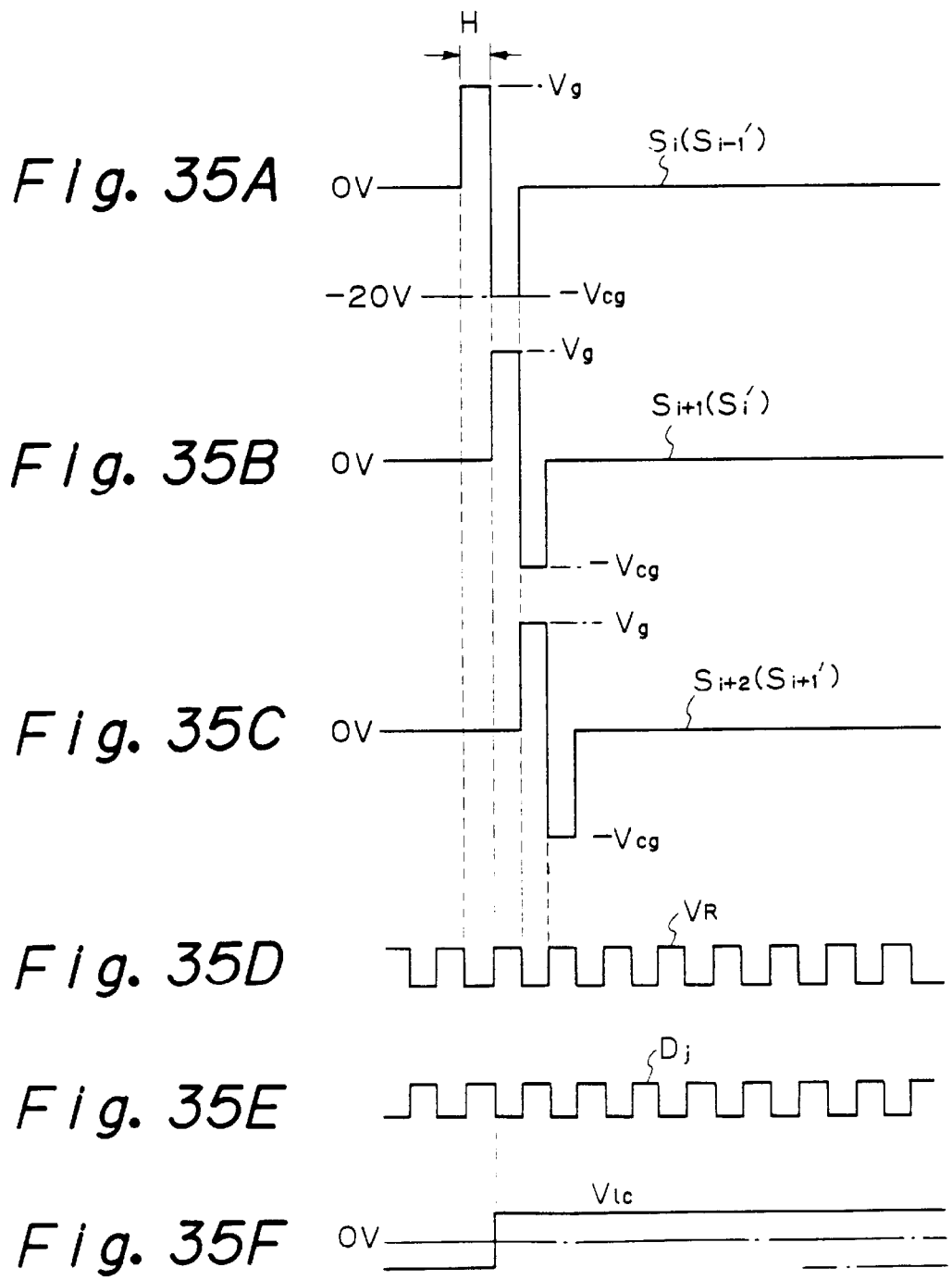

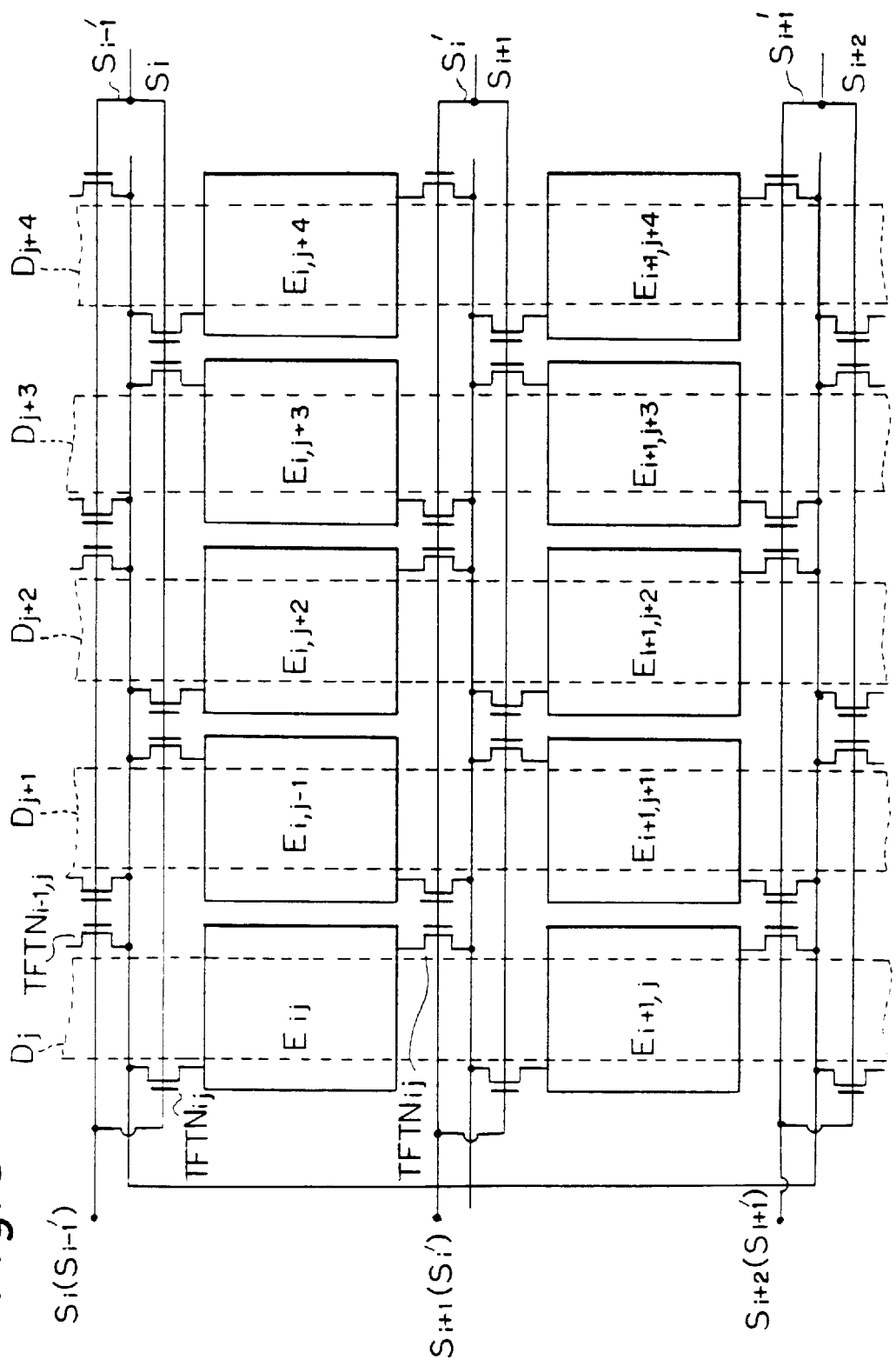

HIGH QUALITY ACTIVE MATRIX-TYPE DISPLAY DEVICE

This application is a continuation of application Ser. No. 08/443,006, filed May 17, 1995, now abandoned which application is a division of application Ser. No. 08/203,293, filed Mar. 1, 1994, now U.S. Pat. No. 5,432,527 a continuation of application Ser. No. 07/695,029, filed May 6, 1991, now abandoned.

BACKGROUND OF THE INVENTION

1. Field of the Invention

The present invention relates to an active matrix-type display device using an electro-optic material such as liquid crystal, and more particularly, to an active matrix-type display device without intersections between scan bus lines and data bus lines on the same substrate.

2. Description of the Related Art

An active matrix-type liquid crystal display device as well as a simple matrix-type liquid crystal display device is thin, and therefore, is often used in various display devices. In this active matrix-type liquid crystal display device, since individual pixel elements are independently driven, the contrast is not reduced based upon the reduction of the duty ratio, and the angle of visibility is not reduced, even when the display capacity is increased to increase the number of lines. Therefore, the active matrix-type liquid crystal display device can enable a color display in the same way as in a cathode ray tube (CRT), and is prevalent in flat display devices.

In the active matrix-type liquid crystal display device, however, since one thin film transistor as a switching element is provided for each pixel, a complex manufacturing process is required, and equipment therefor is expensive. Also, the manufacturing yield is low. Thus, the active matrix-type liquid crystal display device is very expensive. Therefore, a panel formed by an active matrix-type liquid crystal display device has to be of a small size.

Also, in order to improve the low manufacturing yield due to the complex configuration of the active matrix-type liquid crystal display device, there has been suggested a counter-matrix active matrix-type liquid crystal device in which scan bus lines and data bus lines are formed on different substrates, so that intersections of scan bus lines and data bus lines on the same substrate are not used (see: U.S. Pat. Nos. 4,694,287, 4,717,244, 4,678,282).

In any type of active matrix-type liquid crystal device, the liquid crystal voltage fluctuates due to the generation of a DC component therein, which reduces the quality of display. For example, flickers and residual images may be generated. Particularly, for a stationary image, a burning phenomenon may occur. Also, the life-time of active matrix-type liquid crystal devices may be shortened.

SUMMARY OF THE INVENTION

An object of the present invention is to improve the quality of display in an active matrix-type display device, particularly, such as a counter-matrix type display device.

According to the present invention, in an active matrix-type display device in which scan bus lines and data bus lines are formed on different substrates, two kinds of scan bus lines are provided. A first switching element, such as an N-channel type thin film transistor, is connected between a reference voltage supply line and a display electrode and is controlled by a first scan bus line and a second switching element, such as a P-channel type thin film transistor, is connected between the reference voltage supply bus line and the display electrode and is controlled by a second scan bus line. The first switching element is turned ON by a positive or negative potential at the first scan bus line.

Both of the first and second switching elements are operated to compensate for a DC component.

BRIEF DESCRIPTION OF THE DRAWINGS

The present invention will be more clearly understood from the description as set forth below with reference to the accompanying drawings, wherein:

FIGS. 6A, 6B, and 6C are timing diagrams showing the signals employed in the circuit of FIG. 5;

FIGS. 9A, 9B, and 9C are timing diagrams showing the signals employed in the circuit of FIG. 8;

FIGS. 10A through 10H are timing diagrams showing the signals in the circuit of FIG. 1 for generating the signals of FIGS. 9A and 9B;

FIGS. 15A through 15G are timing diagrams showing the signals employed in the circuit of FIG. 14;

FIGS. 18A through 18H are timing diagrams showing the signals employed in the circuit of FIG. 17;

FIGS. 21A through 21H are timing diagrams showing the signals employed in the circuit of FIG. 20;

FIGS. 22A through 22H are timing diagrams showing the signals employed in the circuit of FIG. 1 for generating the signals of FIGS. 21A and 21B;

FIGS. 28A, 28B, and 28C are modifications of FIGS. 25A, 25B, and 25C, respectively;

FIGS. 32A through 32E are modifications of FIGS. 25A, 25B, and 25C;

FIGS. 33A through 33H are timing diagrams showing the signals in the circuit of FIG. 1 for generating the signals of FIGS. 32A and 32B;

FIGS. 35A through 35F are timing diagrams showing the signals employed in the circuit of FIG. 34;

FIG. 36 is a circuit diagram illustrating a twelfth embodiment of the active matrix-type liquid crystal display device according to the present invention;

FIGS. 37A through 40A are layout diagrams explaining the manufacturing steps of the device of FIG. 36;

FIGS. 37B through 40B are cross-sectional views explaining the manufacturing steps of the device of FIG. 36;

FIGS. 42A through 45A are layout diagrams explaining the manufacturing steps of the device of FIG. 41;

FIGS. 42B through 45B, and FIGS. 42C through 45C are cross-sectional views explaining the manufacturing steps of the device of FIG. 41;

FIGS. 47A through 50A are layout diagrams explaining the manufacturing steps of the device of FIG. 46;

FIGS. 47B through 50B and FIGS. 47C through 50C are cross-sectional views explaining the manufacturing steps of the device of FIG. 46.

DESCRIPTION OF THE PREFERRED EMBODIMENTS

Before the description of embodiments of the present invention, prior art liquid crystal display devices will be explained with reference to FIGS. 1 through 4.

Figure 1:
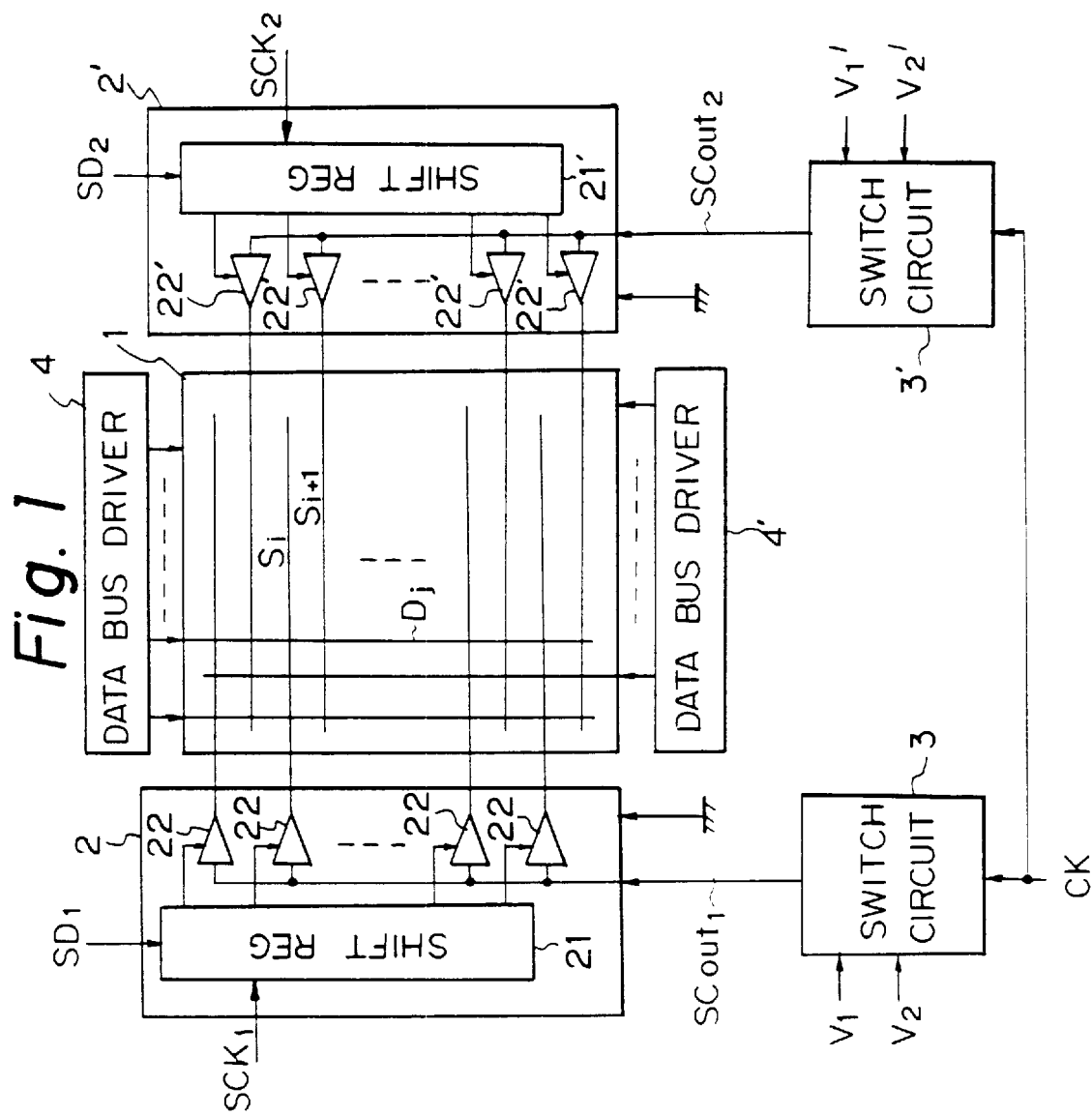
FIG. 1 is a block circuit diagram illustrating a general liquid crystal display device including control portions.

In FIG. 1, which illustrates a general liquid crystal display device including control portions, reference numeral 1 designates a liquid crystal panel having a plurality of scan bus lines $S_i$ (i=0, 1, 2, . . . ) and a plurality of data bus lines $D_j$ (j=0, 1, 2, . . . ) which are arranged in parallel with each other. The scan bus lines $S_i$ are scanned by two scan synchronization circuits 2 and 2', and the data bus lines $D_j$ are driven by two data bus drivers 4 and 4'. The scan synchronization circuit 2 (2') is formed by a shift register 21 for shifting a shift data $SD_1$ ($SD_2$) in accordance with a shift clock signal $SCK_1$ ($SCK_2$), and an analog switch 22 (22') which receives a rectangular wave signal $SC_{OUT1}$ ($SC_{OUT2}$) generated from a switch circuit 3(3'). The analog switches 22 (22') pass the rectangular wave signals $SC_{OUT1}$ ($SC_{OUT2}$) in accordance with the outputs of the shift register 21 (21'). Two voltages $V_1$ and $V_2$ ($V_1'$ and $V_2'$) are applied to the switch circuits 3 (3') for determining a maximum level and a minimum level of the output signal $SC_{OUT1}$ ($SC_{OUT2}$). Also, the two switch circuits 3 and 3' are operated in synchronization with each other by receiving a common clock signal CK.

Prior art liquid crystal display devices (panels) are explained with reference to FIGS. 2 and 3.

Figure 2:
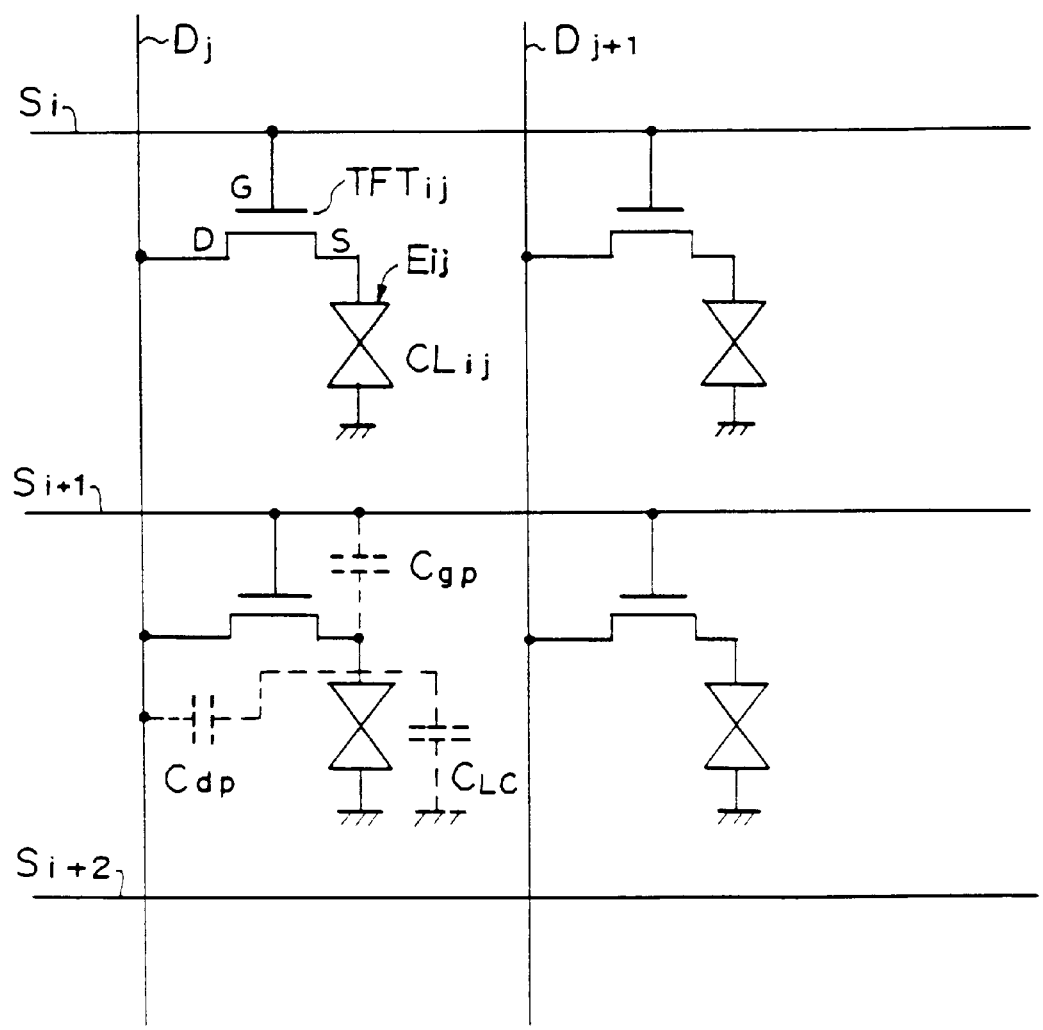
FIG. 2 is an equivalent circuit diagram illustrating a prior art active matrix-type liquid crystal device.

As illustrated in an equivalent circuit in FIG. 2, scan bus lines $S_i$, $S_{i+1}$, $S_{i+2}$, . . . and data bus lines $D_j$, $D_{j+1}$, . . . are perpendicularly formed on one of the two glass substrates (not shown) filled with a liquid crystal material therebetween, which substrates oppose each other. The scan bus lines $S_i$, $S_{i+1}$, $S_{i+2}$, . . . are electrically isolated from the data bus lines $D_j$, $D_{j+1}$, . . . at their intersections.

At one intersection of the scan bus line such as $S_i$ and the data bus line such as $D_j$, a thin film transistor $TFT_{ij}$ is connected between the data bus line $D_j$ and a display electrode of a liquid crystal cell $CL_{ij}$, and is controlled by a potential of the scan bus line $S_i$. That is, the thin film transistor $TFT_{ij}$ has a drain D connected to the data bus line $D_j$, a gate G connected to the scan bus line $S_i$, and a source S connected to a display electrode $E_{ij}$ of a liquid crystal cell $CL_{ij}$ whose other electrode is grounded by the common electrode (not shown) on the other glass substrate (not shown).

In the above-mentioned active matrix-type liquid crystal display device of FIG. 2, since the scan bus lines $S_i$, $S_{i+1}$, $S_{i+2}$, . . . and the data bus lines $D_j$, $D_{j+1}$, . . . are formed and intersect on the same substrate, insulation defects or short-circuits may occur at the intersections, and also disconnections due to a stepwise configuration at the intersections may occur in the overlaying bus lines. Therefore, there is a limit on the thickness of the underlying bus lines and the thickness of the insulating layer between the overlying and underlying bus lines. As a result, it is not easy to reduce the resistance of the underlying bus lines and increase the thickness of the insulating layers. Thus, it is difficult to completely avoid short-circuits at the intersections.

Figure 3:
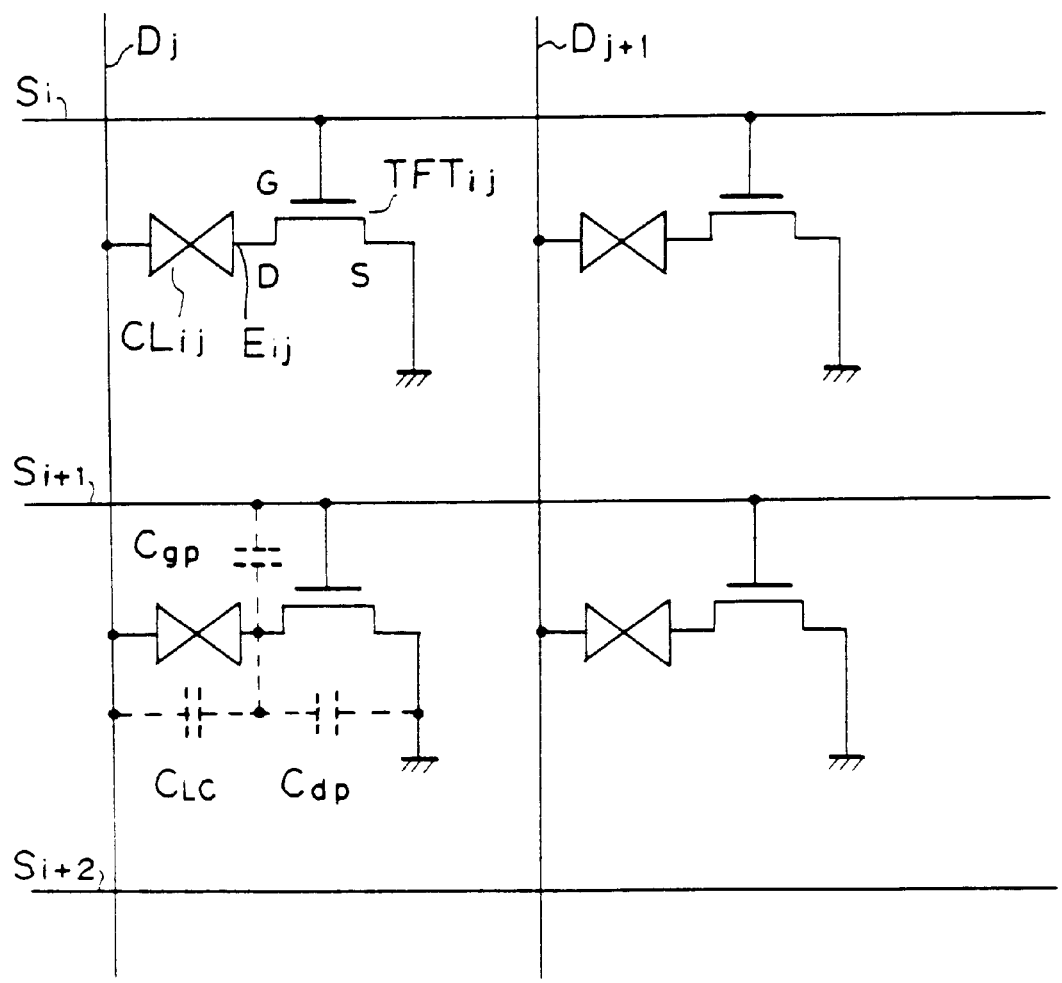
FIG. 3 is an equivalent circuit diagram illustrating a prior art counter-matrix active matrix-type liquid crystal device.
Figure 4:
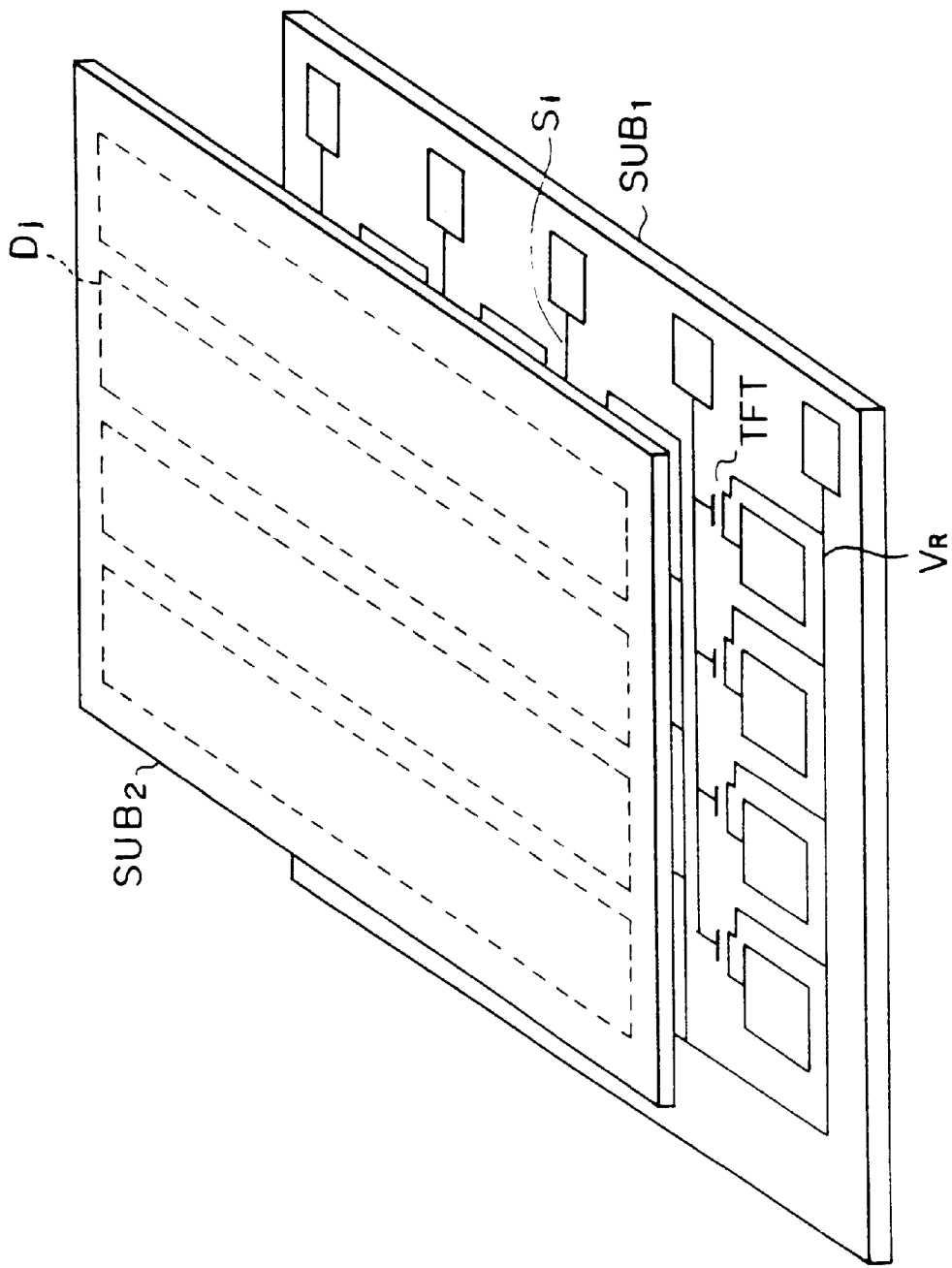
FIG. 4 is an exploded, perspective view of the device of FIG. 3.

Therefore, as illustrated in FIGS. 3 and 4, there has been suggested a counter-matrix active liquid crystal display device in which the scan bus lines $S_i$ are formed on one glass substrate $SUB_1$ and the data bus lines $D_j$ are formed on the other glass substrate $SUB_2$ which opposes the first substrate $SUB_1$.

Note that FIG. 3 is an equivalent circuit diagram of a prior art counter matrix active liquid crystal display device, and FIG. 4 is its exploded, perspective view.

That is, liquid material is filled between the glass substrates $SUB_1$ and $SUB_2$. The striped data bus lines $D_j$, $D_{j+1}$, . . . are formed on the glass substrate $SUB_2$, while the san bus lines $S_i$, $S_{i+1}$, ..., the thin film transistors such as $TFT_{ij}$, display electrodes such as $E_{ij}$ for forming liquid crystal cells such as $CL_{ij}$, and reference voltage supplying bus lines $V_r$ (which are illustrated as the ground potential in FIG. 3), are formed on the glass substrate $SUB_1$.

Liquid crystal material is filled between the data bus lines $D_j$, $D_{j+1}$, ... and the display electrodes $E_{ij}$, ... to form the liquid crystal cells $CL_{ij}$, .... For example, the liquid crystal cell $CL_{ij}$ is connected between the data bus line $D_j$ and the drain D of the thin film transistor $TFT_{ij}$ whose gate G is connected to the scan bus line $S_i$. Also, the source S of the thin film transistor $TFT_{ij}$ is connected to the reference voltage supply bus line.

In the above-mentioned configuration, of FIGS. 3 and 4, the data bus lines $D_j$, $D_{j+1}$, ... and the scan bus lines $S_i$, $S_{i+1}$, ... are orthogonal to each other and they sandwich the liquid crystal, material therebetween so it is unnecessary to form insulating layers for the intersections since the two kinds of bus lines are not formed on the same substrate. This makes the configuration simple. Also, since no short-circuit occurs between the data bus lines $D_j$, $D_{j+1}$, ... and the scan bus lines $S_i$, $S_{i+1}$, ..., defects of display are reduced thereby improving the manufacturing yield.

A shift voltage $\Delta V_{lc}$ may be generated at the display electrode $E_{ij}$ in the active matrix-type liquid crystal display devices of FIG. 2 and FIGS. 3 and 4.

In the active matrix-type liquid crystal device of FIG. 2, if $C_{gp}$ is a parasitic electrostatic capacity between the scan bus line $S_i$ to which the gate G of the thin film transistor $TFT_{ij}$ is connected and the display electrode $E_{ij}$;

$C_{dp}$ is a parasitic electrostatic capacity between the display electrode $E_{ij}$ and the data bus line $D_j$, i.e., a parasitic electrostatic capacity between the source and drain D of the thin film transistor $TFT_{ij}$;

$C_{LC}$ is an electrostatic capacity of the liquid crystal cell $CL_{ij}$, then $$\Delta V_{lc} = \Delta V_D C_{dp}/(C_{gp}+C_{dp}+C_{LC}) \quad (1)$$

where $\Delta V_D$ is a fluctuation of the potential at the data bus line $D_j$, i.e., the amplitude thereof.

Conversely, in the active matrix-type liquid crystal device of FIGS. 3 and 4, $$\Delta V_{lc} = \Delta V_D \cdot (C_{gp}+C_{cp})/(C_{gp}+C_{dp}C_{LC}) \quad (2)$$

where $V_{dp}$ is a parasitic electrostatic capacity between the display electrode $E_{ij}$ and the reference voltage supplying bus line (ground).

Thus, when the data bus line $D_i$ uses a positive voltage and a negative voltage which are changed symmetrically for an odd frame and an even frame, the effective voltage applied to the liquid crystal cell $CL_{ij}$ is not symmetrical with respect to the positive voltage and the negative voltage, thus creating a DC component. In the liquid crystal voltage $V_{lc}$.

The above-mentioned DC component generates a flicker, i.e., a residual image in a stationary image, thus reducing the quality of display, and also reducing the life time of the active-type liquid crystal display device (panel).

To cope with this, a bias voltage is applied to the common electrode (ground) of the liquid crystal cell $C_{ij}$, for example, to make the effective voltage of the liquid crystal cell $C_{ij}$ symmetric for a positive frame and a negative frame, thus reducing the DC component. In this device, however, since the capacity $C_{lc}$ of the liquid crystal cell has a voltage dependency due to the anisotropy of dielectric characteristics of the liquid crystal cell $C_{ij}$, the shift voltage $\Delta V_{lc}$ fluctuates in accordance with the display state of the liquid crystal cell $CL_{ij}$, and as a result, there is a limit to the effective removal of the DC component by only applying a bias voltage to the common electrode.

As another measure, there has been suggested an active-type liquid crystal panel where two complementary thin film transistors are used for one pixel electrode, and a scan signal having opposite polarities for every frame is applied to the gate electrodes of the thin film transistors thus making the effective voltage applied to the liquid crystal cell symmetrical (see: JP-A-No. 53-144297).

Also, in this device, the shift voltage $\Delta V_{lc}$ is entirely canceled by the scan signal having opposite polarities which are changed for each frame, but, in each frame, the shift voltage $\Delta V_{lc}$ is still present.

Further, in view of the above-mentioned formulae (1) and (2), the shift voltage $\Delta V_{lc}$ in the counter-matrix-type device of FIGS. 3 and 4 is larger than the shift voltage $\Delta V_{lc}$ in the device of FIG. 2, due to the parasitic electrostatic capacity $C_{gp}$. Thus, the counter-matrix type device has a problem in that crosstalk is large. That is, in the counter matrix-type device, when the thin film transistor $TFT_{ij}$ is turned OFF, the data voltage sequentially applied to the data bus line $D_j$ is applied to the liquid crystal cell $C_{ij}$ via the parallel electrostatic capacities $C_{gp}$ and $C_{dp}$, and therefore, the other data voltage for other liquid crystal cells fluctuates the liquid crystal cell voltage $V_{lc}$, thus reducing the quality of display.

Also, in the conventional active matrix type liquid crystal display device of FIG. 2, it is possible to lessen the ratio $\Delta V_{lc}/\Delta V_D$ by adding a storage capacity to the liquid crystal cell. Conversely, in the counter matrix type active liquid crystal display device of FIGS. 3 and 4, it is difficult to lessen the ratio $\Delta V_{lc}/\Delta V_D$, since it is difficult to add such storage capacity to the liquid crystal cell. Further, due to the difficulty of addition of such a storage capacity, the level shift of a DC voltage immediately after the selection of the scan bus line $S_i$ connected to the gate G of the thin film transistor $TFT_{ij}$ causes a residual image phenomenon. Particularly, for a stationary image, a burning phenomenon occurs which reduces the quality of display.

Figure 5:
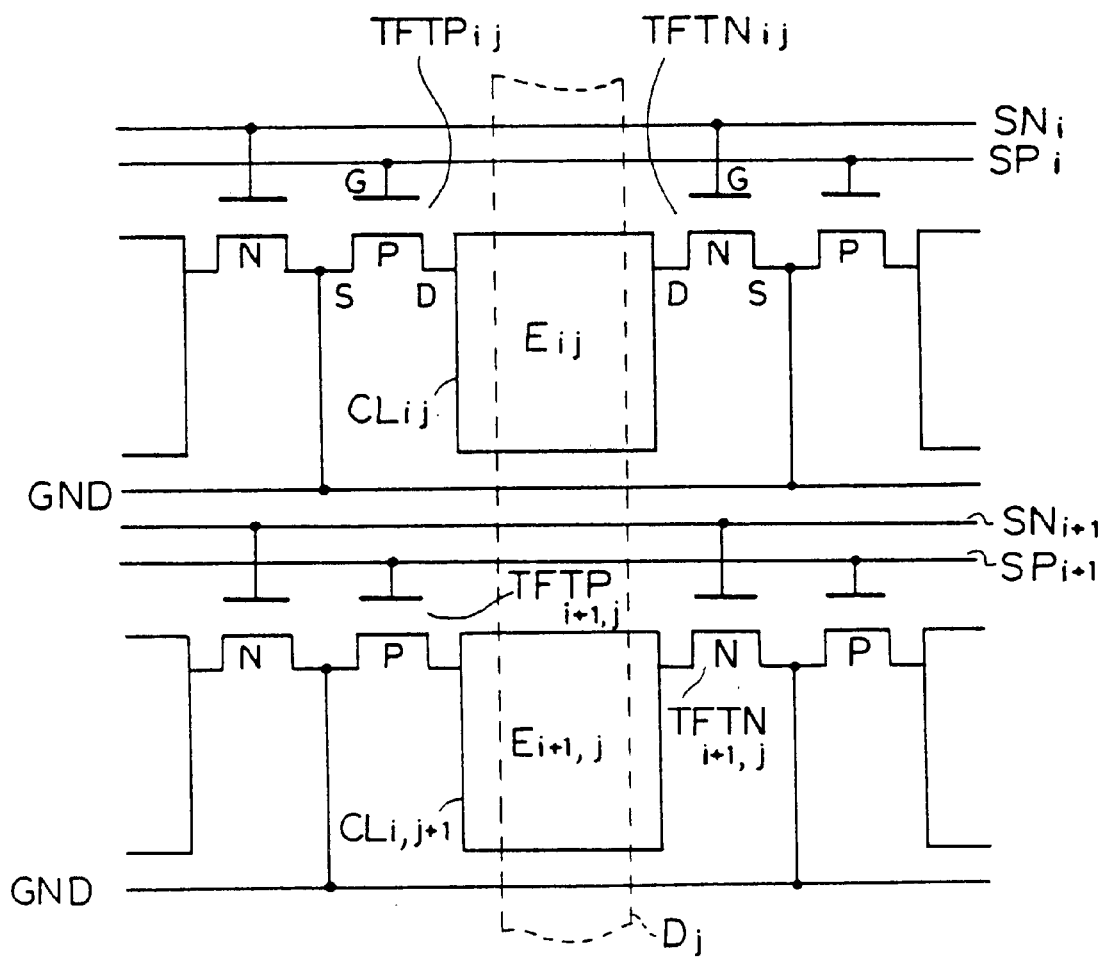
FIG. 5 is a circuit diagram illustrating an embodiment of the active matrix-type crystal display device according to the present invention.

In FIG. 5, which is a first embodiment of the counter-matrix-type display device according to the present invention, a plurality of pairs of scan bus lines $SN_i$, $SP_i$; $SN_{i+1}$, $SP_{i+1}$; ... and a plurality of data bus lines $D_j$, ... are perpendicularly arranged with each other on different glass substrates having liquid crystal filled therebetween. Also, display (pixel) electrodes $E_{ij}$, $E_{i+1}$, ... are arranged within pixel areas in a matrix partitioned by the scan bus lines $SN_i$, $SP_i$, ... and the data bus lines $D_j$, ...

Further, reference voltage supply lines, which are in this case grounded (GND) are arranged in parallel with the scan bus lines $SN_i$, $SP_i$, ...

Liquid crystal cells $CL_{ij}$, ... are formed by the display electrodes $E_{ij}$ with the liquid crystal material.

In order to control each of the liquid crystal cells $CL_{ij}$, two kinds of thin film transistors, i.e., an N-channel type thin film transistor TFT $N_{ij}$ and a P-channel type thin film transistor $TFTP_{ij}$ are provided for each liquid crystal cell $CL_{ij}$.

These can be formed by a semiconductor region made of amorphous silicon or polycrystalline silicon, and source/drain electrode portions which are, for example, P-type semiconductors obtained by doping impurities such as boron, or N-type semiconductors obtained by doping impurities such as phosphorus or arsenic. Also, when manufacturing thin film transistors, photo resist material, an oxidation film, and nitride film are used as masks, and boron and arsenic are doped individually by ion plantation or diffusion into the semiconductor regions for the source/drain portions, to form the two kinds of thin film transistors.

There are two scan bus lines $SN_i$ and $SP_i$ for one scan line or row of display electrodes. The gate G of the N-channel thin film transistor $TFTN_{ij}$ is connected to the scan bus line $SN_i$, and the gate G of the P-channel thin film transistor $TFTP_{ij}$ is connected to the scan bus line $SP_i$.

Also, the drains D of the thin film transistors $TFTN_{ij}$ and $TFTP_{ij}$ are connected to the display electrode $E_{ij}$ of the liquid crystal cell $CL_{ij}$, and the sources S of the thin film transistors $TFTN_{ij}$ and $TFTP_{ij}$ are connected to the reference voltage supply line GND.

The signals of the scan bus lines $SN_i$ and $SP_i$, and the data bus line $D_j$ of FIG. 5 are shown in FIGS. 6A, 6B, and 6C.

The signals of the scan bus lines $SN_i$ and $SP_i$ are pulse signals in synchronization having opposite polarities to each other, and their amplitudes are $V_{GN}$ and $V_{GP}$, respectively. That is, the signal of the scan bus line $SN_i$ is a pulse signal having a voltage $+V_{GN}$, and the signal of the scan bus line $SP_i$ is a pulse signal having a voltage $-V_{Gp}$.

The signals of the scan bus lines $SN_i$ and $SP_i$ are delayed by using the shift registers 21 and 21' of the scan synchronization circuits 2 and 2' of FIG. 1 for one horizontal scanning time period it, and are sequentially applied to the downstream side scan bus lines $SN_{i+1}$, $SP_{i+1}$, . . . , thus scanning all of the scan bus lines.

That is, as shown in FIGS. 6A and 6B, the signals applied to the scan bus lines $SN_i$ and $SP_i$ are generated from time $t_0$ to time $t_1$, the signals applied to the scan bus lines $SN_{i+1}$ and $SP_{i+1}$ generated from time $t_1$ to time $t_2$, and so on.

As shown in FIG. 6C, the signal of the data bus line $D_j$ having an amplitude $V_D$ is generated at the same or approximately same timing as that of signals of the scan bus lines $SN_i$ and $SP_i$. However, the polarity of the signal of the data bus line $D_j$ is reversed for every frame.

Also, the pulse-width of the signal of the data bus line $D_j$ is preferably broader than that of the signals of the scan bus lines $SN_i$ and $SP_i$, but, the present invention is not limited to this.

The thin film transistors $TFTN_i$ and $TFTP_i$ at each pixel are simultaneously turned ON by the signals of the scan bus lines $SN_i$ and $SP_i$, and therefore, the data of the data bus line $D_j$ is written into the liquid crystal cell $CL_{ij}$.

At this time, the voltages $+V_{GN}$ and $-V_{GP}$ are determined so as to satisfy the following relationship:

$$(C_{gPN}+C_{dPN}) \cdot V_{GN}=(C_{gPP}+C_{dPP}) \cdot V_{GP} \quad (3)$$

where $C_{gPN}$ is a parasitic electrostatic capacity between the scan bus line $SN_i$ and the display electrode $E_{ij}$;

$C_{dPN}$ is a parasitic electrostatic capacity between the gate-source of the N-channel type transistor $TFTN_i$;

$C_{gPP}$ is a parasitic electrostatic capacity between the scan bus line $SP_i$ and the display electrode $E_{ij}$; and $C_{dPP}$ is a parasitic electrostatic capacity between the gate-source of the P-channel type transistor $TFTP_i$.

Therefore, the level shift voltage $\Delta V_{1CN}$ by the N-channel type thin film transistor $TFTN_{ij}$ is counteracted by the level shift voltage $\Delta V_{eCN}$ by the P-channel type thin film transistor $TFTP_{ij}$ in accordance with the above-mentioned formula (2). As a result, the total level shift voltage $\Delta V_{lc}$ becomes zero.

Thus, the voltage $\pm V_D$ written into the liquid crystal cell $CL_{ij}$ is maintained until the next scan signals are applied to the scan bus lines $SN_i$ and $SP_i$.

Thus, the generation of a DC component in the AC voltage applied to the liquid crystal cell $C_{ij}$ is avoided.

Figure 7A:
FIGS. 7A through 7H are timing diagrams showing the signals in the circuit of FIG. 5 for generating the signals of FIGS. 6A and 6B.
Figure 7B:
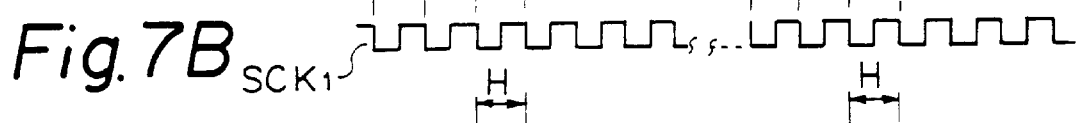
Figure 7C:
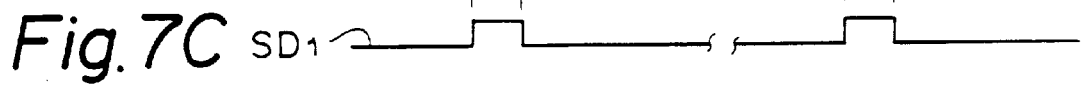
Figure 7D:
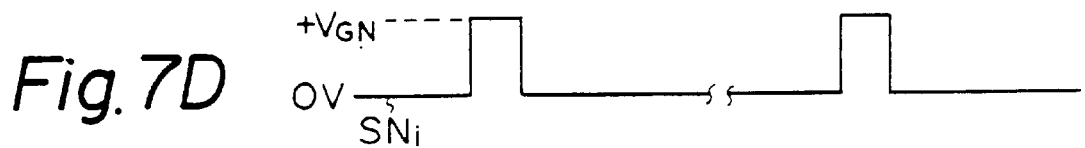
Figure 7E:
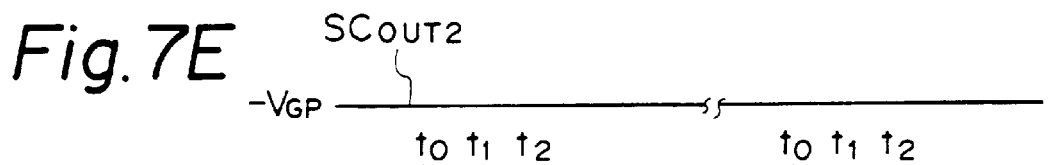
Figure 7F:
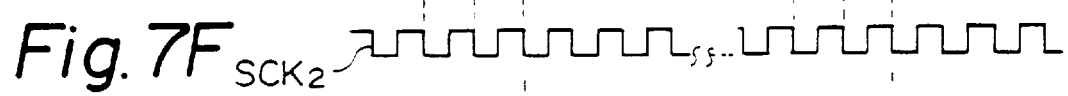
Figure 7G:
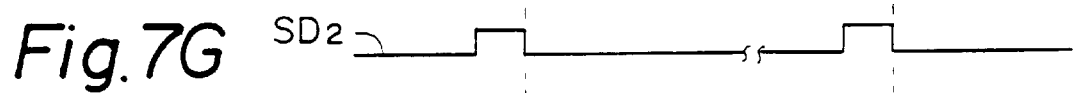
Figure 7H:
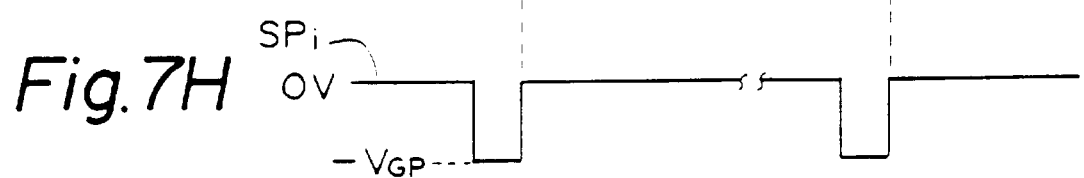

The scan signals applied to the scan bus lines $SN_i$ and $SP_i$ of FIGS. 6A and 6B are generated by the synchronization circuits 2 and 2' and the switch circuit 3 and 3' of FIG. 1. That is, the switch circuit 3 generates a signal $S_{COUT1}$ as shown in FIG. 7A, and the switch circuit 3' generates a signal $SC_{OUT2}$ as shown in FIG. 7E. In this case, the voltages $V_1$ and $V_2$ of the switch circuit 3 are $+V_{GN}$ and $-V_{GP}$, respectively, and the voltages $V_1'$ and $V_2'$ of the switch circuit 3' are also $+V_{GN}$ and $-V_{GP}$, respectively. Shift data $SD_1$ as shown in FIG. 7C is supplied to the shift register 22, and shift data $SD_2$ as shown in FIG. 7G is supplied to the shift register 22'. Such shift data $SD_1$ and $SD_2$ are shifted within the shift registers 22 and 22', respectively, in synchronization with shift clock signals $SCK_1$ and $SCK_2$ as shown in FIGS. 7B and 7F, respectively. As a result, the signals applied to the scan bus lines $SN_i$ and $SP_i$ are obtained as shown in FIGS. 7D and 7H, respectively.

Figure 8:
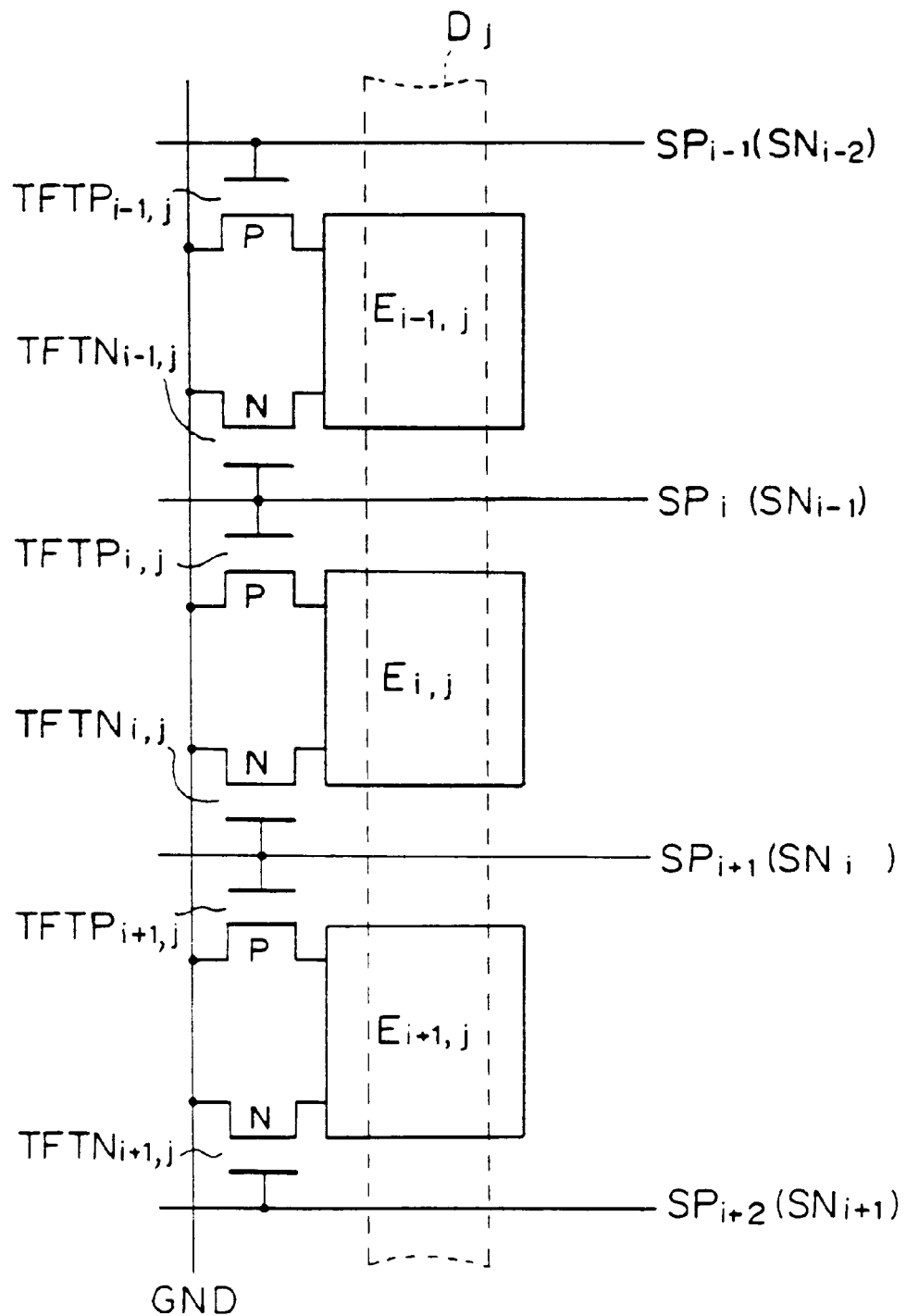
FIG. 8 is a circuit diagram illustrating a second embodiment of the active matrix-type liquid crystal display device according to the present invention.

In FIG. 8, which is a second embodiment of the counter-matrix-type display device according to the present invention, only one scan bus line is provided for each line. That is, a scan bus line $SP_{i-1}$ ($SN_{i-2}$) is connected to the gate of the P-channel thin film transistor $TFTP_{i-1}$ and to the gate of the N-channel thin film transistor $TFTN_{1-2}$ (not shown). Similarly, a scan bus line SPi ($SN_{i-1}$) is connected to the gate of the P-channel thin film transistor $TFTP_i$ and to the gate of the N-channel thin film transistor $TFTN_{i-1}$.

In other words, the gate of the P-channel thin film transistor $TFTP_i$ connected to one display electrode $E_{ij}$ is connected to a scan bus line $SP_i$ ($SN_{i-1}$), while the gate of the N-channel thin film transistor $TFTN_1$ connected to the same display electrode $E_{ij}$ is connected to a different scan bus line $SP_{i+1}$ ($SN_i$).

The signals of the scan bus lines $SP_{i-1}$ ($SN_{i-2}$), $SP_i$ ($SN_{i-1}$), and $SP_{i+1}$ ($SN_i$) are shown in FIGS. 9A, 9B, and 9C, respectively.

These signals are pulse signals having opposite polarities to each other, and their amplitudes are $V_{GN}$ and $V_{GP}$, respectively.

Also, each of the signals of the scan bus lines $SP_{i-1}$ ($SN_{i-2}$), $SP_i$ ($SN_{i-1}$), $SP_{i+1}$ ($SN_i$) , . . . are sequentially delayed by one horizontal scan time period H. A positive signal component of its previous scan bus such as $SP_i$ ($SN_{i-1}$) is in synchronization with a positive signal component of its following scan bus line such as $SP_{i+1}$ ($SN_i$). Also, a negative signal component of one scan bus line such as $SP_i$ ($SN_{i-1}$) is in synchronization with a positive signal component of its following scan bus line such as $SP_{i+1}$ ($SN_i$). Therefore, for example, the N-channel thin film transistor $TFTNk_{i-1j}$ is turned ON from time $t_0$ to time $t_1$, and also, the P-channel thin film transistor $TFTP_{i-1j}$ is turned ON from time $t_0$ to time $t_1$.

Thus, both the N-channel and P-channel thin film transistors such as $TFTN_{i-1j}$ and $TFTP_{i-1j}$ connected to one display electrode such as $E_{i-1j}$, are simultaneously turned ON. Therefore, if the voltages $+V_{GN}$ and $-V_{GP}$ are determined so as to satisfy the above-mentioned formula (3), and the shift voltage $\Delta V_{lc}$ is zero, thereby avoiding the generation of a DC component in the AC voltage applied to the liquid crystal cell $CL_{ij}$.

Note that, for the liquid crystal cell $CL_{ij}$ (the display electrode $E_{ij}$), the shift voltage $\Delta V_{lc}$ is not zero at time $t_2$ when both of the thin film transistors $TFTN_{ij}$ and $TFTP_{ij}$ are turned OFF, however, this shift voltage $\Delta V_{lc}$ finally becomes zero at time $t_3$.

The signals of the scan bus lines $SP_{i-1}$ ($SN_{i-2}$) are delayed by using the shift registers 21 and 21' of the scan synchronization circuits 2 and 2' of FIG. 1 and are sequentially applied to the downstream side scan bus lines $SP_i$ ($SN_{i-1}$) $SP_{i+1}$ ($SN_i$) . . . , thus scanning all of the scan bus lines.

Figure 10A:
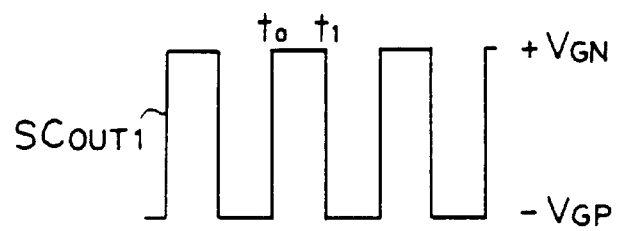
Figure 10B:
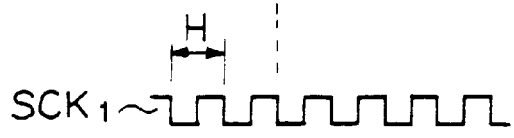
Figure 10D:
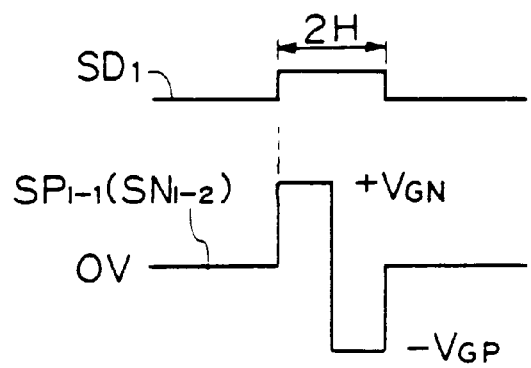
Figure 10E:
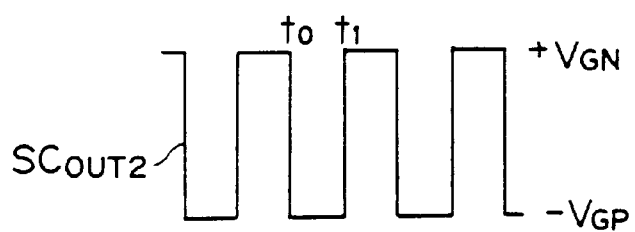
Figure 10F:
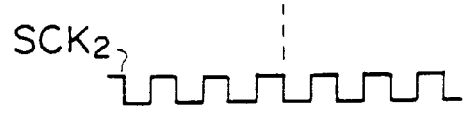
Figure 10G:
Figure 10H:
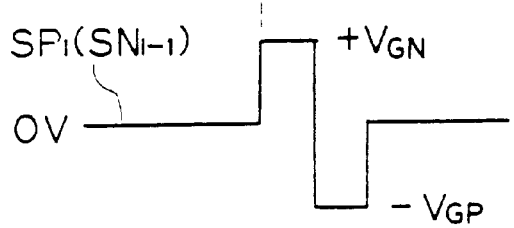

The scan signals applied to the scan bus lines $SP_{i-1}$ ($SN_{i-2}$) and $SP_i$ ($SN_{i-1}$) of FIGS. 9A and 9B are generated by the synchronization circuits 2 and 2' and the switch circuit 3 and 3'. That is, the switch circuit 3 generates a signal $SC_{OUT1}$ as shown in FIG. 10A, and the switch circuit 3' generates a signal $SC_{OUT2}$ as shown in FIG. 10E. In this case, the voltages $V_1$ and $V_2$ of the switch circuit 3 are $+V_{GN}$ and $-V_{GP}$, respectively, and the voltages $V_1'$ and $V_2'$ of the switch circuit 3' are also $+V_{GN}$ and $-V_{GP}$, respectively. Shift data $SD_1$ as shown in FIGS. 10C is supplied to the shift register 22, and shift data $SD_2$ as shown in FIG. 10G is supplied to the shift register 22'. Such shift data $SD_1$ and $SD_2$ are shifted within the shift registers 22 and 22', respectively, in synchronization with shift clock signals $SCK_1$ and $SCK_2$ as shown in FIGS. 10B and 10F, respectively. As a result, the signals applied to the scan bus lines $SP_{i-1}$ ($SN_{i-2}$) and $SP_i$ ($SN_{i-1}$) are obtained as shown in FIGS. 10D and 10H, respectively.

Also, according to the active-type liquid crystal display device of FIG. 8, since the number of scan bus lines is reduced by ½, areas occupied by the scan bus lines and the connections therefor are reduced, to simply the configuration of a substrate, a control circuit, and the like.

Figure 11:
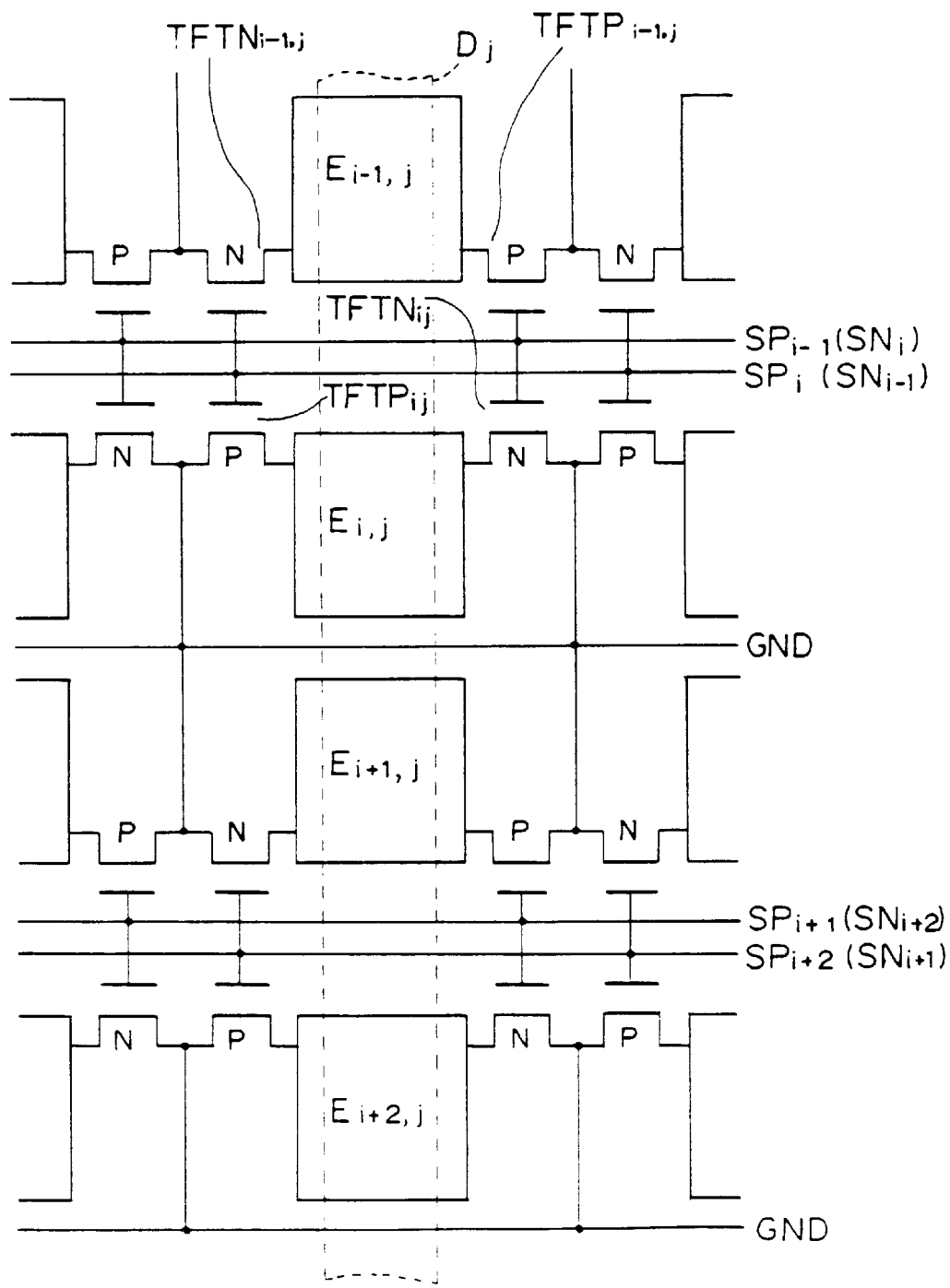
FIG. 11 is a circuit diagram illustrating a third embodiment of the active matrix-type liquid crystal display device according to the present invention.

In FIG. 11, which is a third embodiment of the counter-matrix-type display device according to the present invention, the active matrix-type liquid crystal display device of FIG. 5 is modified to reduce the number of scan bus lines. That is, the scan bus lines $SP_i$ and $SN_i$ are combined with the adjacent scan bus lines $SN_{i-1}$ and $SP_{i-1}$, respectively, the scan bus lines $SP_{i+1}$ and $SN_{i+1}$ are combined with the adjacent scan bus lines $SN_i$ and $SP_i$, respectively, and so on.

Therefore, pairs of scan bus lines such as $SP_{i-1}$ ($SN_i$) and $SP_i$ ($SN_{i-1}$) are arranged for every two rows of the liquid crystal cells.

Figure 12A:
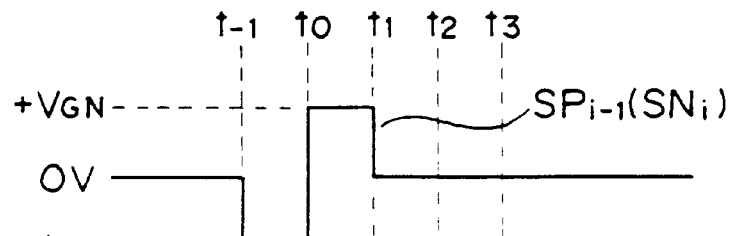
FIGS. 12A, 12B, 12C, and 12D are timing diagram showing the signals employed in the circuit of FIG. 11.
Figure 12B:
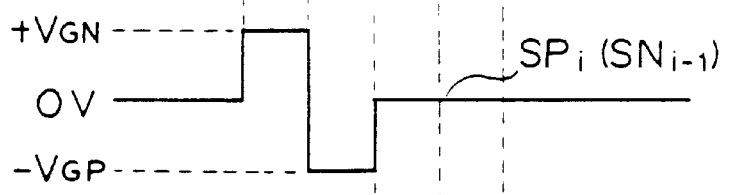
Figure 12C:
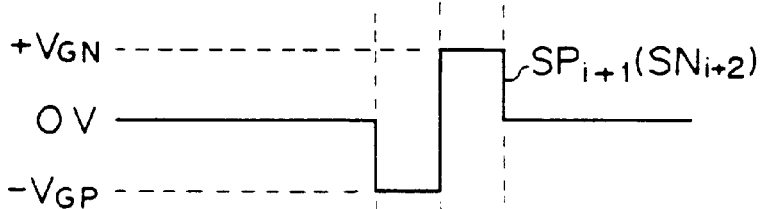
Figure 12D:
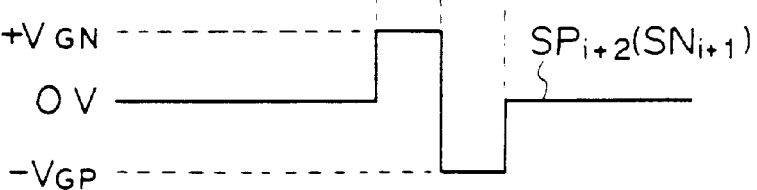

The pair of the signals of the scan bus lines $SP_{i-1}$ ($SN_i$) and $SP_i$ ($SN_{i-1}$) are in synchronization with each other as shown in FIGS. 12A and 12B, but their polarities are opposite. Also, the pair of the signals of the scan bus lines $SP_{i+1}$ ($SN_{i+2}$) and $SP_{i+2}$ ($SN_{i+1}$) are in synchronization with each other as shown in FIGS. 12C and 12D, but their polarities are opposite.

For example, from time $t_{-1}$ to time $t_0$, a negative portion of the signal of the scan bus line $SP_{i-1}$ ($SN_i$) corresponds to a positive portion of the signal of the scan bus line $SP_i$ ($SN_{i-1}$), while from time $t_0$ to time $t_1$, a positive portion of the signal of the scan bus line $SP_{i-1}$ ($SN_i$) corresponds to a negative portion of the signal of the scan bus line $SP_i$ ($SN_{i-1}$). As a result, from time $t_{-1}$ to time $t_0$, the P-channel thin film transistor $TFTP_{i-1,j}$ and the N-channel thin film transistor $TFTN_{i-1,j}$ are simultaneously turned ON, and from time $t_0$ to time $t_1$, the N-channel thin film transistor $TFTN_{ij}$ and the P-channel thin film transistor $TFTP_{ij}$ are simultaneously turned ON.

Similarly, from time $t_1$ to time $t_2$, a negative portion of the signal of the scan bus line $SP_{i-1}$ ($SN_{i+2}$) corresponds to a positive portion of the signal of the scan bus line $SP_{i+2}$ ($SN_{i+1}$), while from time $t_2$ to time $t_3$, a positive portion of the signal of the scan bus line $SP_{i+1}$ ($SN_{i+2}$) corresponds to a negative portion of the signal of the scan bus line $SP_{i+1}$ ($SN_{i+1}$). As a result, from time $t_1$ to time $t_2$, the P-channel thin film transistor $TFTP_{i+1,j}$ and the N-channel thin film transistor $TFTN_{i+1,j}$ are simultaneously turned ON, and from time $t_2$ to time $t_3$, the N-channel thin film transistor $TFTN_{i+2,j}$ and the P-channel thin film transistor $TFTP_{i+2,j}$ are simultaneously turned ON.

The pair of the signals of the scan bus lines $SP_{i-1}$ ($SN_i$) and $SP_i$ ($SN_{i-1}$) are delayed for two horizontal scanning time periods 2H to obtain the signals of the pair of the scan bus lines $SP_{i+1}$ ($SN_{i+2}$) and $SP_{i+2}$ ($SN_{i+1}$).

Figure 13A:
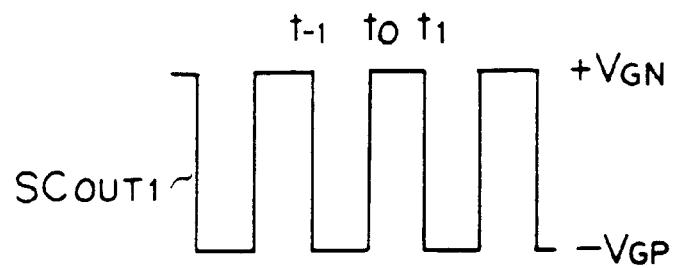
FIGS. 13A through 13H are timing diagrams showing the signals employed in the circuit of FIG. 1 for generating the signals of FIGS. 12A and 12B.
Figure 13B:
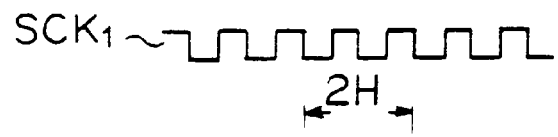
Figure 13C:
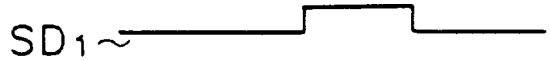
Figure 13D:
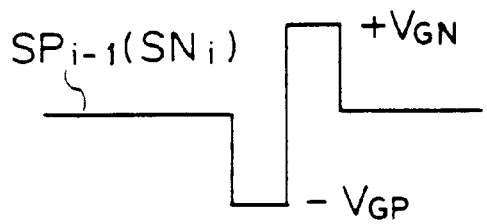
Figure 13E:
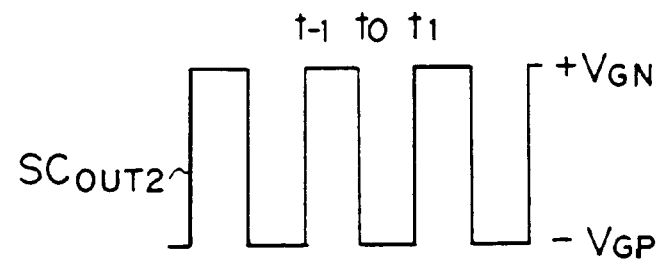
Figure 13F:
Figure 13G:
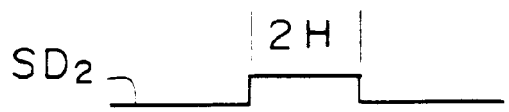
Figure 13H:
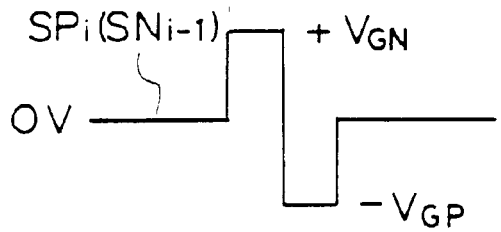

The scan signals applied to the scan bus lines $SP_{i-1}$ ($SN_i$) and $SP_i$ ($SN_{i-1}$) of FIGS. 12A and 12B are generated by the synchronization circuits 2 and 2' and the switch circuit 3 and 3'. That is, the switch circuit 3 generates a signal $SC_{OUT1}$ as shown in FIG. 13A, and the switch circuit 3' generates a signal $SC_{OUT2}$ as shown in FIG. 13E. In this case, the voltages $V_i$ and $V_2$ of the switch circuit 3 are $+V_{GN}$ and $-V_{GP}$, respectively, and the voltages $V_1'$ and $V_2'$ of the switch circuit 3' are also $+V_{GN}$ and $-V_{GP}$, respectively. Shift data $SD_1$ as shown in FIG. 13 is supplied to the shift register 22, and shift data $SD_2$ as shown in FIG. 13G is supplied to the shift register 22'. Such shift data $SD_1$ and $SD_2$ are shifted within the shift registers 22 and 22', respectively, in synchronization with shift clock signals $SCK_1$ and $SCK_2$ as shown in FIGS. 13B and 13F, respectively. As a result, the signals applied to the scan bus lines $SP_{i-1}$ ($SN_i$) and $SP_i$ ($SN_{i-1}$) are obtained as shown in FIGS. 13D and 13H, respectively.

Also, according to the active-type liquid crystal display device of FIG. 11 since the number of scan bus lines is reduced by ½, areas occupied by the scan bus lines and the connections therefor are reduced, to simplify the configuration of a substrate, a control circuit, and the like.

Figure 14:
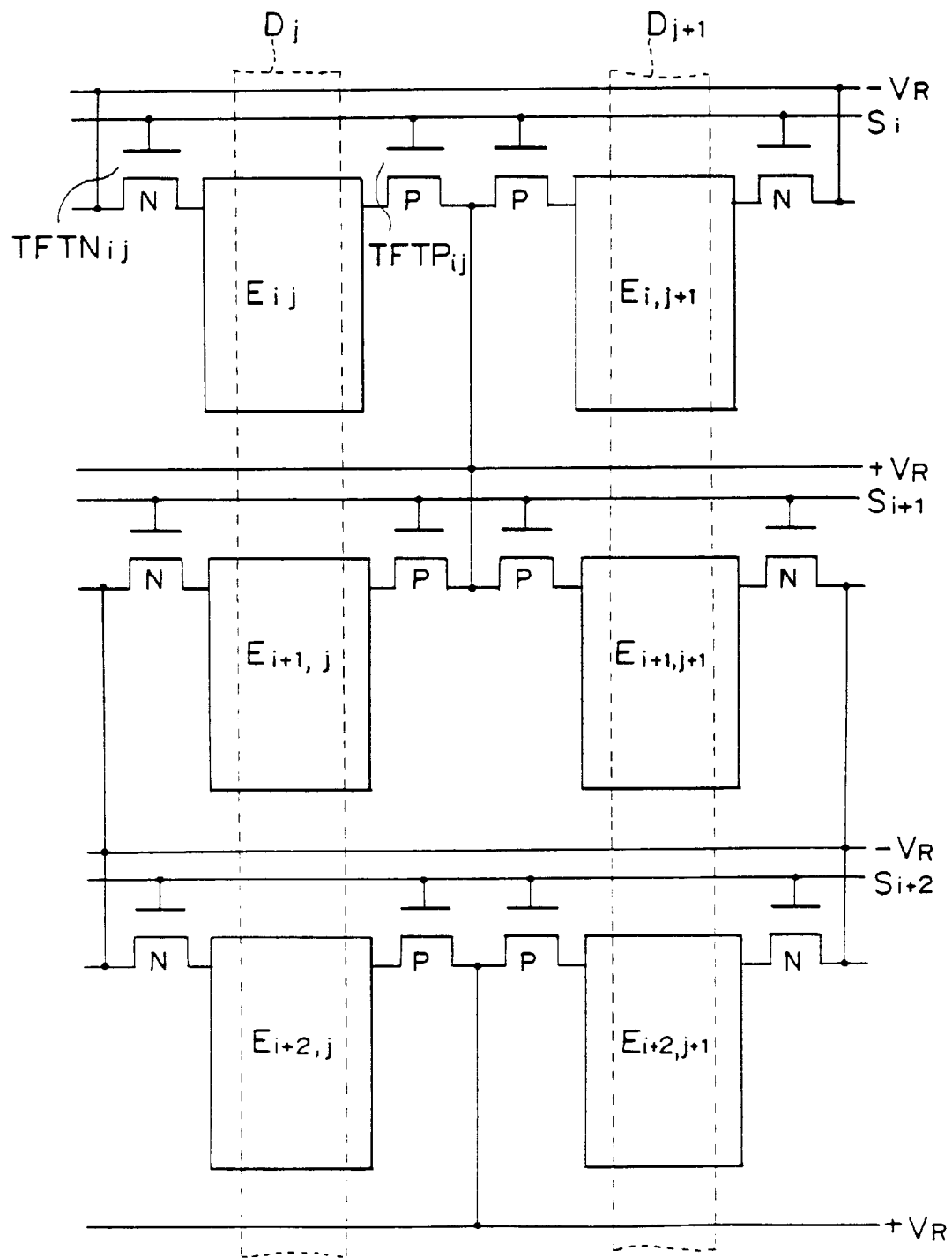
FIG. 14 is a circuit diagram illustrating a fourth embodiment of the active matrix-type liquid crystal display device according to the present invention.

In FIG. 14, which is a fourth embodiment of the counter-matrix-type display device according to the present invention, only one scan line is provided for each row of the liquid crystal cells (i.e., the display electrodes). That is, the gates of the N-channel thin film transistors and the P-channel thin film transistors of the display electrodes belonging to one row are connected to one scan bus line such as $S_i$. Also, there are two kinds of voltage supply lines $+V_R$ and $-V_R$, which are arranged alternately for every row of the display electrodes such as $E_{ij}$. The sources of the N-channel thin film transistors such as $TFTN_{ij}$ are connected to the positive voltage supply line $+V_R$, while the sources of the P-channel thin film transistors $TFTP_{ij}$ are connected to the negative voltage supply line $-V_R$.

The operation of the active matrix-type liquid crystal device of FIG. 14 is explained with reference to FIGS. 15A through 15G.

As shown in FIGS. 15A, 15B, and 15C, the signal of the scan bus line $S_{i+1}$ is obtained by delaying the signal of the scan bus line $S_i$ for one horizontal scanning time period H, and the signal of the scan bus line $S_{i+2}$ is obtained by delaying the signal of the scan bus line $S_{i+1}$ for one horizontal scanning time period H. Also, the polarity of the signal of the scan bus line $S_i$ is opposite to that of the signal of the scan bus line $S_{i+1}$, and the polarity of the signal of the scan bus line $S_{i+1}$ is opposite to that of the signal of the scan bus line $S_{i+2}$. Further, each of the signals of the scan bus lines $S_i$, $S_{i+1}$, $S_{i+2}$, . . . are reversed for every frame.

That is, in an odd frame, the signal of the scan bus line $S_i$ is pulse signal of a voltage $+V_{GN}$ from time to to time $t_1$, and the signal of the scan bus line $S_{i+1}$ is a pulse signal of a voltage $-V_{GP}$ from time $t_1$ to time $t_2$.

Also, in an even frame, the signal of the scan bus line $S_i$ is a pulse signal of a voltage $-V_{GP}$ from time to to time $t_1$, and the signal of the scan bus line $S_{i+1}$ is a pulse signal of a voltage $+V_{GN}$ from time $t_1$ to time $t_2$.

As shown in FIG. 15D, the signal of the data line such as $D_j$ has an amplitude of $V_D$, and the polarity thereof is reversed for each frame.

As shown in FIG. 15E, the reference voltage supply lines $+V_R$ and $-V_R$ are always at a definite positive value and a definite negative value, respectively.

First, in an odd frame, when the voltage of the scan bus line $S_i$ is $+V_{GN}$, the N-channel thin film transistors such as $TFTN_{ij}$ connected to the scan bus line $S_i$ are turned ON. As a result, $-V_R$, which also defines the voltage of the negative reference voltage supply line $-V_R$, is applied as an electrode voltage $V_P$ as shown in FIG. 15F via the turned ON N-channel thin film transistor such as $TFTN_{ij}$ to the display electrode such as $E_{ij}$. Therefore, a voltage $V_D+V_R$, which is a difference in potential between the display electrode $E_{ij}$ and the data bus signal $D_j$, is applied as a write voltage (liquid crystal cell voltage $V_{lc}$) to the liquid crystal cell $CL_{ij}$.

Next, when the voltage of the scan bus line $S_{i+1}$ is $-V_{GP}$, the P-channel thin film transistors such as $TFTP_{i+1,j}$ connected to the scan bus line $S_{i+1}$ are turned ON. As a result, $+V_R$, which also defines the voltage of the positive reference voltage supply line $+V_R$, is applied as an electrode voltage $V_P$ via the turned ON P-channel thin film transistor such as $TFTP_{i+1,j}$ to the display electrode such as $E_{i+1,j}$. Therefore, a voltage $-(V_P+V_R)$, which is a difference in potential between the display electrode $E_{i+1,j}$ and the data bus signal $D_j$, is applied as a write voltage (liquid crystal cell voltage $V_{lc}$) to the liquid crystal cell $CL_{i+1,j}$.

Conversely, in an even frame, when the voltage of the scan bus line $S_i$ is $-V_{GP}$, the P-channel thin film transistors such as $TFTP_{ij}$ connected to the scan bus line $S_i$ are turned ON. As a result, $+V_R$ is applied as the electrode voltage $V_P$ as shown in FIG. 15F via the turned ON P-channel thin film transistor such as $TFTP_{ij}$ to the display electrode such as $E_{ij}$. Therefore, a voltage $-(V_D+V_R)$, which is a difference in potential between the display electrode $E_{ij}$ and the data bus signal $D_j$, is applied as the write voltage (liquid crystal cell voltage $V_{lc}$) to the liquid crystal cell $CL_{ij}$.

Next, when the voltage of the scan bus line $S_{i+1}$ is $+V_{GN}$, the N-channel thin film transistors such as $TFTN_{i+1,j}$ connected to the scan bus line $S_{i+1}$ are turned ON. As a result, $-V_R$ is applied as an electrode voltage $V_P$ via the turned ON N-channel thin film transistor such as $TFTN_{i+1,j}$ to the display electrode such as $E_{i+1,j}$. Therefore, a voltage $V_D+V_R$, which is a difference in potential between the display electrode $E_{i+1,j}$ and the data bus signal $D_j$, is applied as a write voltage (liquid crystal cell voltage $V_{lc}$) to the liquid crystal cell $CL_{i+1,j}$.

That is, the signal of the data bus line such as $D_j$ is reversed for every frame, is applied to each of the liquid crystal cells, and in addition, the P-channel thin film transistors and the N-channel thin film transistors are alternately turned ON for every frame. As a result, the reference voltage $-V_R$ or $+V_R$ is applied as the electrode voltage $V_P$ via the turned-ON thin film transistors, and therefore, these differences $(V_D+V_R)$ and $-(V_D+V_R)$ are written into the liquid crystal cells such as $CL_{ij}$, to obtain the liquid crystal voltage $V_{lc}$.

Thus, the reference voltage $V_R$ is the same as the write voltage applied to the liquid crystal cell $CL_{ij}$, i.e., a bias corresponding to the reference voltage $V_R$ is given, and therefore, it is possible to reduce the voltage $\pm V_D$ of the data bus lines such as $D_j$ required to obtain a minimum liquid crystal cell voltage $V_{lc}$. In other words, the amplitude of the signal of the data bus lines is reduced.

That is, if a threshold voltage of a liquid crystal cell is $V_{th}$ and a saturation voltage of the liquid crystal cell is $V_{sat}$, the voltage $V_D$ of the data bus lines such as $D_j$ and the reference voltage $V_R$ can be $V_D=(V_{sat}-V_{th})/2$ $V_R=(V_{sat}+V_{th})/2$ Thus, the voltage $V_D$ can be reduced by ¼ as compared with the devices of FIGS. 5, 8, and 11 where $V_D=V_{sat}$. Note that $V_{th}$ is usually half of $V_{sat}$.

Figure 16A:
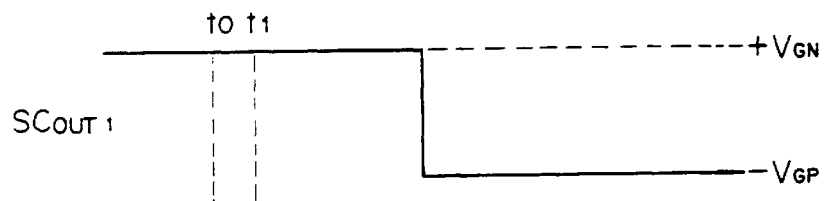
FIGS. 16A through 16H are timing diagrams showing the signals in the circuit of FIG. 1 for generating the signals of FIGS. 15A and 15B.
Figure 16B:
Figure 16C:
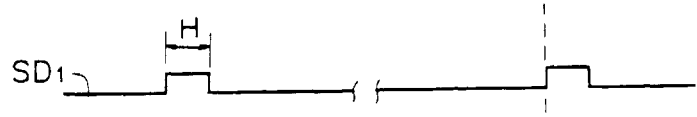
Figure 16D:
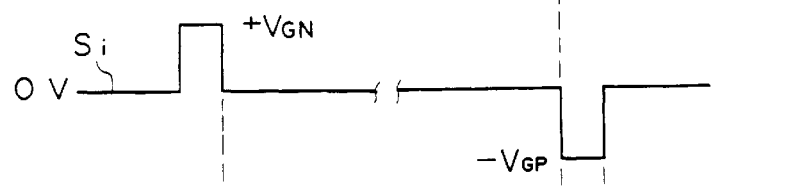
Figure 16E:
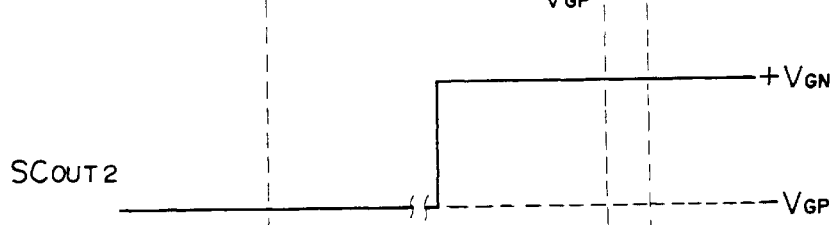
Figure 16F:
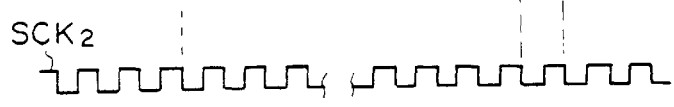
Figure 16G:
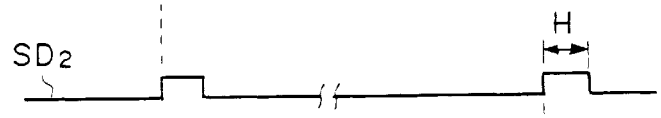
Figure 16H:
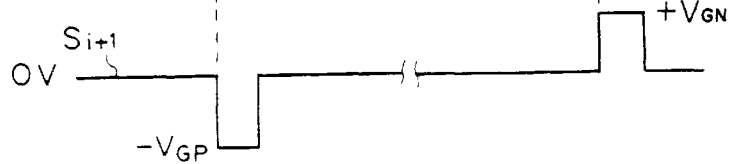

The scan signals applied to the scan bus lines $S_i$ and $S_{i+1}$ of FIGS. 15A and 15B are generated by the synchronization circuits 2 and 2' and the switch circuit 3 and 3' of FIG. 1. That is, the switch circuit 3 generates a signal $SC_{OUT1}$ as shown in FIG. 16A, and the switch circuit 3' generates a signal $SC_{OUT2}$ as shown in FIG. 16E. In this case, the voltages $V_1$ and $V_2$ of the switch circuit 3 are $+V_{GN}$ and $-V_{GP}$, respectively, and the voltages $V_1'$ and $V_2'$ of the switch circuit 3' are also $+V_{GN}$ and $-V_{GP}$, respectively. Shift data $SD_1$ as shown in FIG. 16C is supplied to the shift register 22, and shift data $SD_2$ as shown in FIG. 16G is supplied to the shift register 22'. Such shift data $SD_1$ and $SD_2$ are shifted within the shift registers 22 and 22', respectively, in synchronization with shift clock signals $SCK_1$ and $SCK_2$ as shown in FIGS. 16B and 16F, respectively. As a result, the signals applied to the scan bus lines $S_i$ and $S_{i+1}$ are obtained as shown in FIGS. 16D and 16H, respectively.

The above-mentioned waveforms as shown in FIGS. 16A through 16H are generated in an odd frame, but in an even frame, the switch circuits 3 and 3' generate the waveforms as shown in FIGS. 16E and 16A, respectively.

According to the active matrix-type liquid crystal display device of FIG. 14, since the polarity of the signals of the scan bus lines $S_i$, $S_{i+1}$, . . . is reversed for every frame, the polarity of the shift voltage $\Delta V_{lc}$ due to the parasitic electrostatic capacity is reversed for every frame. Therefore, the shift voltage $\Delta V_{lc}$ generated during an odd frame is counteracted with the shift voltage $\Delta V_{lc}$ generated during an even frame, so that the total shift voltage becomes zero. Thus, the generation of a DC component in the AC voltage applied to the liquid crystal cells is avoided.

Also, the crosstalk due to the amplitude of the data bus lines is reduced and thus improves the display quality.

Figure 17:
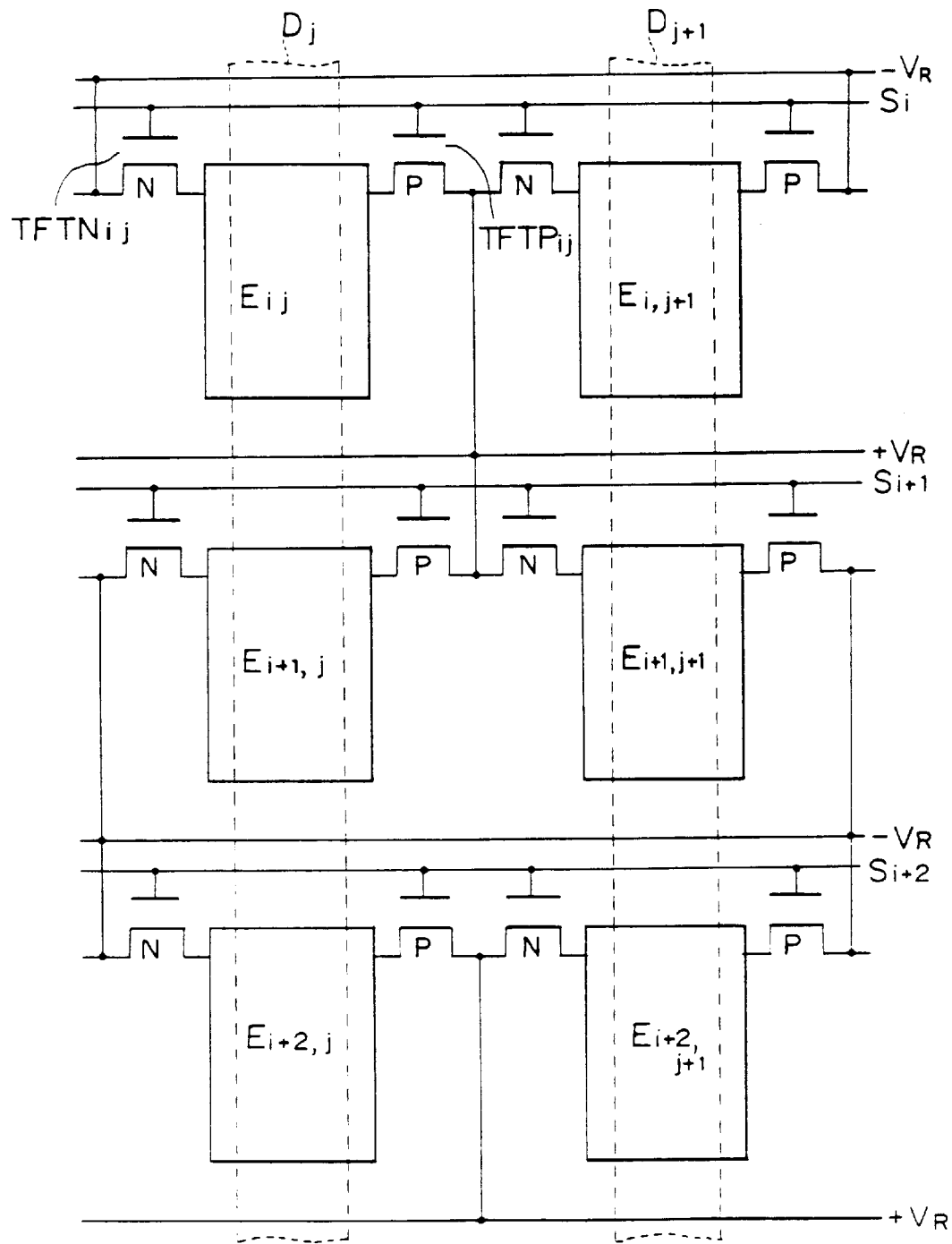
FIG. 17 is a circuit diagram illustrating a fifth embodiment of the active matrix-type liquid crystal display device according to the present invention.

In FIG. 17, which is a fifth embodiment of the counter-matrix-type display device according to the present invention, the device of FIG. 14 is modified to further avoid flickering. That is, the polarities of the reference voltage bus line connected to each of the N-channel thin film transistors and the P-channel transistors are reversed for very column of the liquid crystal cells, i.e., the display electrodes such as $E_{ij}$. The signals of the device of FIG. 17 are the same as those of the device of FIG. 14, except that, as shown in FIGS. 18D and 18E, the polarity of a signal of one data bus line such as $D_j$ is opposite to the polarity of a signal of another adjacent data bus such as $D_{j+1}$, since the electrode voltage $V_P$ of the display electrode such as $E_{ij}$ depends on whether or not the N-channel transistor is turned ON. As a result, voltages $(V_D+V_R)$ and $-(V_D+V_R)$ are alternately written into the liquid crystal cell for every column.

According to the active matrix-type liquid crystal display device of FIG. 17, the flickering can be avoided due to the reversing of the polarity of the data bus lines for every column, in addition to the effect of the device of FIG. 14.

Figure 19:
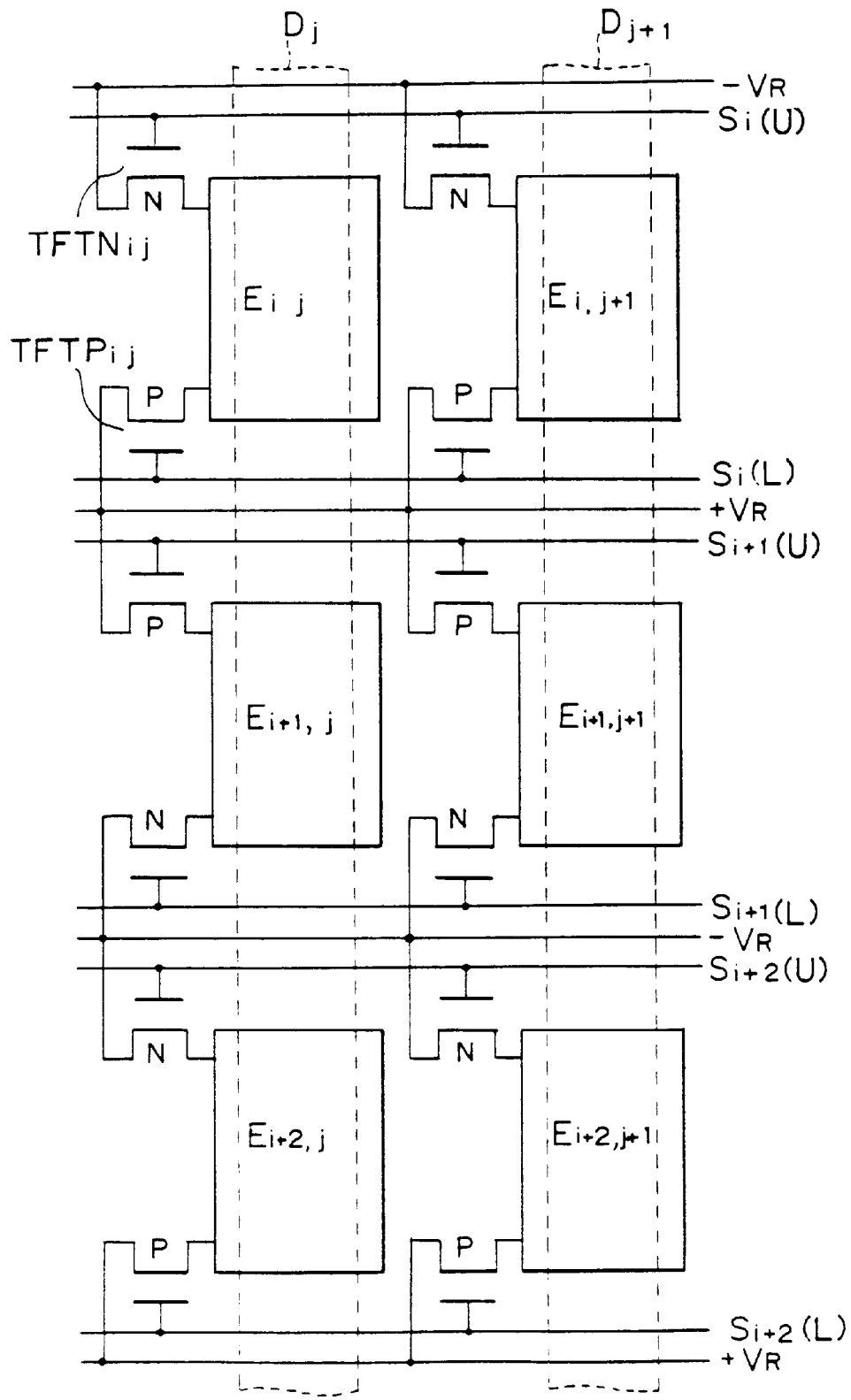
FIG. 19 is a circuit diagram illustrating a sixth embodiment of the active matrix-type liquid crystal display device according to the present invention.

In FIG. 19, which is a sixth embodiment of the counter-matrix-type display device according to the present invention, the device of FIG. 14 is modified. That is, each of the scan bus lines $S_i$, $S_{i+1}$, . . . of FIG. 14 is split into two pieces $S_i(U)$, $S_i(L)$; $S_{i+1}(U)$, $S_{i+1}(L)$; . . . on both sides of each row of the display electrodes. In this case, the gates of the N-channel thin film transistors such as $TFTN_{ij}$ are connected to the upper side scan bus line such as $S_i(U)$, while the gates of the P-channel thin film transistors such as $TFTP_{ij}$ are connected to the lower side scan bus line such as $S_i(L)$. The operation of the device of FIG. 19 is the same as that of the device of FIG. 14.

According to the device of FIG. 19, the length of the connections between the drains of the thin film transistors and their corresponding reference voltage supply lines $+V_R$ and $-V_R$ can be shortened, thereby to reduce the parasitic capacity between the drains of the thin film transistor and the corresponding display electrode, thus reducing the crosstalk and increasing the ratio of openings, in addition to the effect of the device of FIG. 14.

Figure 20:
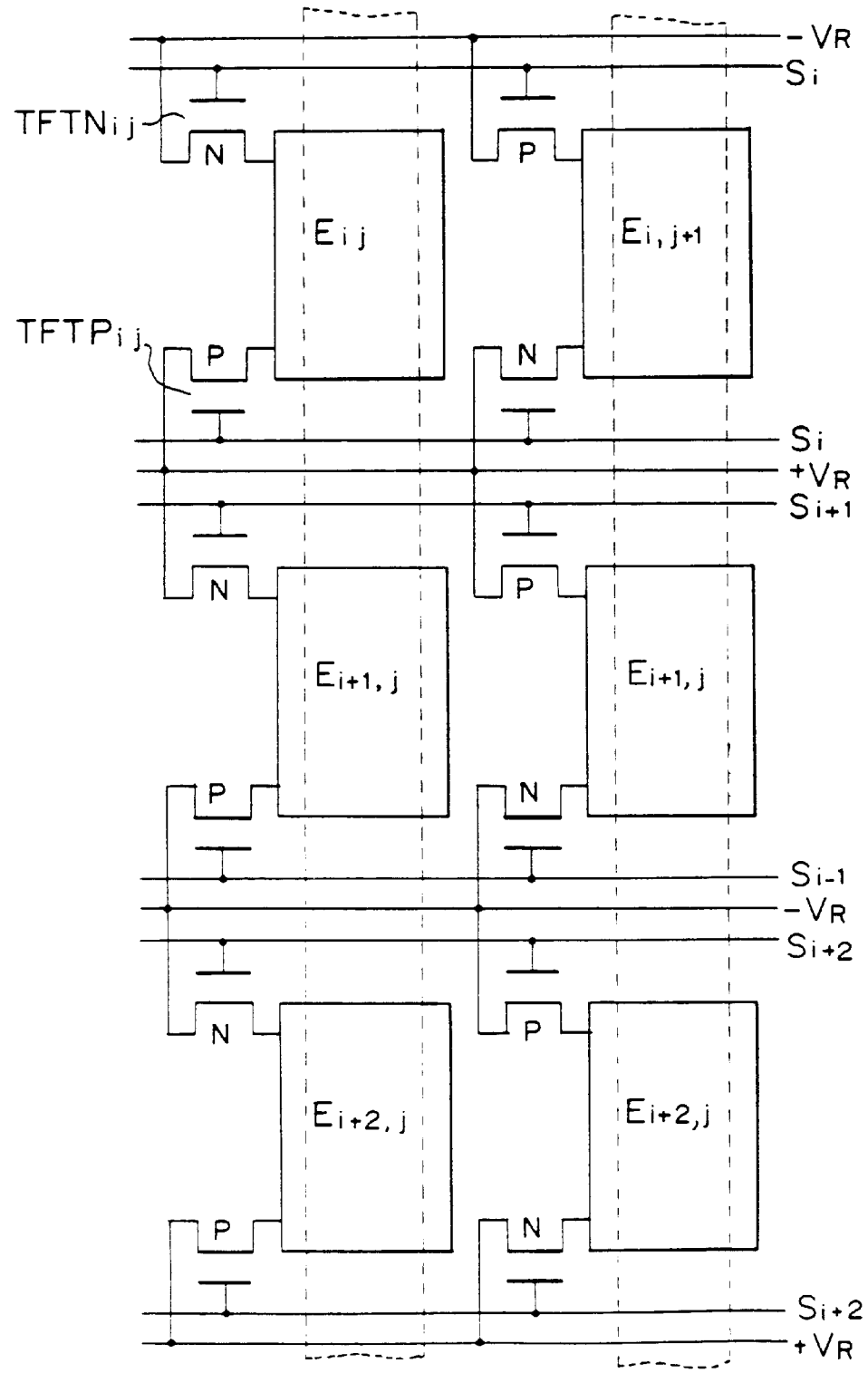
FIG. 20 is circuit diagram illustrating a seventh embodiment of the active matrix-type liquid crystal display device according to the present invention.

In FIG. 20, which is a seventh embodiment of the counter-matrix-type display device according to the present invention, the device of FIG. 17 is modified. That is, the modification of the device of FIG. 17 relative to the device of FIG. 20 is the same as that of the device of FIG. 14 relative to the device of FIG. 19.

That is, each of the scan bus lines $S_i$, $S_{i+1}$, ... of FIG. 17 is split into two pieces $S_i(U)$, $S_i(L)$; $S_{i+1}(U)$, $S_{i+1}(L)$; ... on both sides of each row of the display electrodes. In this case, the gates of the N-channel thin film transistors such as $TFTN_{ij}$ are connected to the upper side scan bus line such as $S_i(U)$, while the gates of the P-channel thin film transistors such as $TFTP_{ij}$ are connected to the lower side scan bus line such as $S_i(L)$.

The operation of the device of FIG. 20 is explained with reference to FIGS. 21A through 21H.

As shown in FIGS. 21A, 21B, and 21C, the signals of the scan bus lines $S_i$, $S_{i+1}$, and $S_{i+2}$ have the same polarity in the same frame, and this polarity is reversed for every frame. Therefore, as shown in FIGS. 21D and 21E, the signals of the data bus lines $D_j$, $D_{j+1}$ have different polarities in the same frame, and these polarities are reversed for every frame.

Figure 22A:
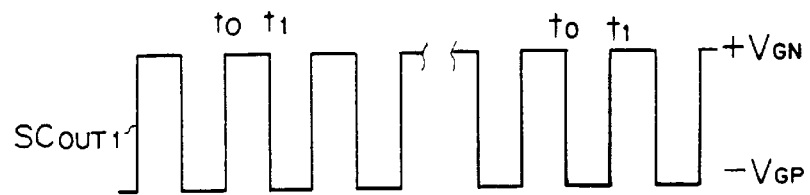
Figure 22C:
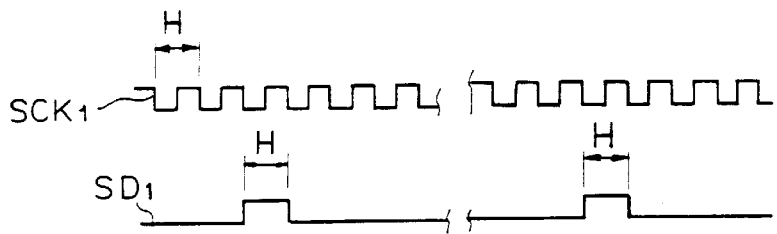
Figure 22D:
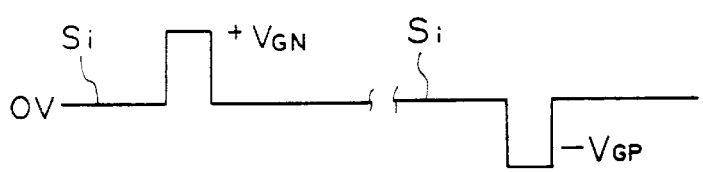
Figure 22E:
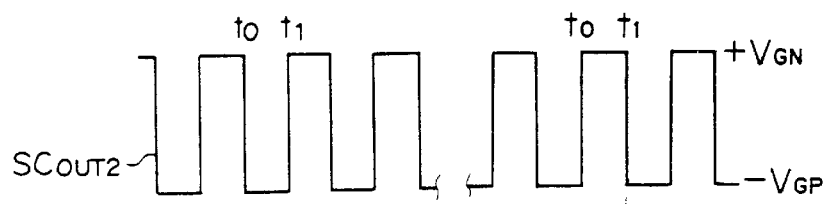
Figure 22F:
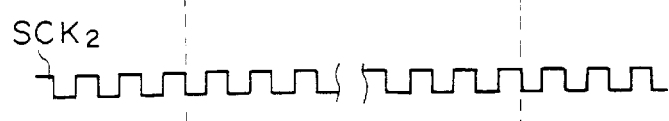
Figure 22G:
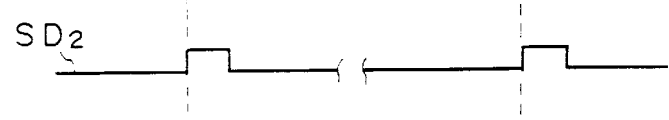
Figure 22H:
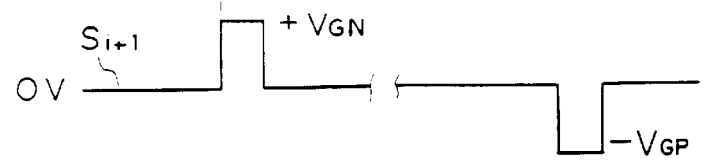

The scan signals applied to the scan bus lines $S_i$ and $S_{i+1}$ of FIGS. 21A and 21B are generated by the synchronization circuits 2 and 2' and the switch circuits 3 and 3' of FIG. 1. That is, the switch circuit 3 generates a signal $SC_{OUT1}$ as shown in FIG. 22A, and the switch circuit 3' generates a signal $SC_{OUT2}$ as shown in FIG. 22E. In this case, the voltages $V_1$ and $V_2$ of the switch circuit 3 are $+V_{GN}$ and $-V_{GP}$, respectively, and the voltages $V_1'$ and $V_2'$ of the switch circuit 3' are also $+V_{GN}$ and $-V_{GP}$, respectively. Shift data $SD_1$ as shown in FIG. 22C is supplied to the shift register 22, and shift data $SD_2$ as shown in FIG. 22G is supplied to the shift register 22'. Such shift data $SD_1$ and $SD_2$ are shifted within the shift registers 22 and 22', respectively, in synchronization with shift clock signals $SCK_1$ and $SCK_2$ as shown in FIGS. 22B and 22 F, respectively. As a result, the signals applied to the scan bus lines $S_i$ and $S_{i+1}$ are obtained as shown in FIGS. 22D and 22H, respectively.

The above-mentioned waveforms as shown in FIGS. 22A through 22H are generated in an odd frame, but in an even frame, the switch circuits 3 and 3' generate the waveforms as shown in FIGS. 22E and 22A, respectively.

According to the active matrix-type liquid crystal device of FIG. 20, all the effects of the devices of FIGS. 14, 17, and 19 are obtained. That is, the shift voltage $\Delta V_{lc}$ can be compensated for, and the flickering can be avoided. Also, the connections between the sources of the thin film transistors and their corresponding display electrodes are shortened, to reduce the parasitic electrostatic capacity between the of the thin film transistors and the corresponding display electrodes.

Figure 23:
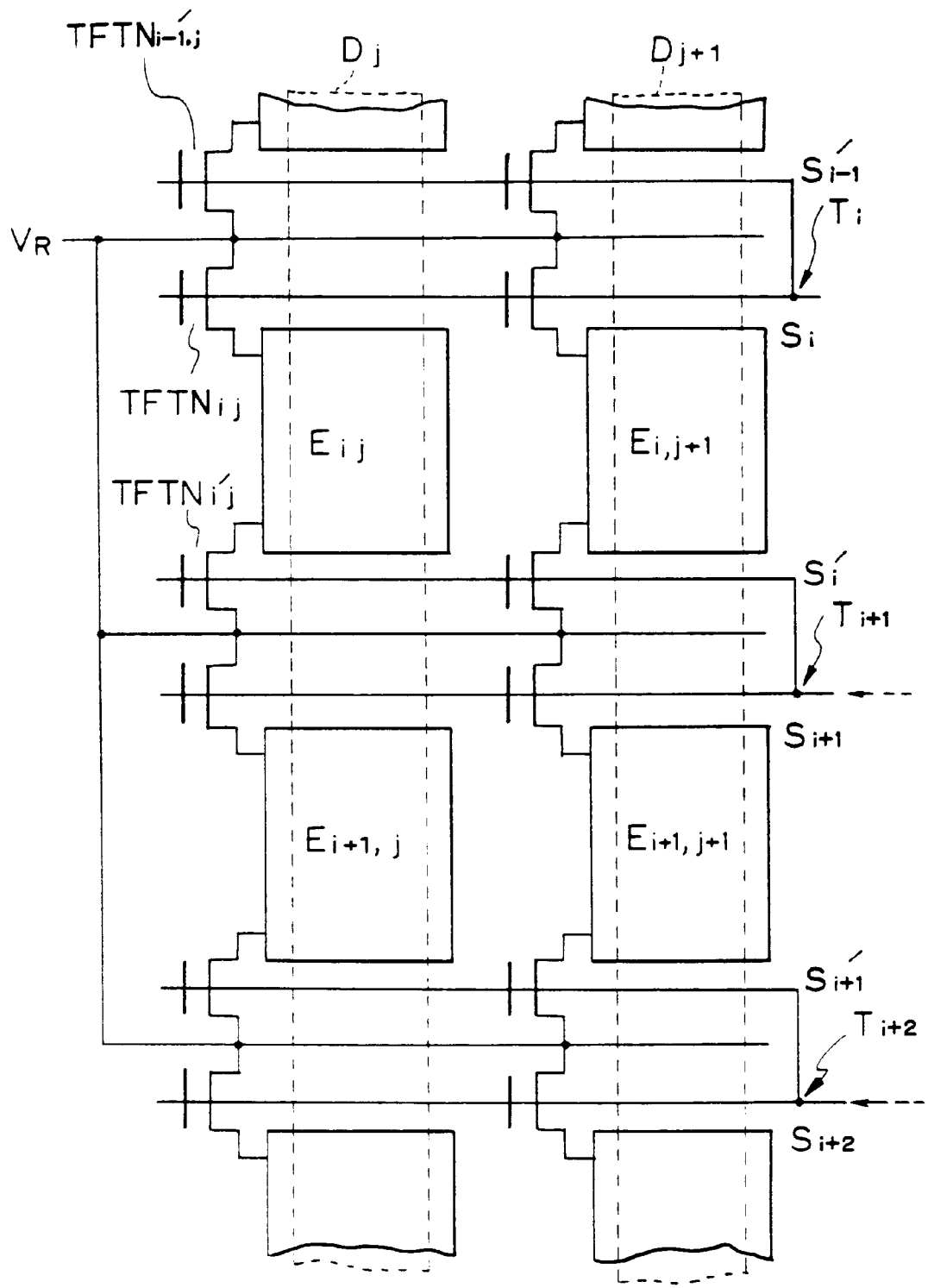
FIG. 23 is a circuit diagram illustrating an eighth embodiment of the active matrix-type liquid crystal display device according to the present invention.
Figure 24:
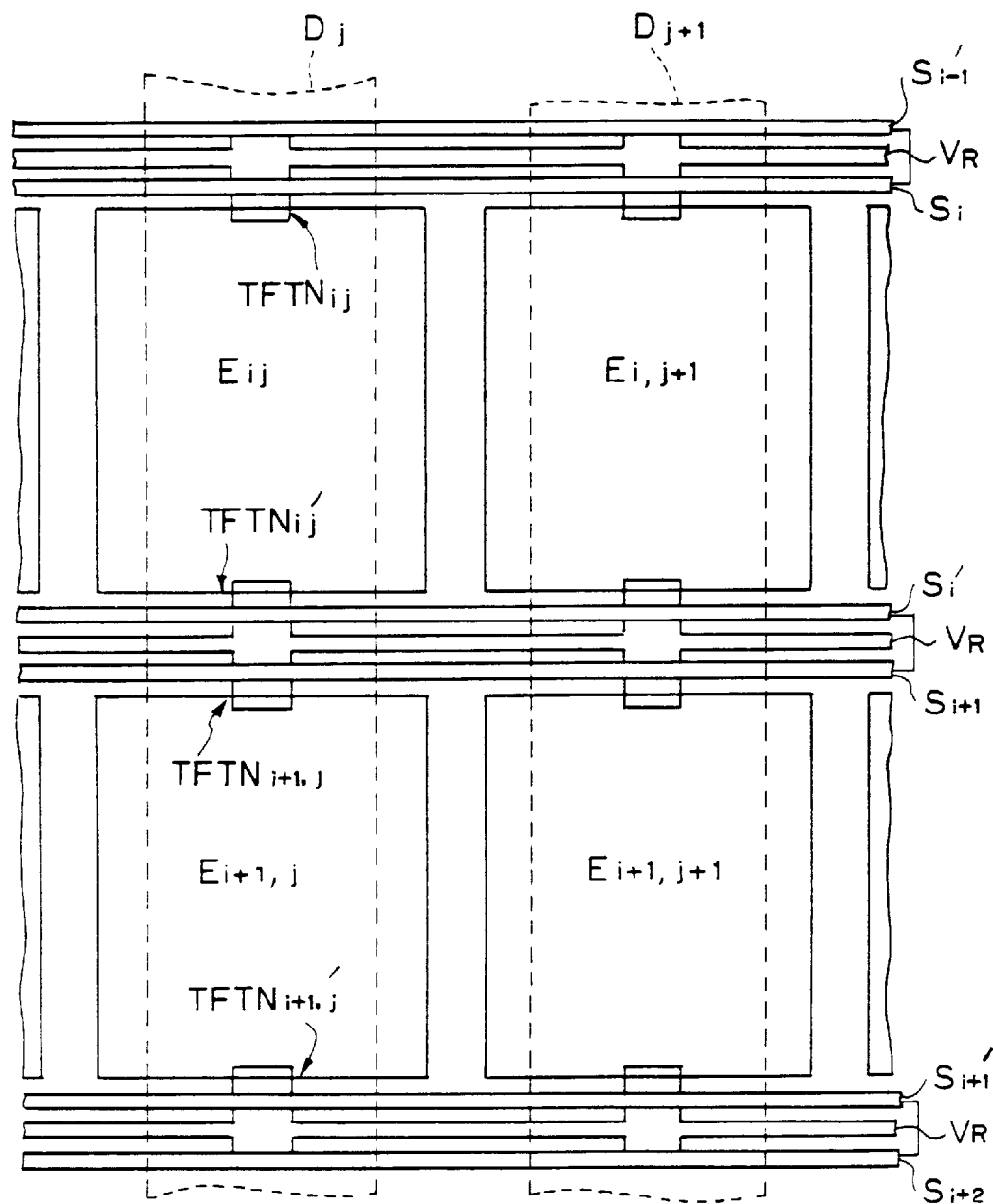
FIG. 24 is a layout diagram of the device of FIG. 23.

In FIG. 23, which is an eighth embodiment of the counter-matrix-type display device according to the present invention, and in FIG. 24, which is a layout diagram of the device of FIG. 23, all of the thin film transistors $TFTN_{ij}$, $TFTN_{ij}'$ are of an N-channel type. A plurality of reference voltage supply bus lines are formed on the device in parallel, spaced relationship, each disposed intermediate a related pair of scan lines (e.g., as shown in FIG. 23, the reference voltage supply line $V_{Ri}$ is disposed intermediate the pair of parallel and spaced, first and second scan bus lines $S_{i-1}$ and $S_i$). All of the parallel reference voltage supply bus lines $(V_{Ri}, V_{Ri+1}, ...)$ are connected to a single reference voltage supply $V_R$, which thus is provided in common to the entire device, and $V_R$ is switched from a first level to a second level for every horizontal scanning time period H. Also, two scan bus lines such as $S_{i-1}'$ and $S_i$ are arranged on both sides of the reference voltage supply line $V_R$, and the two scan bus lines such as $S_{i-1}'$ and $S_i$ are connected at a terminal such as $T_i$, to surround the reference voltage supply line $V_R$.

The gates of the N-channel thin film transistors such as $TFTN_{ij}$ are connected to the downstream side scan bus lines such as $S_i$, and the gates of the N-channel thin film transistors such as $TFTN_{ij}'$ are connected to the upstream side scan bus lines such as $S_i'$. The sources of the thin film transistors are connected to the reference voltage supply line $V_R$ and the drains of the thin film transistors are connected to the corresponding display electrodes such as $E_{ij}$.

The operation of the device of FIGS. 23 and 24 particularly, the operation for the display electrode $E_{ij}$ (liquid crystal cell ($L_{ij}$)) is explained with reference to FIGS. 25A through 25F.

Figure 25:
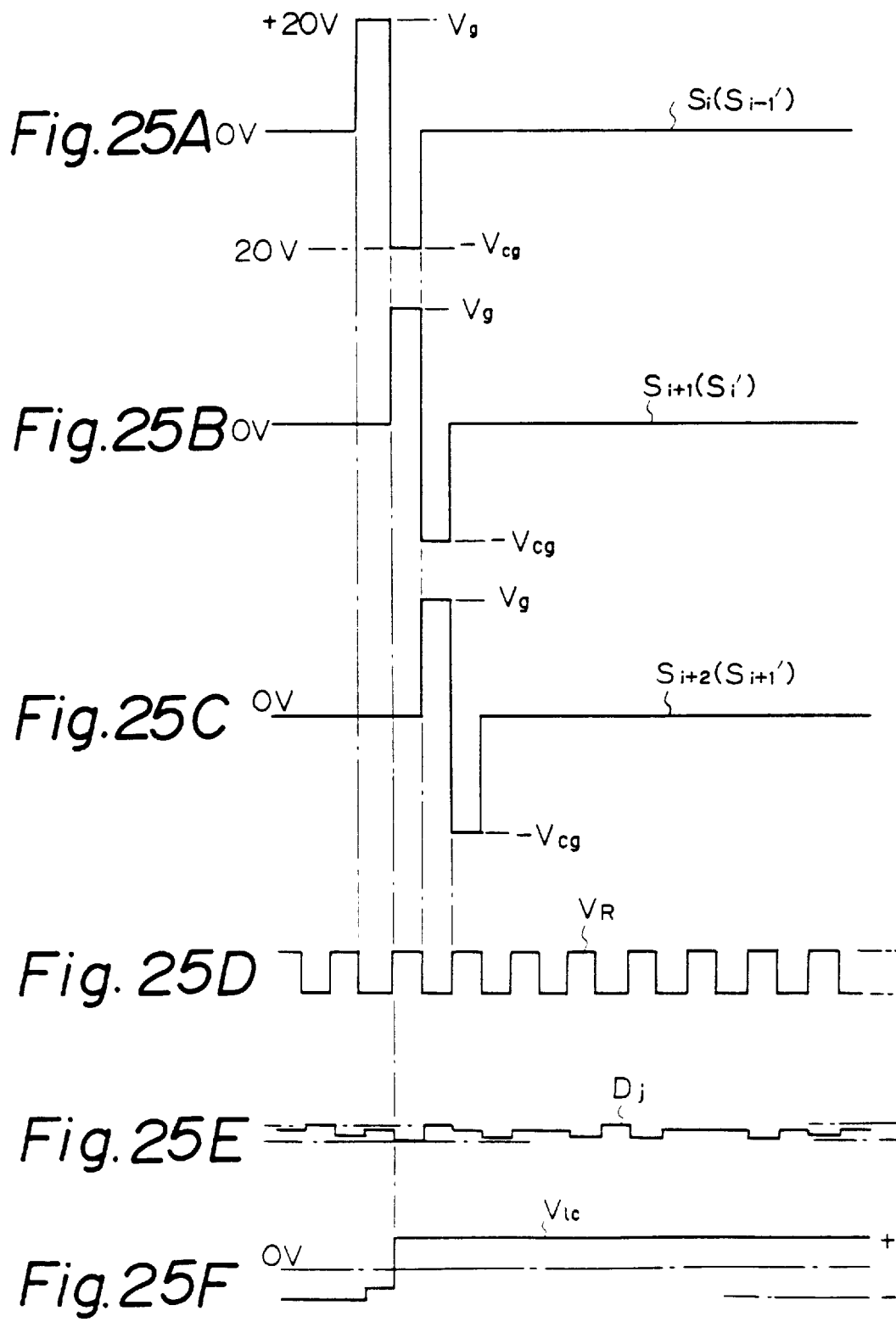
FIGS. 25A through 25F are timing diagrams showing the signals employed in the circuit of FIGS. 23 and 24.

When a scan voltage $(+V_g)$ as shown in FIG. 25B is applied to the scan bus line $S_{i+1}(S_i')$, the N-channel thin film transistor such as $TFTN_{ij}'$ is turned ON, so that the display electrode $E_{ij}$ is electrically connected to the reference voltage supply line $V_R$. Thus, the difference in potential between the reference voltage supply line $V_R$ as shown in FIG. 25D and the data bus line $D_j$ as shown in FIG. 25E, becomes the liquid crystal voltage $V_{lc}$ as shown in FIG. 25F.

On the other hand, simultaneously with the application of the scan voltage $(V_g)$ to the scan bus line $S_{i+1}(S_i')$, even when a scan voltage $(-V_{cg})$ as shown in FIG. 25A applied to the scan bus line $S_i(S_{i-1}')$, the N-channel thin film transistor $TFTN_{ij}$ is turned OFF.

This compensates for the shift voltage $\Delta V_{ec}$ appearing in the display electrode $E_{ij}$. That is, the shift voltage $\Delta V_{ec}'$ due to the change of the scan voltage applied to the scan bus line $S_{i+1}(S_i')$ from $+V_g$ to 0V is compensated for by the shift voltage $\Delta V_{ec}''$ due to the change of the scan voltage applied to the scan bus line $S_i(S_{i-1}')$ from $-V_{cg}$ to 0V.

Also, before the application of the scan voltage $(-V_{cg})$ to the scan bus line $S_i(S_{i-1}')$, a scan voltage $(+V_g)$ is applied to the scan bus line $S_i(S_{i-1}')$ as shown in FIG. 25A, to turn ON the N-channel thin film transistor $TFTN_{ij}$, thereby writing data into the liquid crystal cell $CL_{ij}(E_{ij})$. Usually, this written data is immediately canceled by the application of the scan voltage $V_g$ to the scan bus line $S_{i+1}(S_i')$. However, if the N-channel thin film transistor $TFTN_{ij}$ is broken for some reason, a write operation is performed upon the display electrode $E_{ij}$ (liquid crystal cell $CL_{ij}$) via the N-channel thin film transistor $TFTN_{ij}'$ by the scan voltage applied to the scan bus line $S_i(S_{i-1})$. Thus, such a redundancy configuration can remedy a defective liquid crystal display device where some thin film transistors are defective.

The scan voltages as shown in FIGS. 25A, 25B, and 25C are sequentially generated in the same way as in the device of FIG. 8.

As a result, as shown in FIG. 25F, the liquid crystal voltage $V_{lc}$ between the display electrode $E_{ij}$ and the data bus line $D_j$ is maintained until the next scan voltages are applied to the scan bus lines $S_i$ ($S_{i-1}'$) and $S_{i+1}$ ($S_i'$).

According to the device of FIGS. 23 and 24, a parasitic electrostatic capacity between the reference voltage supply line $V_R$ and the display electrodes such as $E_{ij}$ can be reduced, i.e., the parasitic electrostatic capacity $C_{dp}$ in the formula (2) can be reduced, to lessen the shift voltage $\Delta V_{lc}$ thereby reducing the crosstalk.

Figure 26:
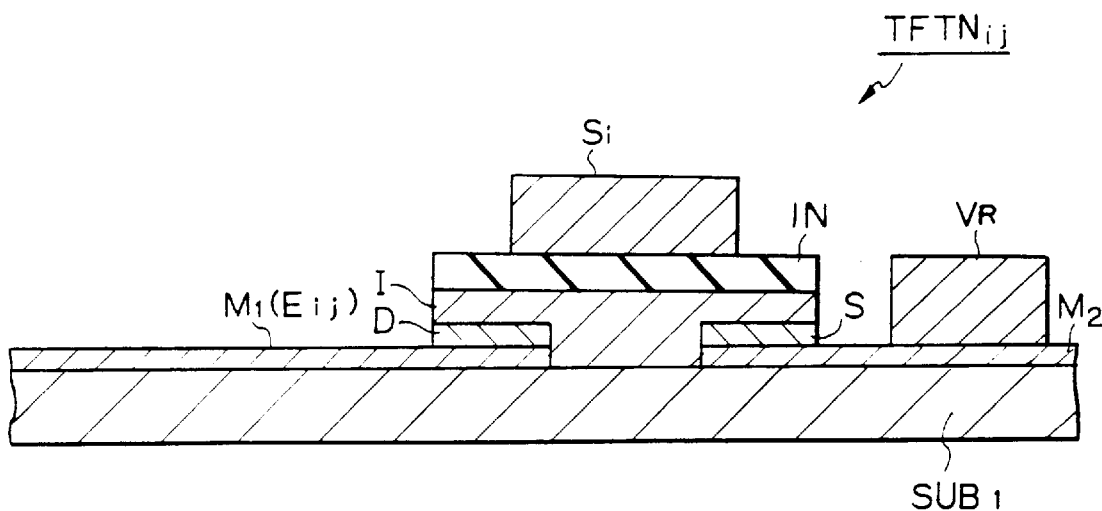
FIG. 26 is a cross-sectional view of the device of FIG. 24 taken along the line A–A'.

In FIG. 26, which is a cross-sectional view taken along the line A–A' of FIG. 24, a metal layer $M_1$ (i.e., the display electrode $E_{ij}$) and a metal layer $M_2$ are formed on the glass substrate $SUB_1$. Reference S and D are contact layers which serve as a source electrode and a drain electrode. The contact layers S and D are formed by $N^+$-type amorphous silicon, for example. Reference I designates an intrinsic semiconductor layer formed by amorphous silicon. Also, $SP_i$ and $V_R$ are metal layers formed by polycrystalline silicon, aluminium, tungsten, molybdenum, chromium, or the like.

Figure 27:
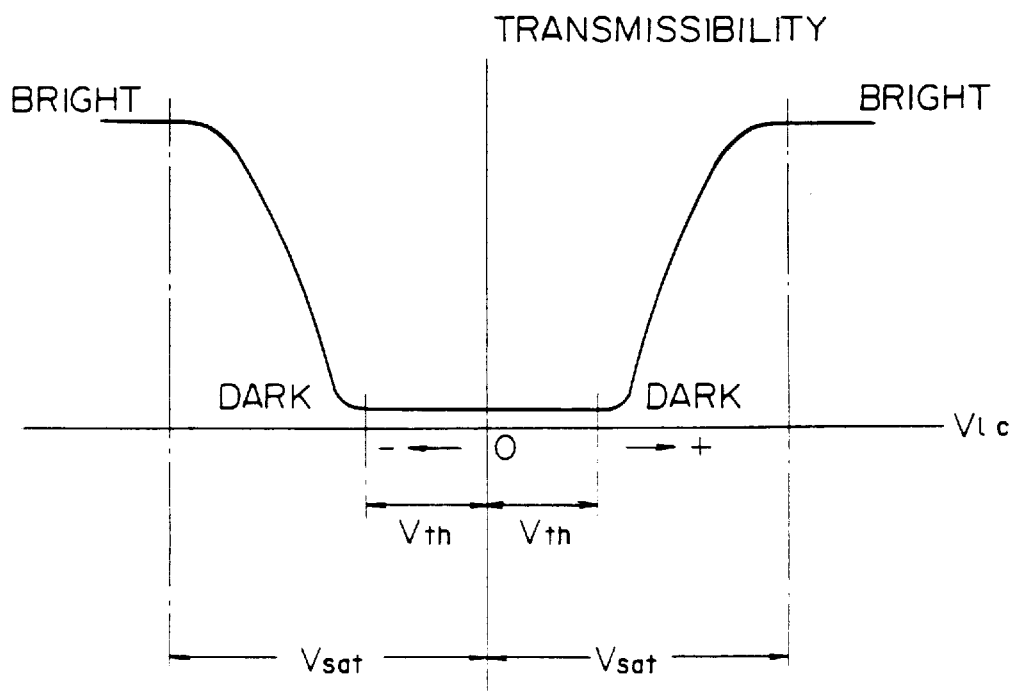
FIG. 27 is a diagram showing an example of the transmissibility characteristic of a liquid crystal cell.

In FIG. 27, which shows an example of the transmissibility characteristic of a liquid crystal cell, if the absolute value of the liquid crystal voltage $V_{lc}$ is smaller than a threshold voltage $V_{th}$, the liquid crystal cell is dark, while if the absolute value of the liquid crystal voltage $V_{lc}$ is larger than a saturation voltage $V_{sat}$, then the liquid crystal cell is bright.

Assume that $V_{th}$=2.5V and $V_{sat}$=5V. Then, the difference between the high level and low level of the reference voltage supply line $V_R$ is 12−4.5=7.5V as shown in FIG. 25D, which corresponds to a value of $V_{th}$+$V_{sat}$ (=7.5V).

Also, when the reference voltage $V_R$ is 4.5V and the voltage of the data bus line $D_j$ is 9.5V, as shown in FIGS. 25D and 25E, the liquid crystal voltage $V_{lc}$ is −5V which means "bright". Conversely, when the reference voltage $V_R$ is 4.5V and the voltage of the data bus line $D_j$ is 7V, as indicated by arrows X in FIGS. 25D and 25E, the liquid crystal voltage $V_{lc}$ is −2.5V which means "dark".

The shift voltage $\Delta V_{lc}$ of the liquid crystal voltage $V_{lc}$ can be represented by $$\Delta V_{LC} = [\Delta V_D \times (C_{gp} + C_{dp}) \div (C_{gp} + C_{dp} + C_{LC})] + \quad (4)$$

$$\Delta V_R \times C_{dp} / (C_{gp} + C_{dp} + C_{LC})$$

$$= (\Delta V_D + \Delta V_R) \times C_{dp} / (C_{gp} + C_{dp} + C_{LC}) +$$

$$\Delta V_D \times C_{gp} / (C_{gp} + C_{dp} + C_{LC})$$

where $\Delta V_D$ is a fluctuation of the voltage of the data bus line such as $D_j$, and $\Delta V_R$ is a fluctuation of the reference voltage $V_R$. Note that, the shift voltage $\Delta V_{lc}'$ in the prior art can be represented by $$\Delta V_{LC} = [\Delta V_D \times (C_{gp} + C_{dp}) \div (C_{gp} + C_{dp} + C_{LC})] \quad (5)$$

$$= (\Delta V_D \times C_{dp} / (C_{gp} + C_{dp} + C_{LC}) +$$

$$\Delta V_D \times C_{gp} / (C_{gp} + C_{dp} + C_{LC})$$

In the device of FIGS. 23 and 24, the reference voltage $V_R$ is alternately switched from 12V to 4.5V or vice versa, so that the amplitude of the signals of the data bus lines can be reduced. For example, the liquid crystal voltage $V_{lc}$ is ±5V, but the amplitude of the signal of the data bus line $D_j$ is 2.5V (=9.5−7). Further, since the reference voltage supply line $V_R$ is surrounded by the scan bus lines, the parasitic electrostatic capacity $C_{dp}$ between the source-drain of the thin film transistors is reduced thereby lessening the shift voltage $\Delta V_{lc}$ of the liquid crystal voltage $V_{lc}$.

When the operation of the thin film transistors $TFTN_{ij}'$ and $TFTN_{i+1,j}$ is carried out by the scan bus lines $S_i'$ and $S_{i+1}$, the shift voltage $\Delta V_{lc}$ generated at the liquid crystal cell is represented by $$\Delta V_{lc} = V_g \times C_2 / (C_1 + C_2 + C_{dp} + C_{LC}) \quad (6)$$

where $C_1$ is a parasitic electrostatic capacity between the display electrode $E_{ij}$ and the scan bus line $S_{i+1}$, and $C_2$ is a parasitic electrostatic capacity between the display electrode $E_{ij}$ and the scan bus line $S_i'$. Therefore, this shift voltage $\Delta V_{lc}$ can be on the whole compensated for by applying $-V_{gp}$ via the scan bus line $SP_i$ to the gate of the thin film transistor $TFTP_{ij}$. In this case, $$-V_{cg} = -V_g \times C_2 / C_1 \quad (7)$$

Note that $V_g = V_{cg}$ in FIGS. 25A, 25B, and 25C, if $C_1 = C_2$.

In FIGS. 28A, 28B, and 28C, which are modifications of FIGS. 25A, 25B, and 25C, respectively, when a scan voltage (+$V_g$) is applied to the scan bus line $S_{i+1}(S_i')$, a scan voltage (−$V_{cg}$) is applied to the upstream-side scan bus line $S_i(S_{i-1}')$ as indicated by X and a scan voltage (−$V_{cg}$) is applied to the downstream side scan bus line $S_{i+2}(S_{i+1}')$ as indicated Y. As a result, even when the display electrode $E_{i+1,j}$ is operated by only the N-channel thin film transistor $TFTN_{i+1,j}'$, the shift voltage $\Delta Vec$ appearing in the display electrode $E_{i+1,j}$ can be compensated for.

Figure 29A:
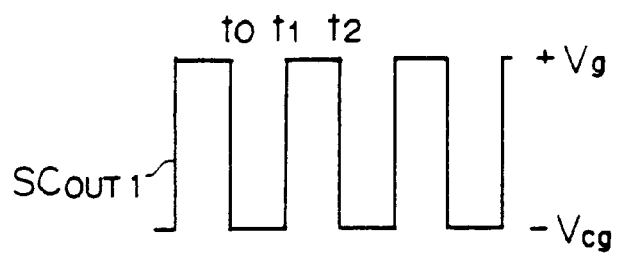
FIGS. 29A through 29H are timing diagrams showing the signals employed in the circuit of FIG. 1 for generating the signals of FIGS. 25A and 25 B.
Figure 29B:
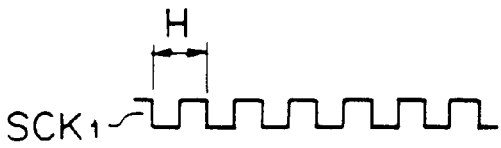
Figure 29C:
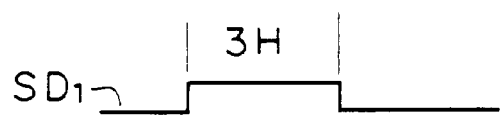
Figure 29D:
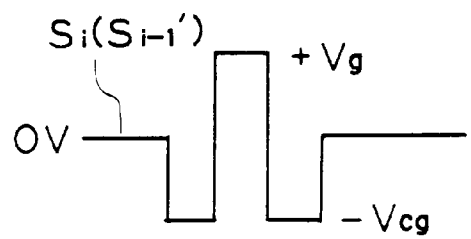
Figure 29E:
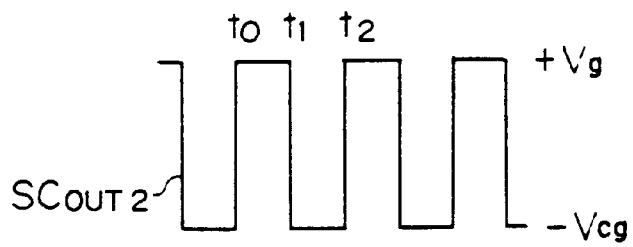
Figure 29F:
Figure 29G:
Figure 29H:
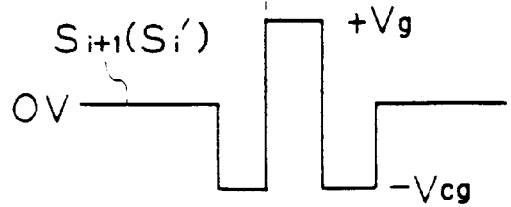

The scan signals applied to the scan bus lines $S_i(S_{i-1}')$ and $S_{i+1}(S_i')$ of FIGS. 28A and 28B are generated by the synchronization circuits 2 and 2' and the switch circuit 3 and 3' of FIG. 1. That is, the switch circuit 3 generates a signal $SC_{OUT1}$ as shown in FIG. 29A, and the switch circuit 3' generates a signal $SC_{OUT2}$ as shown in FIG. 29E. In this case, the voltages $V_1$ and $V_2$ of the switch circuit 3 are +$V_g$ and −$V_{cg}$, respectively, and the voltages $V_1'$ and $V_2'$ of the switch circuit 3' are also +$V_g$ and −$V_{cg}$, respectively. Shift data $SD_1$ as shown in FIG. 29C is supplied to the shift register 22, and shift data $SD_2$ as shown in FIG. 29G is supplied to the shift register 22'. Such shift data $SD_1$ and $SD_2$ are shifted within the shift registers 22 and 22', respectively, in synchronization with shift clock signals $SCK_1$ and $SCK_2$, as shown in FIGS. 29B and 29F, respectively. As a result, the signals applied to the scan bus lines $SN_i$ and $SP_i$ are obtained as shown in FIGS. 29D and 29H, respectively.

Figure 30:
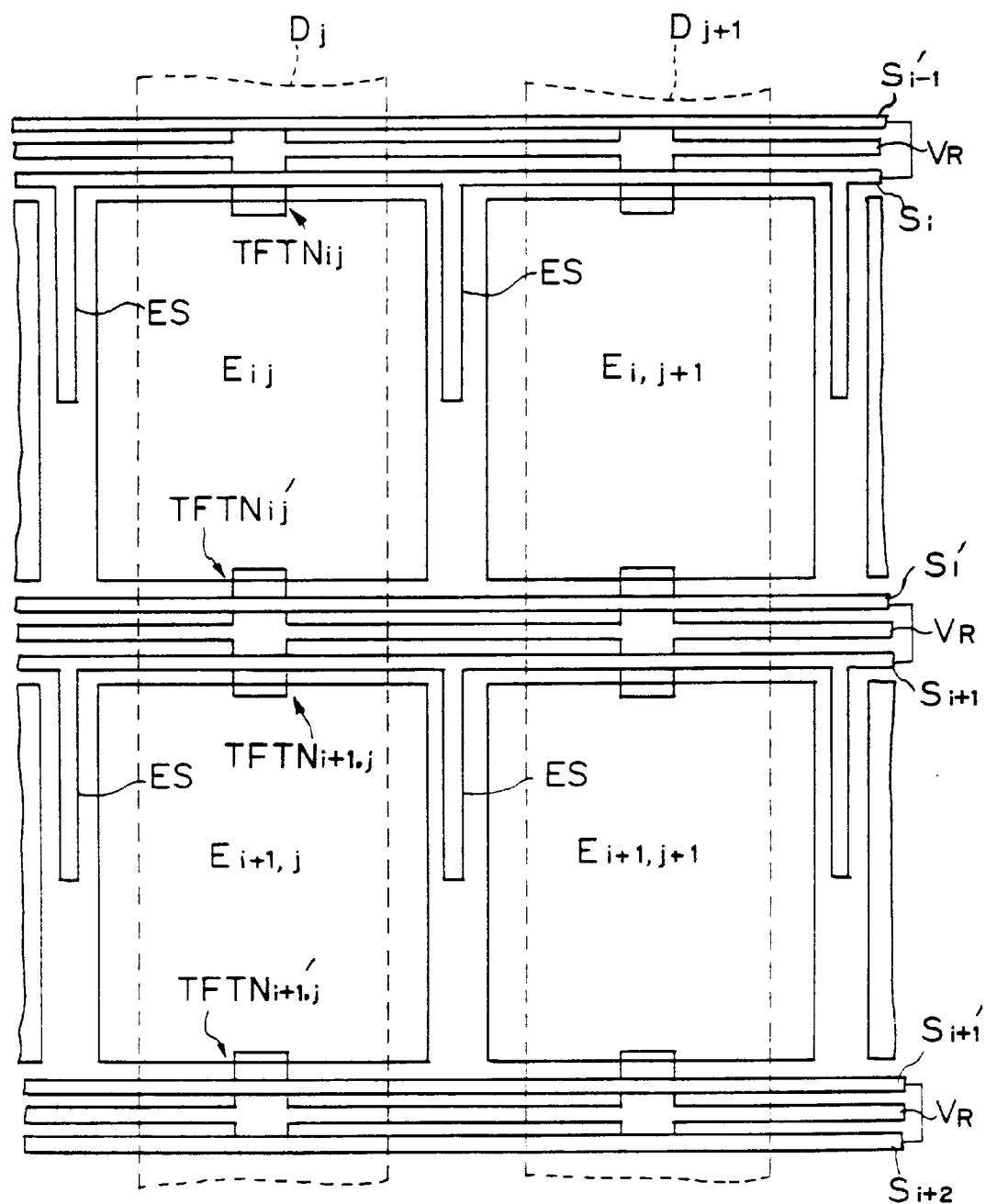
FIG. 30 is a layout diagram illustrating a ninth embodiment of the active matrix-type liquid crystal display device according to the present invention.

In FIG. 30, which is a ninth embodiment of the counter-matrix-type display device according to the present invention, protrusions or extensions ES are added on the downstream side scan bus lines $S_i$, $S_{i+1}$, ..., of FIG. 24. The extensions ES are formed between the display electrodes such as $E_{ij}$, $E_{i,j+1}$, .... As a result, the parasitic electrostatic capacity $C_1$ between the display electrode $E_{ij}$ and the scan bus line $S_i$ is made larger than the parasitic electrostatic capacity $C_2$ between the display electrode $E_{ij}$ and the scan bus line $S_i'$ ($C_1 > C_2$), thus reducing the compensating voltage $-V_{cg}$ in the formula (7).

Figure 31:
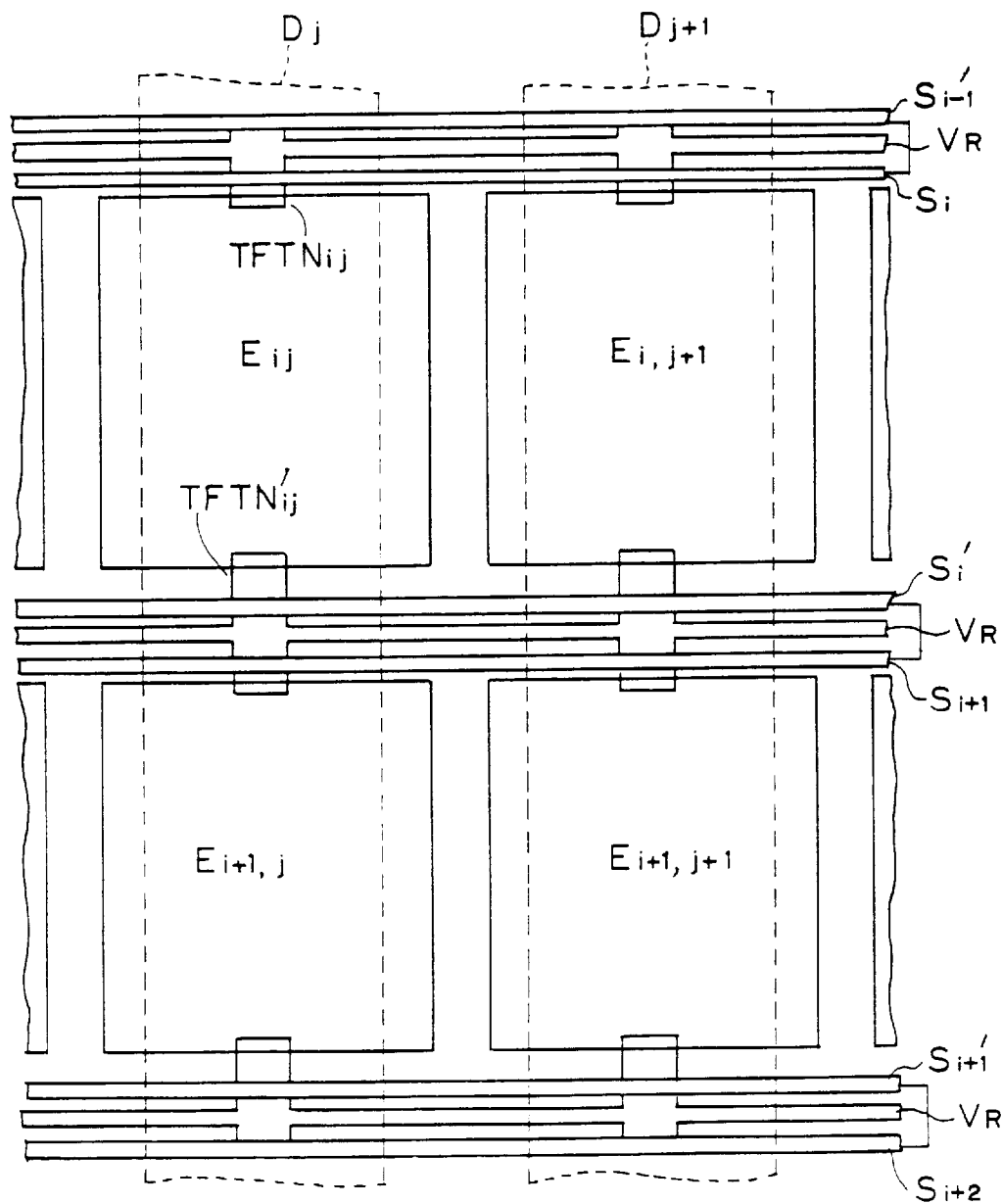
FIG. 31 is a layout diagram illustrating a tenth embodiment of the active matrix-type liquid crystal display device according to the present invention.

In FIG. 31, which is a tenth embodiment of the counter-matrix-type display device according to the present invention, the device of FIG. 24 is modified. That is, the distance between the display electrode $E_{ij}$ and the upstream side scan bus line $S_i$ thereof is smaller than a distance between the display electrode $E_{ij}$ and the downstream side scan bus line $S_i'$ thereof. As a result, the parasitic electrostatic capacity $C_1$ between the display electrode $E_{ij}$ and the scan bus line $S_i$ is made larger than the parasitic electrostatic capacity $C_2$ between the display electrode $E_{ij}$ and the scan bus line $S_i'$ ($C_1 > C_2$), thus reducing the compensating voltage $-V_{cg}$ in the formula (7).

In FIGS. 32A through 32E, which are modifications of FIGS. 25A, and 25B, and 25C, an interlaced scanning is carried out.

In an odd field, when +$V_g$ is applied to the scan bus line $S_{i+1}$ ($S_i'$) as shown in FIG. 32C, −$V_{cg}$ is applied to its adjacent two scan bus lines $S_i$ ($S_{i-1}'$) and $S_{i+2}$ ($S_{i+1}'$) as shown in FIGS. 32B and 32D, and the thin film transistors TFTN$_{ij}'$ and TFTN$_{i+1,j}$ connected to the scan bus line $S_{i+1}$ ($S_i'$) are turned ON, so that the data voltage of the data bus line $D_j$ is applied to two liquid crystal cells.

Then, in the next scanning time period, $+V_g$ is applied to the scan bus line $S_{i+3}$ ($S_{i+2}'$) and $-V_{cg}$ is applied to its adjacent two scan bus lines, and the data voltage of the data bus line $D_j$ is applied to two liquid crystal cells adjacent to the scan bus lines $S_{i+3}$ ($S_{i+2}'$). In an even field, when $+V_g$ is applied to the scan bus line $S_i$ ($S_{i-1}'$) as shown in FIG. 32B, $-V_{cg}$ is applied to its adjacent two scan bus lines $S_{i-1}$ ($S_{i-2}'$) (not shown) and $S_{i+1}$ ($S_i'$) as shown in FIG. 32B, and the thin film transistors TFTN$_{i-1,j}'$ and TFTN$_{ij}$ connected to the scan bus line $S_i$ ($S_{i-1}'$) are turned ON, so that the data voltage of the data bus line $D_j$ is applied to two liquid crystal cells.

Then, in the next scanning time period, $+V_g$ is applied to the scan bus line $S_{i+2}$ ($S_{i+1}'$) and $-V_{cg}$ is applied to its adjacent two scan bus lines, and the data voltage of the data bus line $D_j$ is applied to two liquid crystal cells adjacent to the scan bus lines $S_{i+2}$ ($S_{i+1}'$).

Thus, in each of the odd field and the even field, data is written into every two rows of liquid crystal cells, and in addition, the shift voltage in each of the written liquid crystal cells is compensated for by the scan voltages applied to the two adjacent scan bus lines. Also, only one row to be written is advanced at each switching from an old frame to an even frame or vice versa, thereby carrying out an interlaced scanning. Also, in this case, the voltage $-V_{cg}$ is selected so as to reduce the shift voltage.

The scan signals applied to the scan bus lines $S_{i-1}$ ($S_{i-2}'$) and $S_i$ ($S_{i-1}'$) of FIGS. 32A and 32B are generated by the synchronization circuits 2 and 2' and the switch circuit 3 and 3' of FIG. 1. That is, the switch circuit 3 generates a signal SC$_{OUT1}$ as shown in FIG. 33A, and the switch circuit 3' generates a signal SC$_{OUT2}$ as shown in FIG. 33E. In this case, the voltages $V_1$ and $V_2$ of the switch circuit 3 are $+V_g$ and $-V_{cg}$, respectively, and the voltages $V_1'$ and $V_2'$ of the switch circuit 3' are also $+V_g$ and $-V_{cg}$, respectively. Shift data SD$_1$ as shown in FIG. 33C is supplied to the shift register 22, and shift data SD$_2$ as shown in FIG. 33G is supplied to the shift register 22'. Such shift data SD$_1$ and SD$_2$ are shifted within the shift registers 22 and 22', respectively, in synchronization with shift clock signals SCK$_1$ and SCK$_2$ as shown in FIGS. 33B and 33F, respectively. As a result, the signals applied to the scan bus lines SN$_i$ and SP$_i$ are obtained as shown in FIGS. 33D and 33H, respectively.

Figure 34:
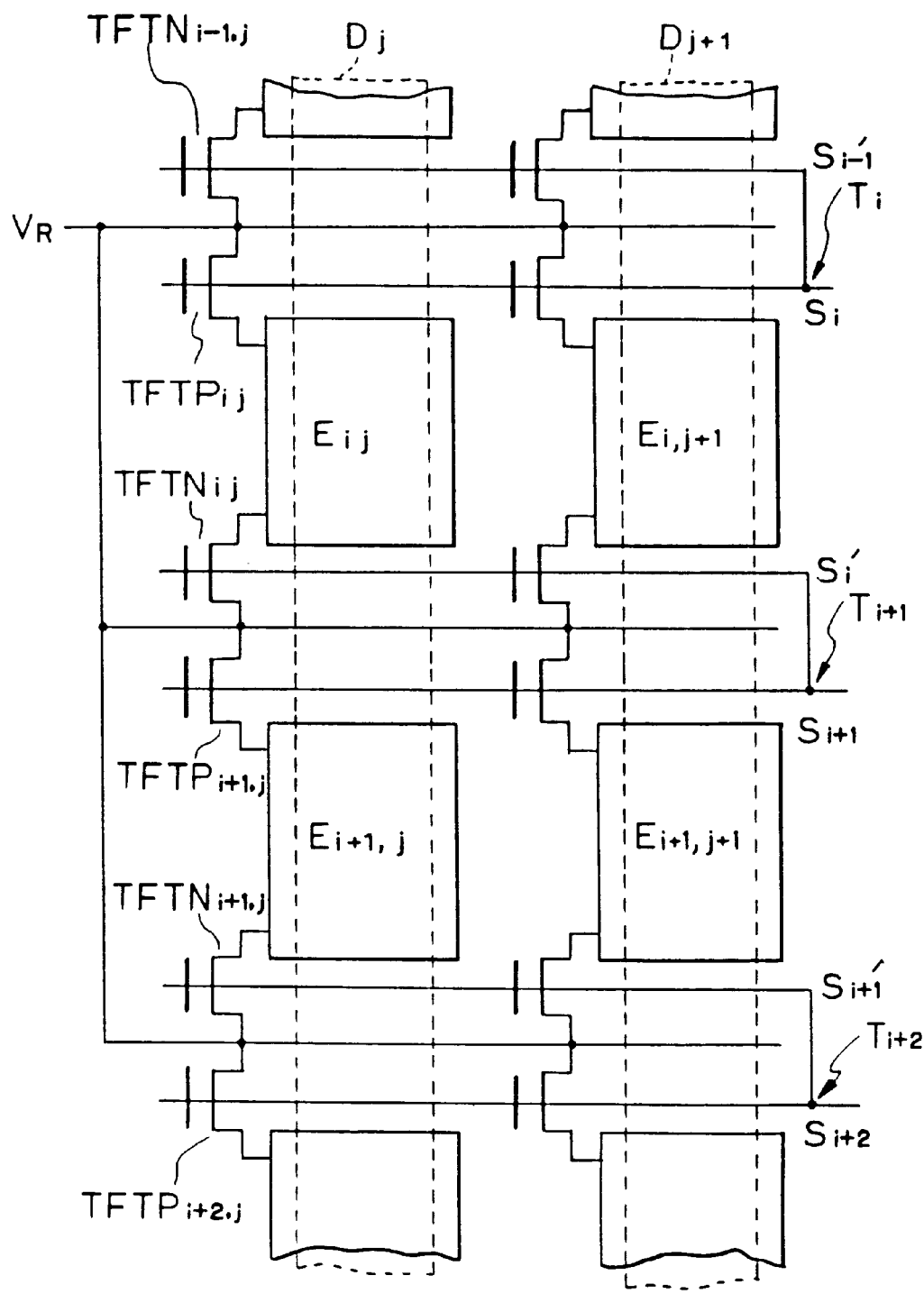
FIGS. 34 is a layout diagram illustrating an eleventh embodiment of the active matrix-type liquid crystal display device according to the present invention.

In FIG. 34, which is an eleventh embodiment of the counter-matrix-type display device according to the present invention, the device of FIG. 23 is modified. That is, the thin film transistors such as TFTP$_{ig}$ connected to the scan bus lines $S_i$, $S_{i+1}$, $S_{i+2}$, . . . are of a P-channel type, and the thin film transistors such as TFTN$_{ij}$ connected to the scan bus lines $S_{i-1}'$ $S_i'$, $S_{i+1}'$, . . . are of an N-channel type.

The operation of the device of FIG. 34 is explained with reference to FIGS. 35A through 35F.

The reference voltage $V_R$ is changed as shown in FIG. 35D. When $+V_g$ is applied to the scan bus line $S_{i+1}$ ($S_i'$) as shown in FIG. 35B, and $-V_{cg}$ is applied to the scan bus line $S_i$ ($S_{i-1}'$) as shown in FIG. 35A, the P-channel thin film transistor TFTP$_{ij}$ connected to the scan bus line $S_i$ is turned ON and the N-channel thin film transistor TFTN$_{ij}$ connected to the scan bus line $S_i'$ is turned ON. As a result, the display electrode E$_{ij}$ is electrically connected to the reference voltage supply line V$_R$ by both of the thin film transistors TFTP$_{ij}$ and TFTN$_{ij}$. Therefore, the liquid crystal voltage V$_{lc}$ is the difference between the reference voltage $V_R$ and the data voltage of the data bus line $D_j$ as shown in FIGS. 35D, 35E, and 35F.

In the above-mentioned state, the N-channel thin film transistor TFTN$_{i-1,j}$ connected to the adjacent display electrode E$_{i-1,j}$ and the P-channel thin film transistor TFTP$_{i+1,j}$ connected to the adjacent display electrode E$_{i+1,j}$ are turned OFF, and accordingly, the data voltage is not applied to the display electrodes E$_{i-1,j}$ and E$_{i+1,j}$.

In the next horizontal scanning time period, when $+V_g$ is applied to the scan bus line $S_{i+2}(S_{i+1})$ as shown in FIG. 35C, and $-V_{cg}$ is applied to the scan bus line $S_{i+1}(S_i')$ as shown in FIG. 35B, the P-channel thin film transistor TFTP$_{i+1,j}$ connected to the scan bus line $S_{i+1}$ is turned ON and the N-channel thin film transistor TFTN$_{i-1,j}$ connected to the scan bus line $S_{i+1,}'$ is turned ON. As a result, the display electrode E$_{i+1,j}$ is electrically connected to the reference voltage supply line V$_R$ by both of the thin film transistors TFTP$_{i+1,j}$ and TFTN$_{i+1,j}$. Therefore, the liquid crystal voltage V$_{lc}$ is the difference between the reference voltage V$_R$ and the data voltage of the data bus line $D_j$ as shown in FIGS. 35D, 35E, and 35F.

In the above-mentioned state, the N-channel thin film transistor TFTN$_{i,j}$ connected to the adjacent display electrode E$_{i,j}$ and the P-channel thin film transistor TFTP$_{i+2,j}$ connected to the adjacent display electrode E$_{i+2,j}$ are turned OFF, and accordingly, the data voltage is not applied to the display electrodes E$_{ij}$ and E$_{i+2,j}$ Note that the scan signals of the scan bus lines $S_i$ ($S_{i-1}'$), $S_{i+1}$ ($S_i'$), . . . can be generated in the same way as in FIGS. 10A through 10H.

Also, in FIG. 34, the P-channel thin film transistors and the N-channel thin film transistors can be exchanged with each other.

In FIG. 36, which is a twelfth embodiment of the counter-matrix-type display device according to the present invention, the device of FIG. 23 is modified. In general, in FIG. 23, the gates of thin film transistors serve as one part of the scan bus lines, and they are of a multi-layer configuration. In addition, the portions of the gates of the thin film transistors are easily disconnected. Therefore, if the gates of the thin film transistors are disconnected, the scan bus lines are disconnected. Particularly, in the device of FIG. 23, the two thin film transistors such as TFTN$_{i-1,j}'$ and TFTN$_{ij}$ are very close to each other, so that disconnections are easily caused in the scan bus lines. Conversely, in FIG. 36, the two thin film transistors TFTN$_{i-1,j}$ and TFTN$_{ij}$ each connected to a pair of the scan bus lines such as $S_i$ and $S_{i-1}'$, are distant from each other, thus avoiding the possible disconnection of the scan bus lines.

Also, the scan signals are supplied to the pairs of the scan bus lines $S_{i-1}'$ and $S_i$, $S_i'$ and $S_{i+1}$, $S_{i+1}'$ and $S_{i+2}$, . . . from both sides thereof. As a result, unless two or more continuous disconnections occur in the scan bus lines, all of the thin film transistors can be driven by scan signals, so that no defective display is generated.

The manufacturing steps for the active liquid crystal device of FIG. 36 are explained with reference to FIGS. 37A through 40A and FIGS. 37B through 40B, which are cross-sectional views taken along the line B—B of FIGS. 37A through 40A, respectively.

Figure 37A:
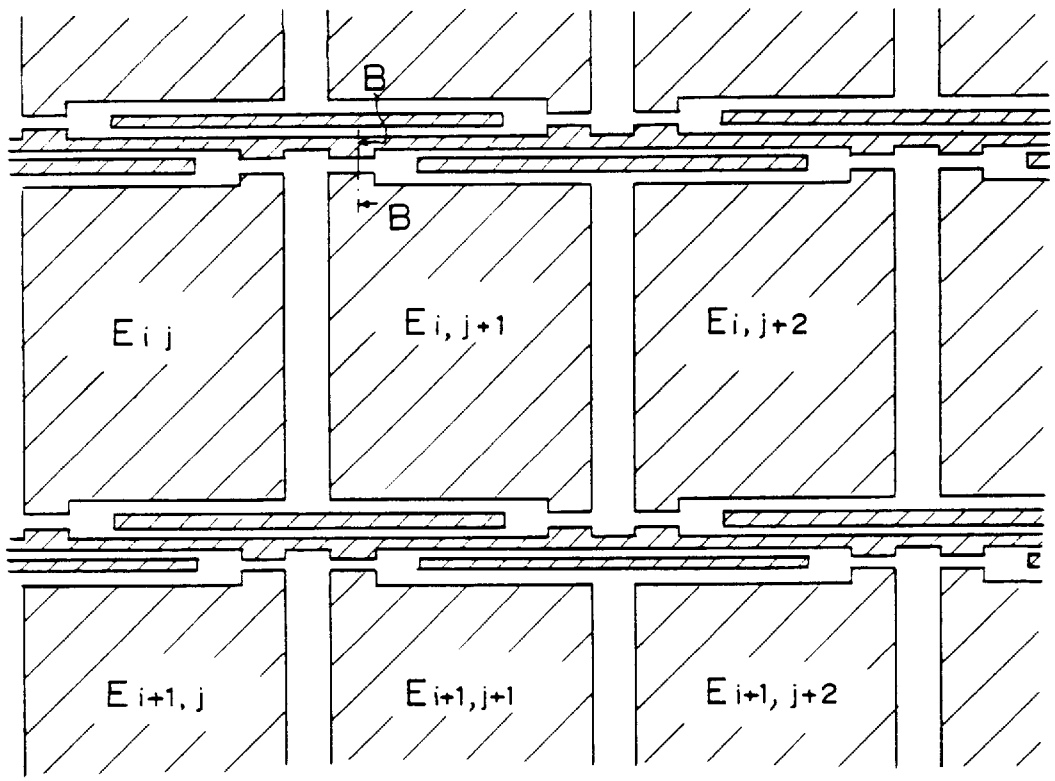
Figure 37B:
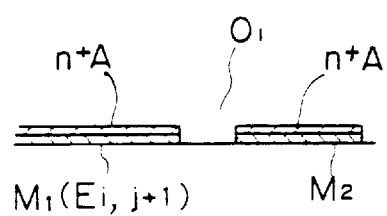

As shown in FIGS. 37A and 37B, an ITO having a thickness of about 50 nm is deposited on the glass substrate (not shown) by a sputtering method, to obtain a transparent conductive layer (M$_1$, M$_2$), and n$^+$-amorphorous silicon having a thickness of about 30 nm is deposited thereon by a plasma chemical vapor deposition (CVD) method, to obtain an ohmic contact layer (n+A) on the transparent conductive layer. Thereafter, a patterning operation using a conventional photolithography method is carried out. In FIG. 37B, the transparent conductive layer $M_1$ is a part of the display electrode $E_{i,j+1}$, and the transparent conductive layer $M_2$ is used for connecting a reference voltage supply line $V_R$. Also, $O_1$ designates an opening for a thin film transistor.

Figure 38A:
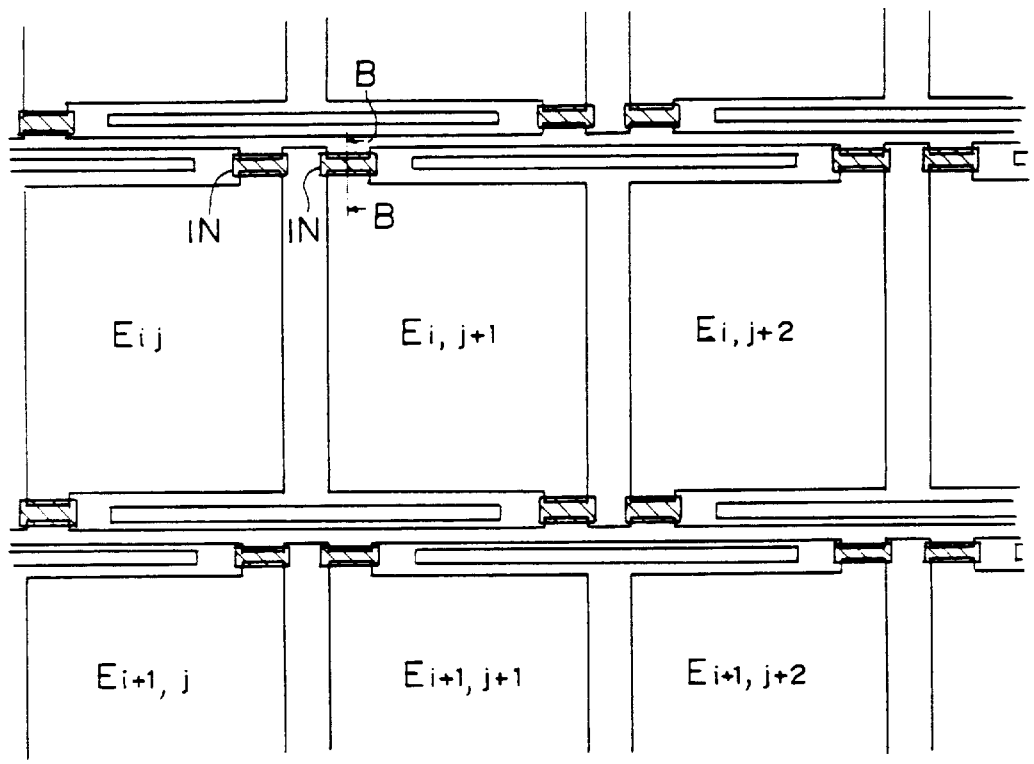
Figure 38B:
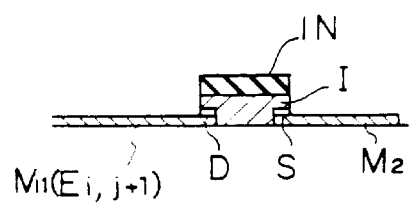

Next, as shown in FIGS. 38A and 38B, amorphorous silicon, which is intrinsic semiconductor, is deposited, to obtain an intrinsic layer I, and a silicon nitride ($S_{i3}N_4$) layer IN is deposited thereon by using the plasma CVD method. Note that the amorphorous silicon layer I and the $S_{i3}N_4$ layer IN are about 30 nm and 50 nm in thickness, respectively. Then, a patterning operation is carried out to obtain a configuration as shown in FIG. 38B.

Figure 39A:
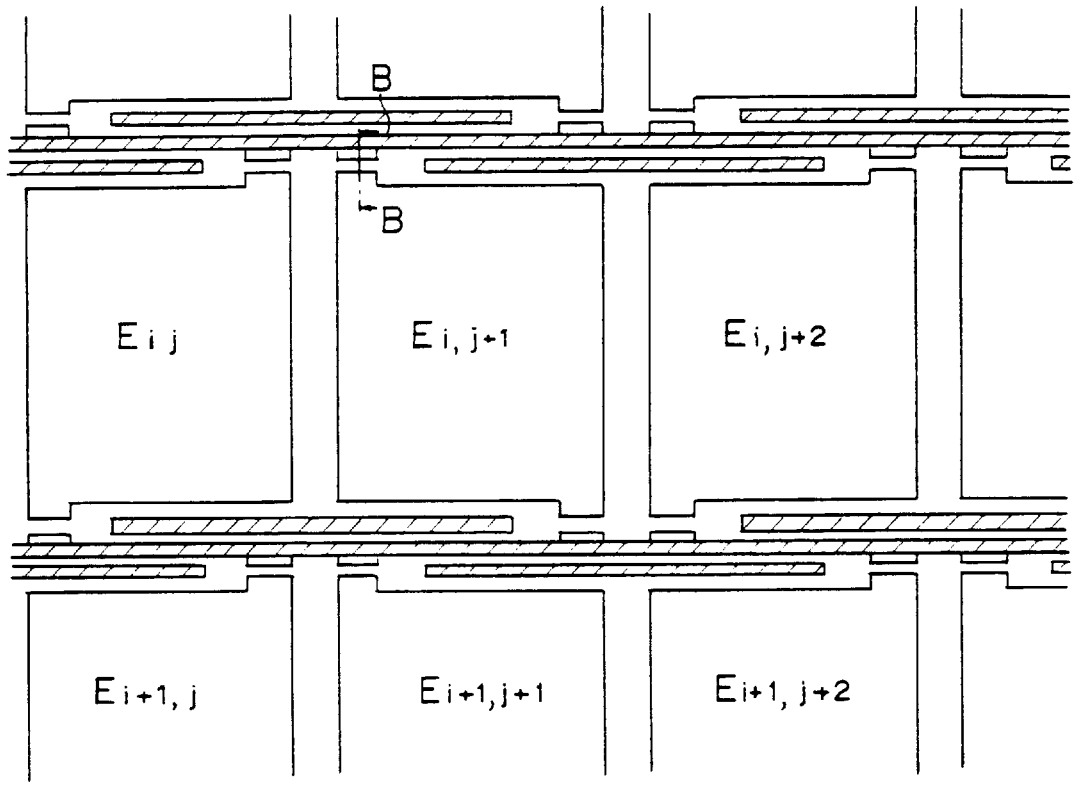
Figure 39B:
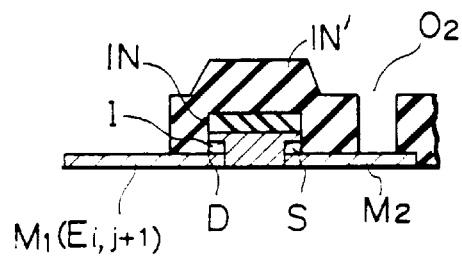

Next, as shown in FIGS. 39A and 39B, another silicon nitride ($S_{i3}N_4$) layer IN' having a thickness of about 250 nm is deposited, and then, a patterning operation is carried out to form an opening $O_2$ as shown in FIG. 39B.

Figure 40A:
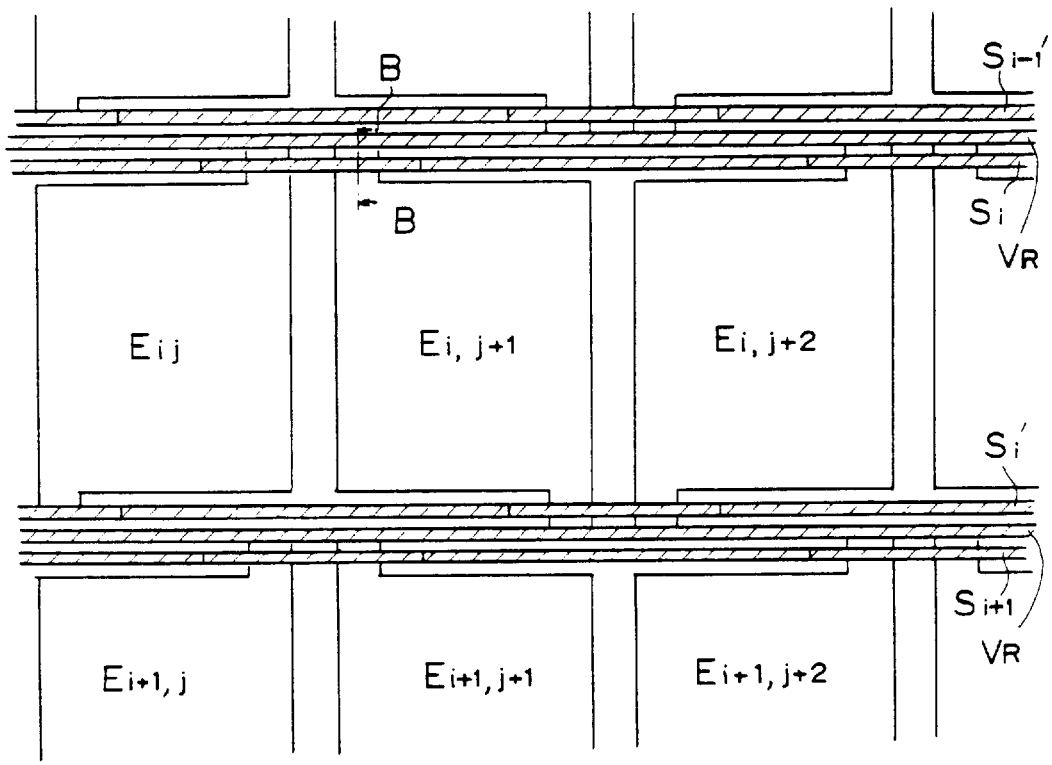
Figure 40B:
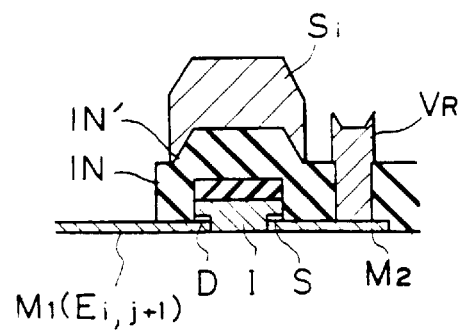

Finally, as shown in FIGS. 40A and 40B, an aluminum (Al) layer is deposited by the sputtering, and then a patterning operation is carried out to obtain the scan bus line $S_i$ and the reference voltage supply line $V_R$.

Figure 41:
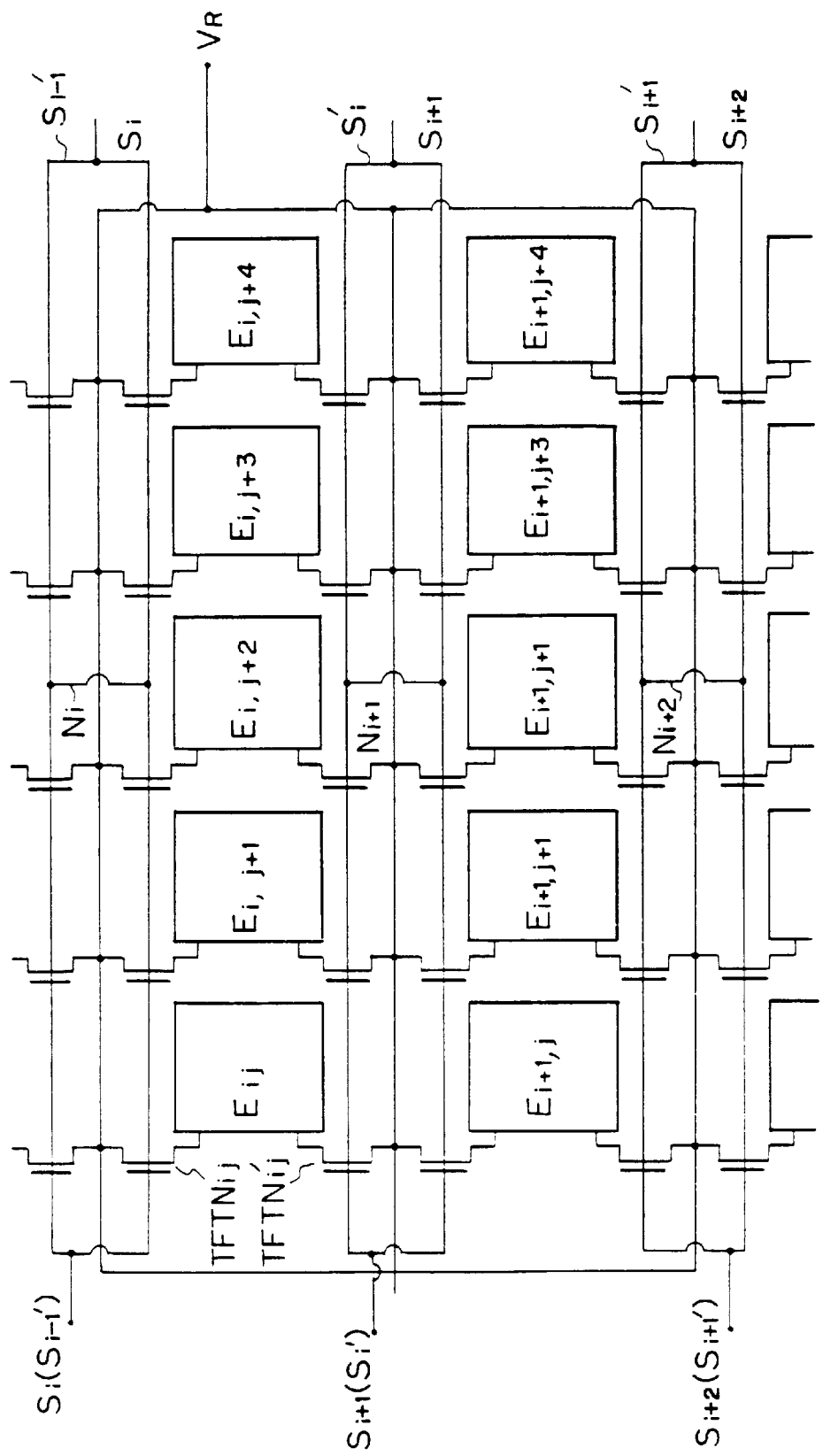
FIG. 41 is a circuit diagram illustrating a thirteenth embodiment of the active matrix-type liquid crystal display drive according to the present invention.

In FIG. 41, which is a thirteenth embodiment of the counter-matrix-type display device according to the present invention, the device of FIG. 23 is also modified. That is, connections $N_i$, $N_{i+1}$, $N_{i+2}$, ... are provided for the pairs of the scan bus lines $S_{i-1}'$ and $S_i$, $S_i'$ and $S_{i+1}$, $S_{i+1}'$ and $S_{i+2}$, .... As a result, unless two or more continuous disconnections occur in the scan bus lines, all of the thin film transistors can be driven by scan signals, so that no defective display is generated. Particularly, in the case of the thin film transistors having a top gate staggered configuration, when a conductive layer between the pair of the scan bus lines such as $S_i$ and $S_{i-1}'$ is the same as a conductor layer of the sources and drains of the thin film transistors, the presence of the above-mentioned connections $N_i$, $N_{i+1}$, ... hardly affects the reference voltage supply line $V_R$ at the intersections thereof with the connection electrodes such as $N_1$, $N_{i+1}$, ... (see FIG. 45C). That is, these intersections have a cross-sectional configuration similar to thin film transistors (see: FIGS. 45B and 45C), thereby to minimize the areas occupied by the connections between the pairs of the scan bus lines. For example, for a 480×640 dot color panel, an occupied area of the thin film transistors per one scan line is 5×20×640×3= 192000 $\mu m^2$, if an occupied area of one thin film transistor is 5×20 $\mu m^2$ (see: $S_1$ of FIG. 43A).

Contrary to this, if there are provided ten connections per one pair of scan bus lines, an occupied area of the connections per one scan line (see: $S_2$ of FIG. 43A) is 10×10×10= 1000 $\mu m^2$.

Thus, the increased occupied area by the connections is less than 1%.

The manufacturing steps for the active liquid crystal device of FIG. 41 are explained with reference to FIGS. 42A through 45A, FIGS. 42B through 45B, which are cross-sectional views taken along the line B—B of FIGS. 42A through 45A, respectively, and FIGS. 42C through 45C, which are cross-sectional views taken along the line C—C of FIGS. 42A through 45A, respectively.

Figure 42A:
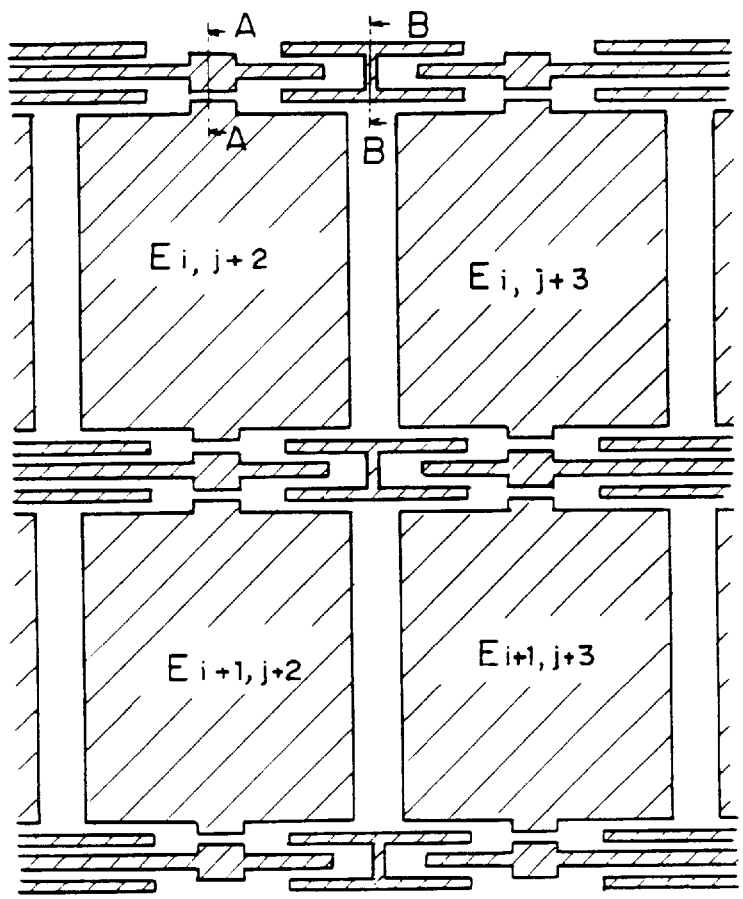
Figure 42B:
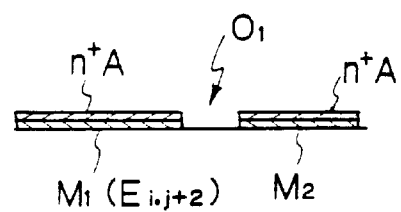
Figure 42C:
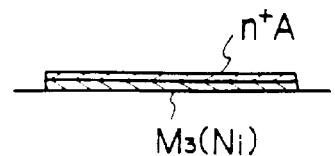

As shown in FIGS. 42A, 42B, and 40C, an ITO having a thickness of about 50 nm is deposited on the glass substrate (not shown) by a sputtering method, to obtain a transparent conductive layer ($M_1$, $M_2$, $M_3$), and $N^+$-amorphorous silicon having a thickness of about 30 nm is deposited thereon by a plasma chemical vapor deposition (CVD) method, to obtain an ohmic contact layer (n+A) to the transparent conductive layer. Thereafter, a patterning operation using a conventional photolithography method is carried out. In FIG. 42B, the transparent conducive layer $M_1$ is a part of the display electrode $E_{i,j+2}$, and the transparent conductive layer $M_2$ is used for connecting a reference voltage supply line $V_R$. Also, $O_1$ designates an opening for a thin film transistor. Further, in FIG. 42C, the transparent conductive layer $M_3$ serves as the connection $N_i$.

Figure 43A:
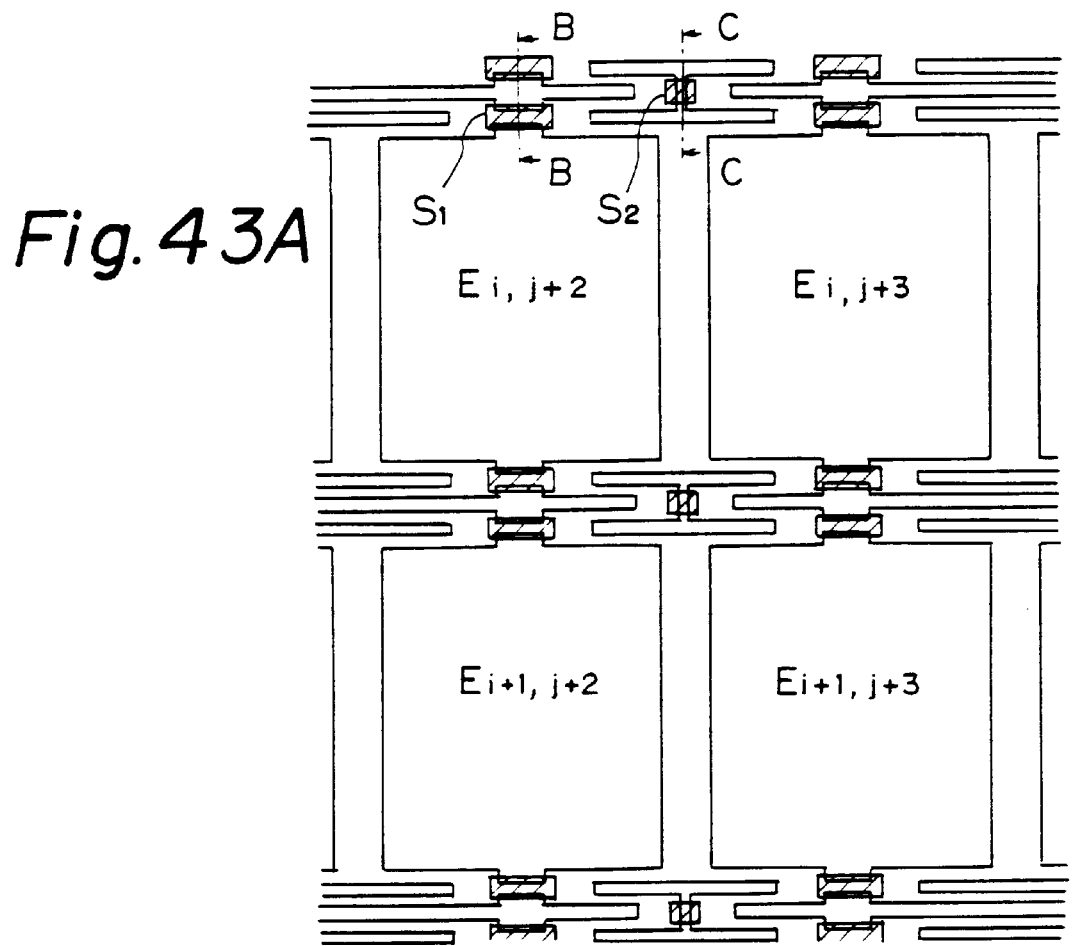
Figure 43B:
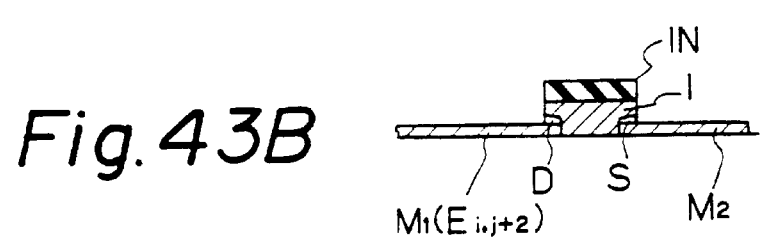
Figure 43C:
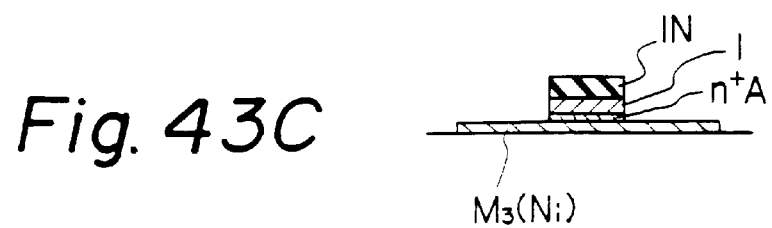

Next, as shown in FIGS. 43A, 43B, and 43C, amorphorous silicon, which is intrinsic semiconductor, is deposited, to obtain an intrinsic layer I, and a silicon nitride ($S_{i3}N_4$) layer IN is deposited thereon by using the plasma CVD method. Note that the amorphorous silicon layer I and the $S_{i3}N_4$ layer IN are about 30 nm and 50 nm in thickness, respectively. Then, a patterning operation is carried out to obtain a configuration as shown in FIG. 43B and 43C.

Figure 44A:
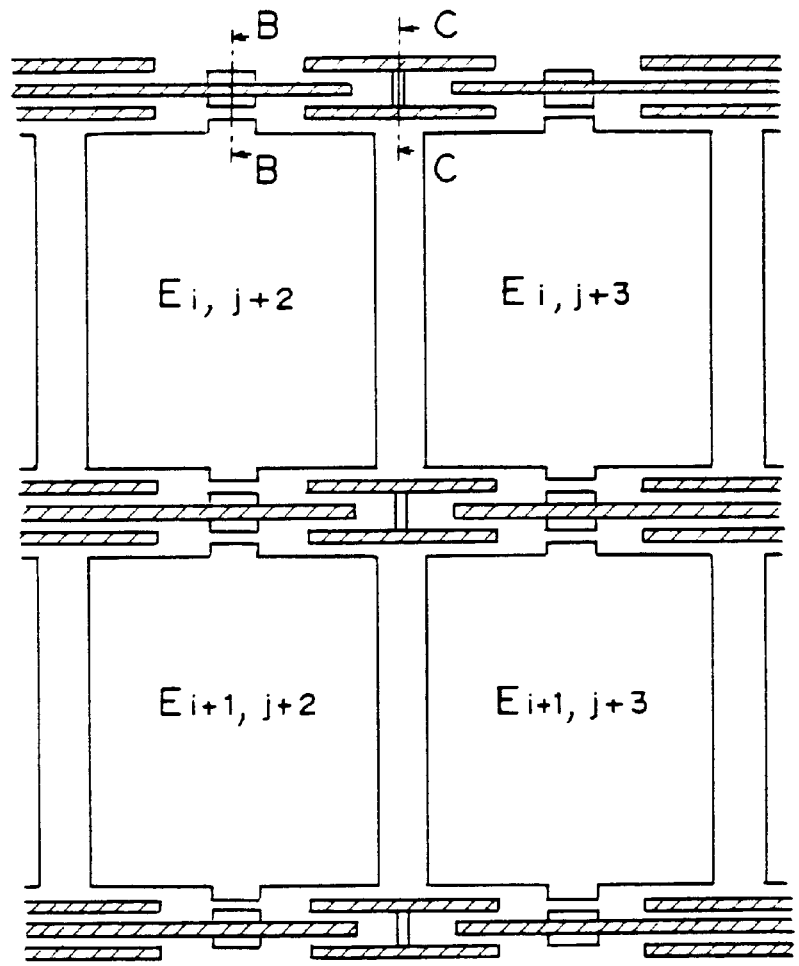
Figure 44B:
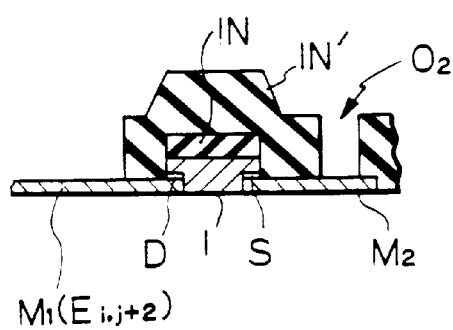
Figure 44C:
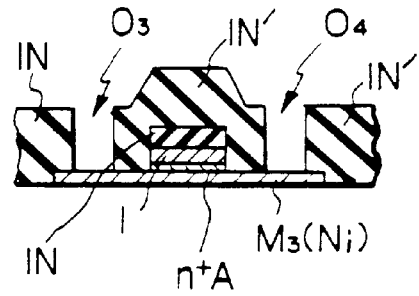

Next, as shown in FIGS. 44A, 44B, and 44C, another silicon nitride ($S_{i3}N_4$) layer IN' having a thickness of about 250 nm is deposited, and then, a patterning operation is carried out to form an opening $O_2$ as shown in FIG. 44B, and openings $O_3$ and $O_4$ as shown in FIG. 44C.

Figure 45A:
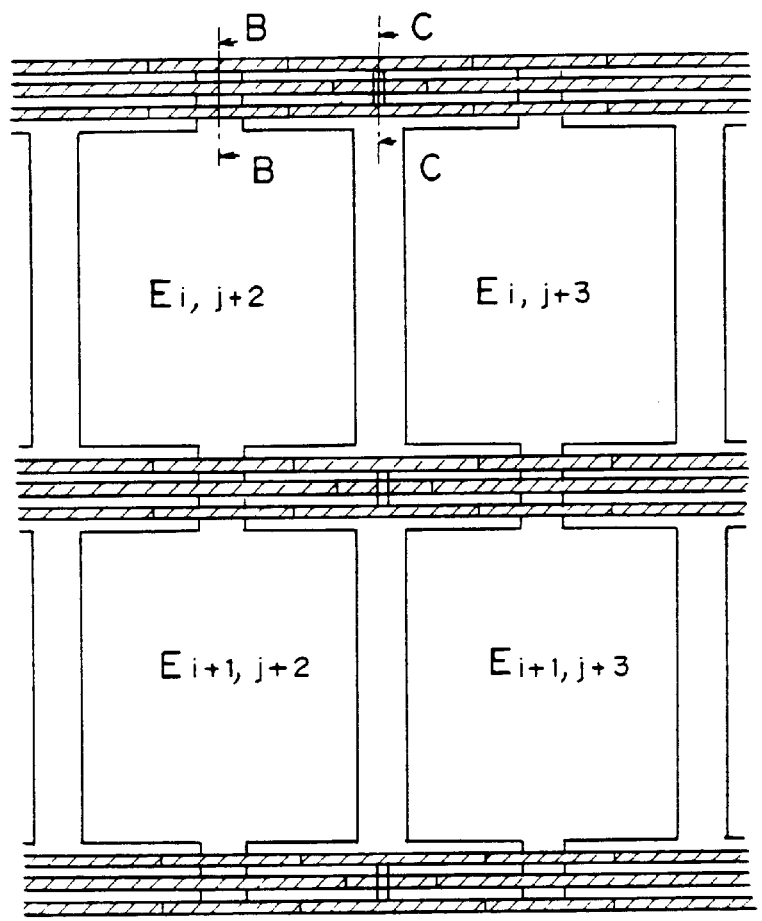
Figure 45B:
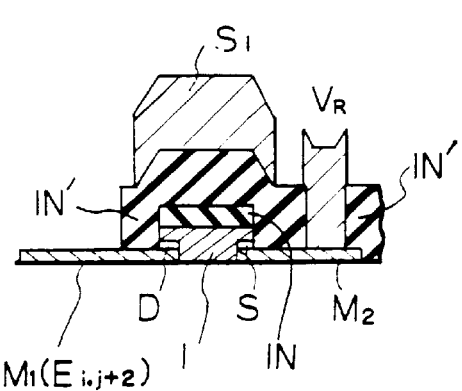
Figure 45C:
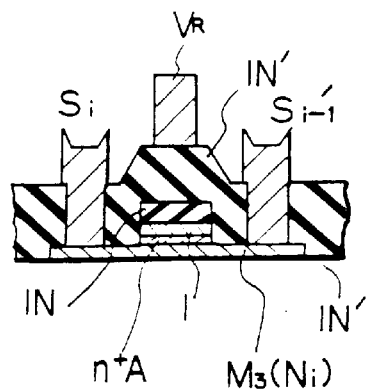

Finally, as shown in FIGS. 45A, 45B, and 45C, an aluminum (Al) layer is deposited by sputtering, and then a patterning operation is carried out to obtain the scan bus line $S_i$ and the reference voltage supply line $V_R$ as shown in FIG. 45B, and the scan bus lines $S_i$ and $S_{i-1}'$ and the reference voltage supply line $V_R$ as shown in FIG. 45C.

Figure 46:
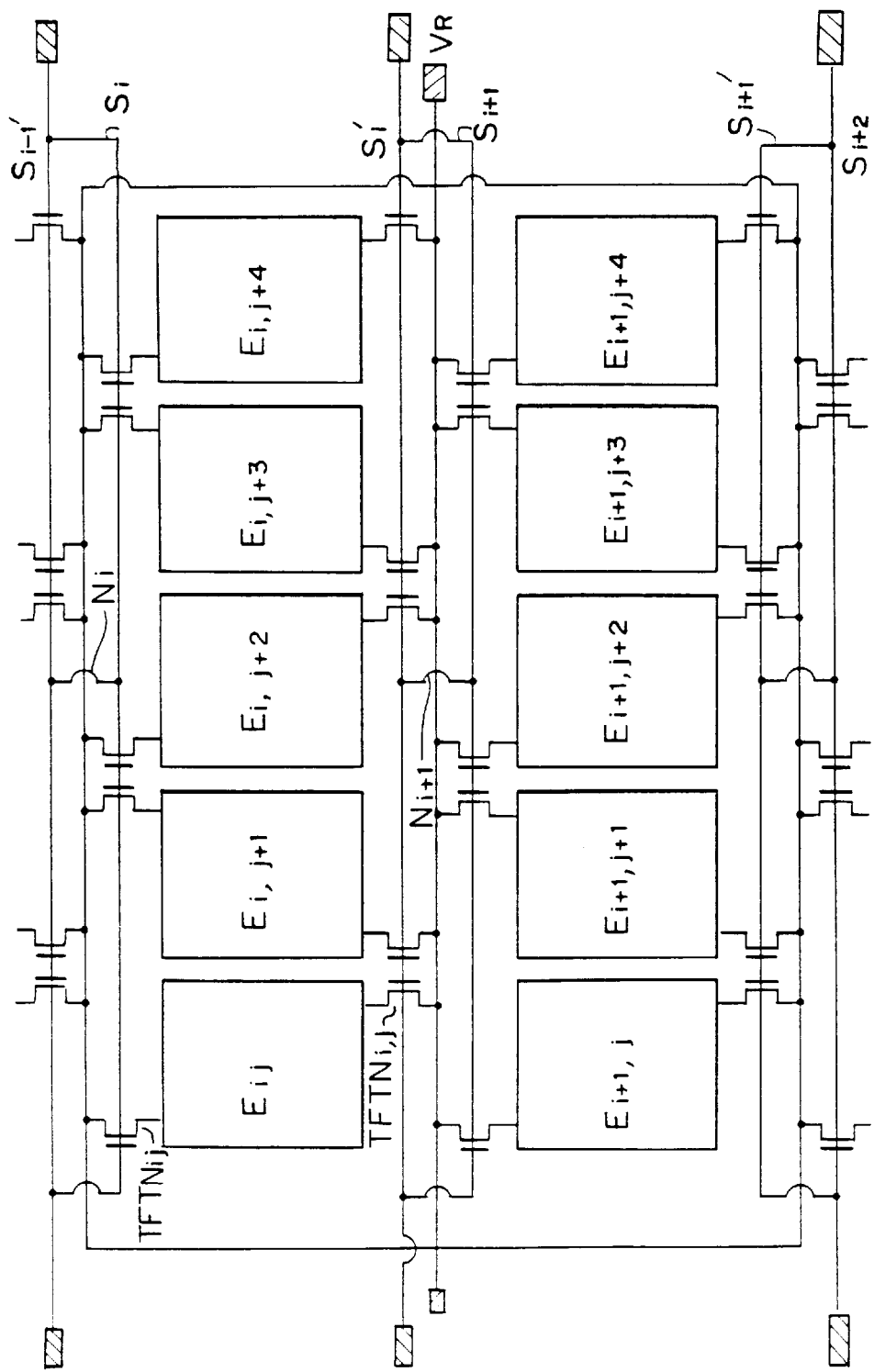
FIG. 46 is a circuit diagram illustrating a fourteenth embodiment of the active matrix-type liquid crystal display device according to the present invention.
Figure 47A:
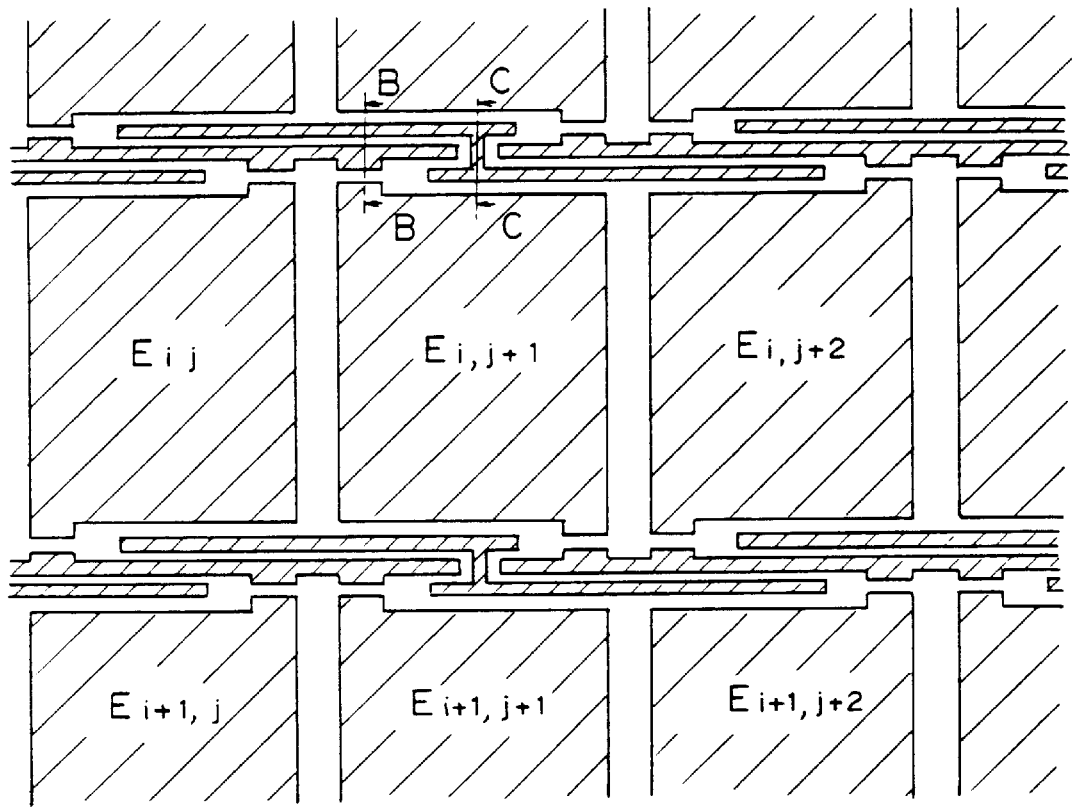
Figure 47B:
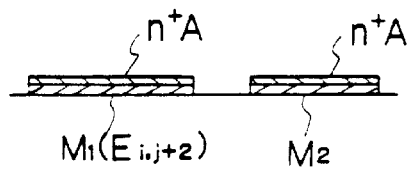
Figure 47C:
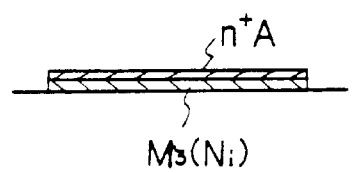
Figure 48A:
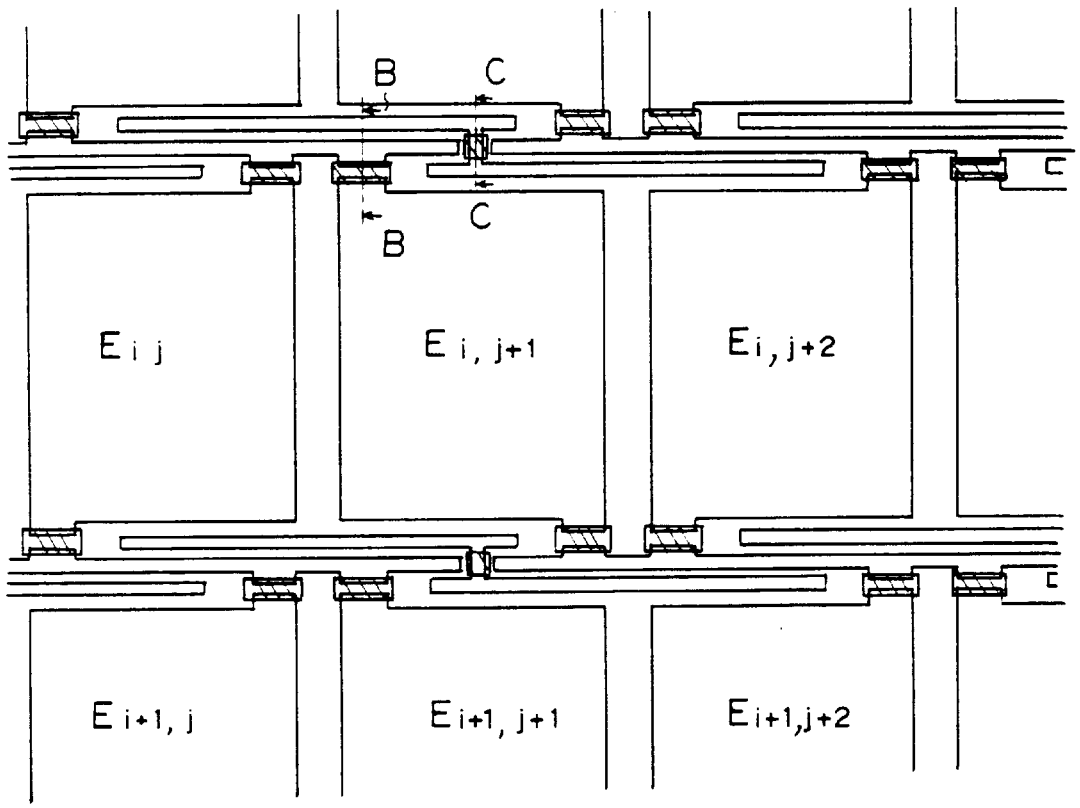
Figure 48B:
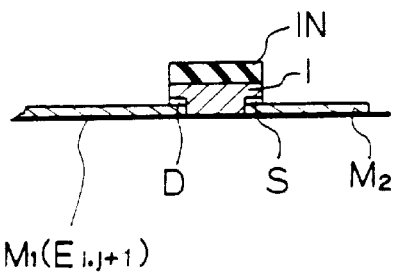
Figure 48C:
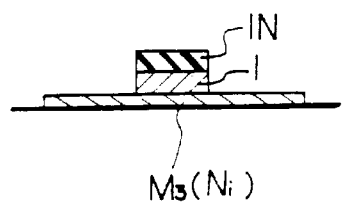
Figure 49A:
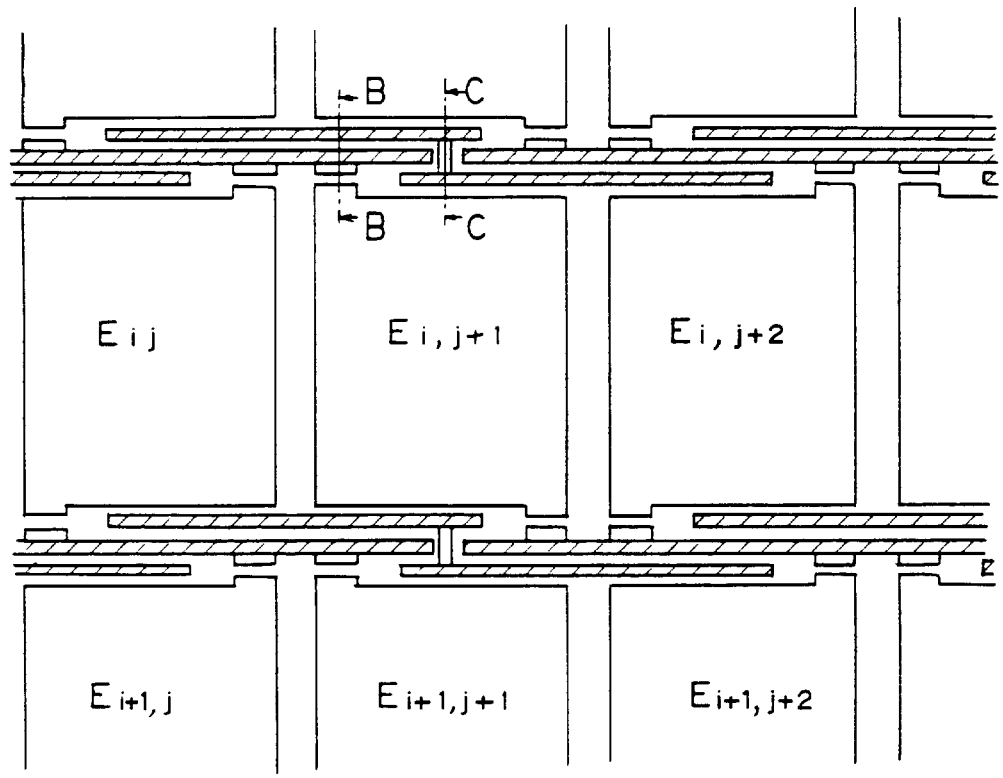
Figure 49B:
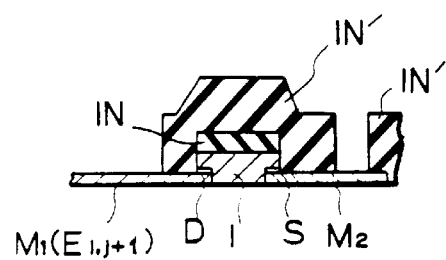
Figure 49C:
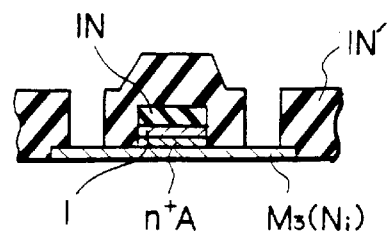
Figure 50A:
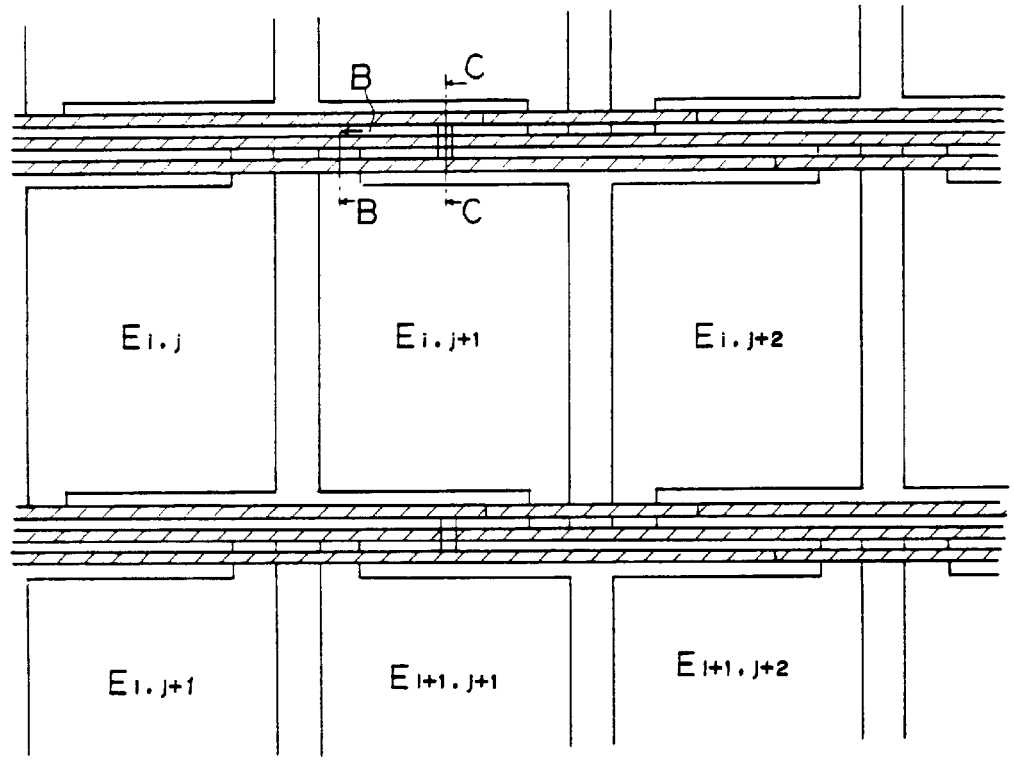
Figure 50B:
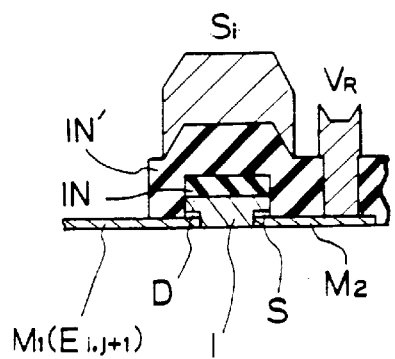
Figure 50C:
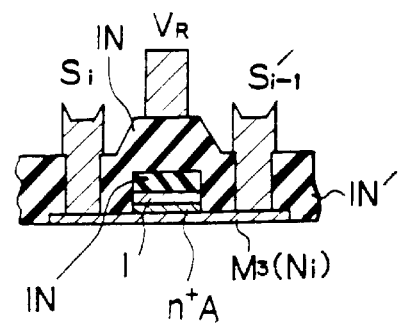

In FIG. 46, which is a fourteenth embodiment of the counter-matrix-type display device according to the present invention, the device of FIG. 36 and the device of FIG. 41 are combined, thus avoiding the occurrence of disconnections in the scan bus lines, and avoiding a defective display even if some disconnections occur in the scan bus lines.

The manufacturing steps for the active liquid crystal device of FIG. 46 are shown in FIGS. 47A through 50A, FIGS. 47B through 50B, which are cross-sectional views taken along the line B—B of FIGS. 47A through 50A, respectively, and FIGS. 47C through 50C, which are cross-sectional views taken along the line C—C of FIGS. 47A through 50A, respectively. However, the description of FIGS. 47A through 50A, FIGS. 47B through 50B, and FIGS. 47C through 50C is omitted, since these figures can be easily understood from the descriptions with respect to FIGS. 37A through 40A, FIGS. 37B through 40B, FIGS. 42A through 45A, FIGS. 42B through 45B, and FIGS. 42C through 45C.

Figure 51:
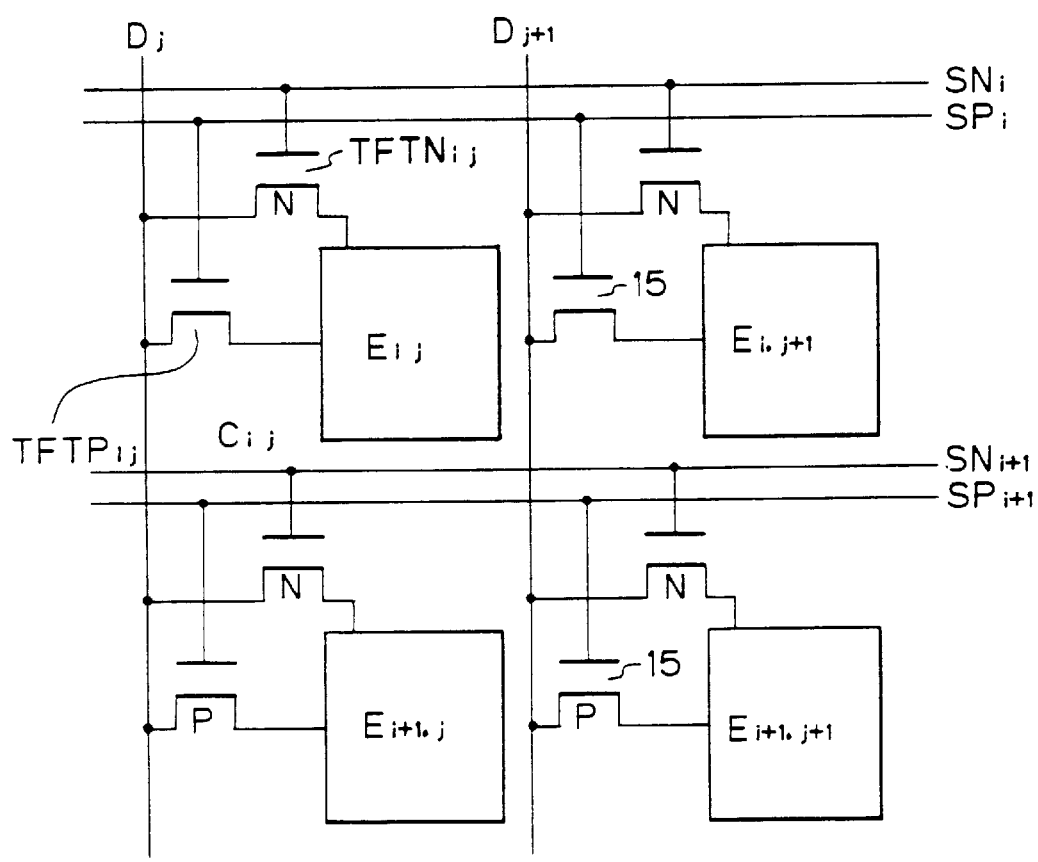
FIG. 51 is a layout diagram illustrating a fifteenth embodiment of the active matrix-type liquid crystal device according to the present invention.

Although all the above-mentioned embodiments relate to a counter-matrix-type active liquid crystal display device as shown in FIG. 3, the present invention can be applied to a conventional active matrix-type liquid crystal display device as shown in FIG. 2. For example, if the device of FIG. 5 is applied to the conventional active matrix-type liquid crystal display device, a device as illustrated in FIG. 51 is obtained.

In the above-mentioned embodiments, liquid crystal is used as an electro-optic element; however, an electroluminescence element, an electrochromic element, and the like can be also used. Various configurations, shapes, materials, and the like can be used for the above-mentioned active-type liquid crystal panel.

As described above, according to the present invention, the shift voltage due to the various parasitic electrostatic capacities can be compensated for, to reduce the crosstalk, thereby improving the display quality. For example, the flickering can be avoided and the generation of a residual image phenomenon of a stationary image can be avoided.

Also, since a redundancy in configuration is present for switching elements, it is possible to drive the switching element by one switching element even when another switching element is defective.

We claim:

1. An active matrix-type display device, comprising:
    a plurality of pairs of first and second scan bus lines formed in parallel and spaced relationship;
    a plurality of data bus lines formed in parallel and spaced relationship;
    a plurality of rows of display electrodes, each row comprising plural, respective display electrodes;
    a plurality of pairs of first switching elements and second switching elements, said first switching elements being turned ON when potentials of control gates of said first switching elements are positive and said second switching elements being turned ON when potentials of control gates of said second switching elements are negative, each pair of said first and second switching elements being connected to a respectively corresponding display electrode;
    one pair of said first and second scan bus lines being associated with each row of said display electrodes and, further, a first scan bus line and a second scan bus line which respectively correspond to different, adjacent rows of said display electrodes, being integral; and
    the control gates of said first switching elements being connected to said first scan bus lines and the control gates of said second switching elements being connected to said second scan bus lines, the potentials by which said first and second switching elements of each pair, connected to a respectively corresponding display electrode, are turned ON being simultaneously applied to the corresponding first and second scan bus lines.

2. An active matrix-type display device as recited in claim 1, wherein:
    said first and second scan bus lines are respectively arranged at both sides of said row of said display electrodes, and a first scan bus line and a second scan bus line, which are adjacent to each other and which respectively correspond to different adjacent rows of said display electrodes, are integral.

3. An active matrix-type display device as recited in claim 1, wherein:
    two pairs of said first and second scan bus lines, for two adjacent rows of said display electrodes, are arranged between said two adjacent rows of said display electrodes, and said first and second scan bus lines of respective, different display rows are integral.

4. An active matrix-type display device as recited in claim 1, wherein:
    the positive scan voltage $V_{GN}$ and the negative scan voltage $-V_{GP}$, by which said first and second switching elements of each pair connected to one of said rows of display electrodes are turned ON, being simultaneously applied to the corresponding first and second scan bus lines and satisfying a formula;

$$V_{GN}/V_{GP}=C_2/C_1$$

wherein $C_1$ is an electrostatic capacity between said display electrode and said first scan bus line corresponding to said display electrode and $C_2$ is an electrostatic capacity between said display electrode and said second scan bus line corresponding to said display electrode.

5. An active matrix-type display device as recited in claim 1, wherein said active matrix-type display device is a counter-matrix type display device.

6. An active matrix-type display device as recited in claim 1, further comprising:
    first and second insulating substrates, arranged in parallel to each other and having electro-optic material filled therebetween;
    said plurality of pairs of first and second scan bus lines being formed on said first insulating substrate; and
    said plurality of data bus lines being formed on said second insulating substrate.

7. An active matrix-type display device, comprising:
    a plurality of pairs of first and second scan bus lines formed in parallel and spaced relationship;
    a plurality of data bus lines formed in parallel and spaced relationship;
    a plurality of rows of display electrodes, each row comprising plural, respective display electrodes;
    a plurality of pairs of first switching elements and second switching elements, said first switching elements being turned ON when potentials of control gates of said first switching elements are positive and said second switching elements being turned ON when potentials of control gates of said second switching elements are negative, each pair of said first and second switching elements being connected to a respectively corresponding display electrode;
    one pair of said first and second scan bus lines being associated with each row of said display electrodes; and
    the control gates of said first switching elements being connected to said first scan bus lines and the control gates of said second switching elements being connected to said second scan bus lines, the potentials of a positive scan voltage $V_{GN}$ and a negative scan voltage $-V_{GP}$, by which said first and second switching elements of each pair connected to a respectively corresponding display electrode are turned ON, being simultaneously applied to the corresponding first and second scan bus lines and satisfying a formula:

$$V_{GN}/V_{GP}=C_2/C_1$$

wherein $C_1$ is an electrostatic capacity between said display electrode and said first scan bus line corresponding to said display electrode and $C_2$ is an electrostatic capacity between said display electrode and said second scan bus line corresponding to said display electrode.

8. An active matrix-type display device as recited in claim 7, which comprises a counter-matrix type display device.

9. An active matrix-type display device as recited in claim 7, further comprising:
    first and second insulating substrates, arranged in parallel to each other and having electro-optic material filled therebetween;
    said plurality of pairs of first and second scan bus lines being formed on said first insulating substrate; and
    said plurality of data bus lines being formed on said second insulating substrate.

10. An active matrix-type display device comprising:
    a plurality of data bus lines formed in parallel and spaced relationship;
    a plurality of display electrodes arranged in respective, plural rows extending in a lateral direction and disposed in successive, spaced relationship in a direction transverse to the lateral direction;
    a plurality of scan bus lines extending in parallel in the lateral direction and arranged in alternating succession with the plural rows of display electrodes, every two successive scan bus lines having a respectively corresponding row of display electrodes disposed therebetween and being related thereto as a pair of upper and lower scan bus lines; and a plurality of pairs of first and second switching elements respectively associated with the plurality of display electrodes, each switching element having a corresponding control gate and the first and second switching elements of each pair thereof having the corresponding control gates thereof respectively connected to the upper and lower scan bus lines of the pair thereof related to the respectively associated display electrode, said first and second switching elements being turned ON when the corresponding control gates thereof are respectively at first and second, opposite potentials.

11. An active matrix-type display device as recited in claim 10, further comprising:

a driver circuit which sequentially selects the scan bus lines as successive pairs of upper and lower scan bus lines respectively corresponding to the successive, plural rows of display electrodes and which simultaneously supplies the first and second, opposite potentials selectively and respectively to the upper and lower scan bus lines of each selected pair thereof, in sequential succession for all of the plural rows of display electrodes and respectively corresponding pairs of upper and lower scan bus lines in each display frame.

12. An active matrix-type display device as recited in claim 10, wherein the respective display electrodes of the plural rows, further, are arranged in alignment in columns extending in the transverse direction, each display electrode having first and second, opposite edges extending in the transverse direction, further comprising:

a plurality of reference voltage supply lines respectively corresponding to the plurality of aligned columns of display electrodes, each reference voltage supply line extending in the transverse direction and disposed in spaced relationship with respect to the first edges of the display electrodes of the respectively corresponding column; and the first and second switching elements of each pair thereof connecting respectively associated, transversely spaced positions on the first transverse edge of the respectively associated display electrode to the respectively corresponding reference voltage supply line.

13. An active matrix-type display device comprising:

a plurality of data bus lines formed in parallel and spaced relationship;

a plurality of display electrodes arranged in respective, plural rows extending in a lateral direction and disposed in successive, spaced relationship in a direction transverse to the lateral direction, the rows of display electrodes being arranged, further, as successive pairs of parallel display electrode rows spaced in the transverse direction, each pair of display electrode rows comprising an upper display electrode row and a lower display electrode row and each row comprising plural respective display electrodes;

a plurality of scan bus lines extending in parallel in the lateral direction and arranged as plural, successive pairs of upper and lower scan bus lines respectively associated with the plural successive pairs of upper and lower display electrode rows, each pair of first and second scan bus lines being disposed between the upper and lower display electrode rows of the respectively associated pair thereof;

a plurality of pairs of first and second switching elements respectively associated with the plurality of display electrodes and respectively arranged in plural and successive pairs of switching element rows, each pair comprising an upper switching element row and a lower switching element row and each switching element row comprising plural pairs of first and second switching elements and each pair of first and second switching elements having corresponding, first and second control gates; and for each pair of upper and lower rows of switching elements and the respectively corresponding pair of upper and lower rows of display electrodes, the pairs of first and second switching elements of the upper switching element row have the corresponding first and second control gates thereof respectively connected to the upper and lower scan bus lines of the respectively corresponding pair thereof and the pairs of first and second switching elements of the lower switching element row have the corresponding first and second control gates thereof respectively connected to the lower and upper scan bus lines of the respectively corresponding pair thereof, said first and second switching elements of each of said plurality of pairs thereof being simultaneously turned ON when the corresponding, first and second control gates thereof are respectively at the first and second, opposite potentials.

14. An active matrix-type display device as recited in claim 13, further comprising:

a driver circuit which selects the plurality of pairs of scan bus lines in succession and which, for each successively selected scan bus line pair and in alternate succession:

(a) supplies the first and second opposite potentials respectively to the upper and lower scan bus lines to enable producing a display in the upper row of the respectively corresponding pair of upper and lower display electrode rows, and (b) supplies the second and first opposite potentials respectively to the upper and lower scan bus lines to enable producing a display in the lower row of the respectively corresponding pair of upper and lower display electrode rows, and thereby enables producing a display selectively and in individual succession in the plurality of rows of display electrodes in each frame of a display operation of said active matrix-type display device.

15. An active matrix-type display device as recited in claim 13, wherein the respective display electrodes of the plural rows, further, are aligned in respective columns extending in the transverse direction, each display electrode having first and second opposite edges extending in the transverse direction and upper and lower opposite edges extending in the lateral direction, further comprising:

a plurality of reference voltage lines extending in the lateral direction, each upper display electrode row having a respective reference voltage line disposed adjacent the upper edges of the respective rows of display electrodes thereof and each lower display electrode row having a respective reference voltage line disposed adjacent the lower edges of the respective rows of display electrodes thereof and adjacent upper and lower display electrode rows having a common, respective reference voltage line disposed therebetween; and the first and second switching elements of each pair are connected respectively between the first and second opposite, transverse edges of the respective display electrode and the respective reference voltage line.

16. An active matrix-type device, comprising:

a plurality of data bus lines formed in parallel and spaced relationship;

a plurality of rows of display electrodes, each row comprising plural, respective display electrodes;

a plurality of scan bus lines formed in parallel and spaced relationship, parallel to the rows of display electrodes, each row of display electrodes having a respectively associated pair of first and second scan bus lines;

a plurality of pairs of first switching elements and second switching elements, said first switching elements being turned ON when potentials of control gates of said first switching elements are positive and said second switching elements being turned ON when potentials of control gates of said second switching elements are negative, each pair of said first and second switching elements being connected to a respectively corresponding display electrode;

one pair of said first and second scan bus lines being associated with each row of said display electrodes and, further, each scan bus line which is disposed between a pair of adjacent, first and second rows of said display electrodes comprising, selectively, one of the pair of first and second scan bus lines respectively associated with the first row and one of the pair of first and second scan bus lines respectively associated with the second row, of the pair of adjacent, first and second rows of display electrodes; and the control gates of said first switching elements being connected to said first scan bus lines and the control gates of said second switching elements being connected to said second scan bus lines, the potentials by which said first and second switching elements of each pair, connected to one of said row of display electrodes, are turned ON being simultaneously applied to the corresponding first and second scan bus lines.

17. An active matrix-type display device as recited in claim 16, wherein:

each row of display electrodes has a pair of first and second sides disposed parallel to a first direction of the row and spaced in a second direction, transverse to the first direction; and the first and second scan bus lines of each pair thereof are disposed adjacent the first and second edges, respectively, of the respective row of display electrodes, each scan bus line which is disposed between adjacent, first and second rows of display electrodes, and thus between the second side of the first row and the first side of the second row, comprising a second scan bus line of the pair thereof associated with the first row and a first scan bus line of the pair thereof associated with the second row.

18. An active matrix-type display device as recited in claim 16, wherein:

the rows of display electrodes are arranged in pairs of adjacent first and second display electrode rows; and the plurality of scan bus lines are arranged in plural pairs of adjacent scan bus lines, respectively associated with the plural pairs of display electrode rows, each pair of adjacent scan bus lines being disposed between the first and second display electrodes rows of the respective pair thereof and comprising, in a first time interval, the pair of scan bus lines associated with the first row of display electrodes and, in a second and different time interval, the pair of scan bus lines associated with the second display electrode row, of the respectively associated pair of display electrode rows.

* * * * *